BOTTOM SEALING MACHINE

Original Filed Jan. 27, 1965 16 Sheets-Sheet 1

BOTTOM SEALING MACHINE

Original Filed Jan. 27, 1965 16 Sheets-Sheet 2

BOTTOM SEALING MACHINE
Original Filed Jan. 27, 1965 16 Sheets-Sheet 3
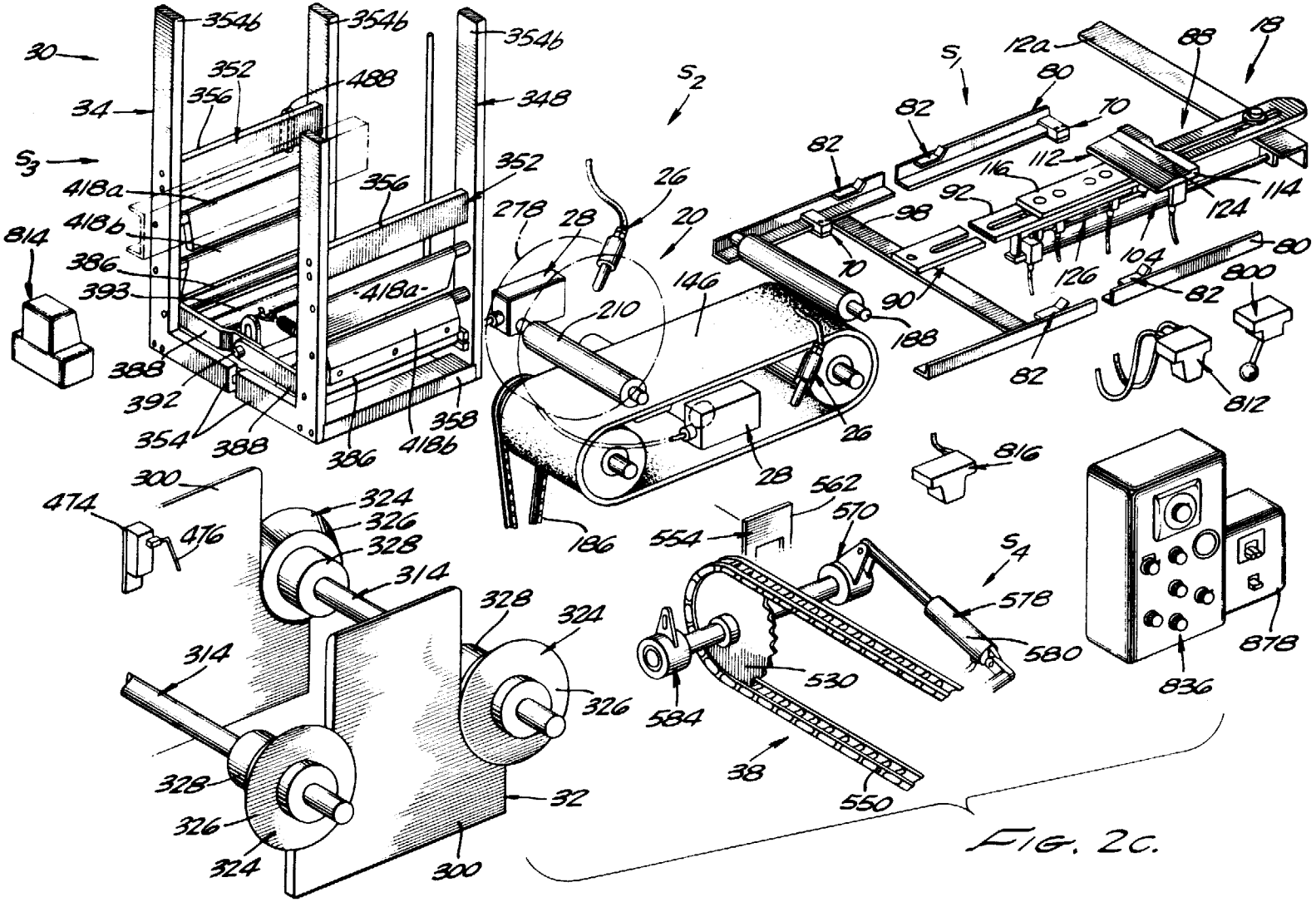

BOTTOM SEALING MACHINE

Original Filed Jan. 27, 1965 16 Sheets-Sheet 5

BOTTOM SEALING MACHINE

Original Filed Jan. 27, 1965 16 Sheets-Sheet 8

BOTTOM SEALING MACHINE

Original Filed Jan. 27, 1965 16 Sheets-Sheet 11

BOTTOM SEALING MACHINE

Original Filed Jan. 27, 1965 16 Sheets-Sheet 12

BOTTOM SEALING MACHINE

Original Filed Jan. 27, 1965 16 Sheets-Sheet 13

United States Patent Office

Re. 27,825
Patented Dec. 4, 1973

27,825
BOTTOM SEALING MACHINE

Lawrence C. Roesner, Anaheim, and Lenard E. Moen, Whittier, Calif., assignors to Precision Produce Specialties Inc., and Calavo Growers of Calif., fractional part interest to each Original No. 3,342,116, dated Sept. 19, 1967, Ser. No. 428,462, Jan. 27, 1965. Application for reissue Feb. 7, 1972, Ser. No. 224,351
Int. Cl. B31b *17/60*
U.S. Cl. 93—55 R 50 Claims

Matter enclosed in heavy brackets [ ] appears in the original patent but forms no part of this reissue specification; matter printed in italics indicates the additions made by reissue.

ABSTRACT OF THE DISCLOSURE

A method of and a machine for forming a container from a pair of preformed end panels and a preformed blank having a central rectangular bottom wall forming panel, hinged side wall forming panels along opposite sides of the bottom wall forming panel, and projecting end panel joining flaps along the edges of the bottom and side wall forming panels, the method and machine operation involving adhesively coating one side of the blank along the flaps thereof, relatively moving the end panels and blank to positions wherein the end panels engage the bottom wall forming panel of the blank along and just inward of the hinge lines of its flaps, and then simultaneously folding the side wall forming panels of the blanks upwardly about the ends of the end panels and folding the flaps of the blank inwardly against the outer surfaces of the end panels to adhesively join the flaps to the end panels.

This invention relates generally to the art of fabricating cardboard shipping containers, particularly shipping containers of the kind disclosed in co-pending application Ser. No. 336,970, filed Jan. 10, 1964, now Patent No. 3,197,108 and entitled Container With Glued Cardboard Stacking Cleats. The invention has more particular reference to a method of and means for mating the separate preformed end panels and blank which make up the shipping container of said co-pending application and erecting or folding the blank about and joining the blank to said panels in such manner as to form a container structure of the kind disclosed in said co-pending application.

During both storage and shipment, it is common practice to stack shipping containers, one upon the other, in vertical columns which may be several feet in height. To enable shipping containers to be safely stacked in this way, each container in a vertical column of stacked containers must be sufficiently strong to support the vertical load imposed thereon by the upper containers and, in addition, must provide a stable supporting base for the adjacent upper container. Some shipping containers are sufficiently strong and their top and bottom surfaces are sufficiently flat to permit the containers to be stacked with the bottom surface of one container resting directly on the top surface of the adjacent lower container. On the other hand, the top and/or bottom surfaces of many shipping containers tend to bulge outwardly when the containers are filled. If these latter containers are stacked one on top of the other with the bottom surface of one container resting directly on the top surface of the adjacent lower container, each container can rock back and forth relative to its adjacent lower container, thereby resulting in an extremely unstable and unsafe container stack. Other containers do not possess the required strength to enable them to be stacked one on top of the other.

at least to the height necessary for optimum utilization of a given storage space.

By way of example, one type of container which has been in wide-sprread use for many years is known in the trade as the Bliss container. The Bliss container, in its simplest form, is fabricated from a single cardboard blank having side portions which are folded in such a way as to constitute side walls and side cover panels, and end portions which are folded in such a way as to constitute end walls and end cover panels. The blank is provided with additional tabs for securing the end and side walls together at the four corners of the container. During its fabrication, the Bliss container is initially formed, in a so-called bottom sealing operation, to a partially completed condition wherein the cover panels are left unfolded to permit the container to be filled. After filling, the container is completed in a so-called top sealing operation during which the cover panels are folded and sealed to close the top of the container. Numerous variations of the Bliss container have been known and used in the past several decades.

While the Bliss containers have been and are currently being successfully used for many purposes, they are deficient for the reason that they often cannot be stacked to the height required by many warehousing and shipping facilities. This is due to the fact that the containers do not possess the requisite structural strength and to the additional fact that the top and bottom surfaces of the containers, when filled, tend to bulge outwardly. As noted above, this bulging of each container prevents the latter from providing a stable support for a container resting thereon. The Bliss containers are also deficient in that when exposed to conditions of high humidity, such as are encountered in commercial freezers and refrigerators, the cardboard material of the containers becomes weakened to the point that the containers collapse.

Containers of the kind under discussion are often used to ship produce. In this case, the containers are provided with ventilation openings to permit the free circulation of air through the containers. When such produce containers are stacked, it is desirable to have ventilation spaces between the confronting top and bottom surfaces of adjacent containers to permit the free circulation of air between the containers and through the ventilation openings in the tops and bottoms of the containers. Many produce containers are not constructed to preserve such ventilation spaces between adjacent containers in a container stack.

The stacking and ventilation requirements discussed above resulted, many years ago, in the introduction of so-called stacking cleats. Such stacking cleats comprise flat strips which are secured to the top and/or bottom of a container adjacent its ends to provide flat supporting surfaces for an adjacent upper container in a column of stacked containers. In addition, these stacking cleats space the confronting top and bottom surfaces of adjacent stacked containers to provide ventilation passages therebetween.

Heretofore, the prevailing practice in regard to stacking cleats has been to cover containers, both of the wooden and cardboard varieties, with a separate lid having wooden stacking cleats secured thereto. After a container is filled, the lid is placed over the open top of the container and is secured in position by driving nails through the cleats and lid into the container. This existing practice is quite satisfactory from the standpoint of providing containers which may be stacked to the required height with ventilation spaces between adjacent containers. However, the use of separate lids and wooden stacking cleats is undesirable from the standpoint of economy. Thus, the separate lid with its wooden stacking cleats and the nails required to secure the lid to a container represent a substantial material cost, while the labor involved in initially fabricating the lid and the cleats and subsequently nailing the lid to a container represent a substantial labor cost. These material and labor costs, of course, are in addition to the cost of the container itself and, therefore, contribute appreciably to the overall container cost. While the additional costs involved in the use of such as separate lid with wooden cleats may be small for each container, the overall cost of equipping a large number of containers with such lids may be substantial.

The aforementioned co-pending application Serial No. 336,970 discloses a shipping container which successfully avoids the above discussed defects of the currently available shipping containers. The container of said co-pending application is fabricated from a preformed cardboard blank and two separate preformed end wall forming panels, or end panels as they will be referred to herein. The blank is scored and perforated to form a number of longitudinal and transverse hinge lines which define on the blank a central bottom wall forming panel, two side wall forming panels outboard the bottom wall forming panel, two cover forming panels outboard of the side wall forming panels, and end panel joining flaps along opposite side edges of the bottom wall forming panel and the two side wall forming panels. The two separate end panels have a laminated construction including a wooden core and a cardboard panel bonded to the outer surface of the core in such manner that the upper edge portion of the cardboard panel projects a distance above the upper edge of the wooden core to define a hinged flap.

When fabricating the container, the end panels are mated with the blank for engaging the lower edges of the panels with the central bottom wall forming panel of the blank just inboard of the hinge lines of the flaps on the latter panel. Thereafter, the side wall forming panels of the blank are folded upwardly about opposite ends of the end panels, the flaps on the blank are folded inwardly against the outer surfaces of the end panels, the cover forming panels are folded inwardly across the top of the container, and, finally, the projecting flaps on the end wall forming panels are folded inwardly over the folded cover forming panels. The several folded end panel joining flaps on the blank are adhesively bonded to the outer surfaces of the end panels, and the folded flaps on the end panels are adhesively bonded to the folded cover forming panels, thereby to form a completed container. In actual practice, the container is initially formed, in a bottom sealing operation, to a partially completed condition, wherein the cover forming panels and the flaps on the end panels are left unfolded to permit the container to be filled. Thereafter, the cover forming panels and end panel flaps are folded and sealed in a top sealing operation to complete the container. In this completed container, the folded end panel flaps overlie the cover forming panels to define cardboard stacking cleats which are reinforced by the wooden cores of the end panels. It has been found that the improved shipping container of the co-pending application is uniquely capable of satisfying both the stacking and ventilation requirements referred to earlier.

It is a general object of this invention to provide a method of and a machine for performing the bottom sealing operation just referred to, thereby to partially form shipping containers of the kind disclosed in the aforesaid co-pending application Serial No. 336,970 as well as other similar containers.

A more specific object of the invention is to provide a container forming method and machine of the character described wherein a pair of end panels are mated with a preformed blank and thereafter the side wall forming panels of the blank are folded upwardly about opposite ends of the end panels and the end panel joining flaps on the blank are folded inwardly against and adhesively bonded to the outer surfaces of the end panels to form a partially completed container structure.

Another object of the invention is to provide a container forming machine of the character described which is fully automatic in operation.

A further object of the invention is to provide a container forming machine of the character described which may be adjusted to accommodate container blanks and end panels of different sizes.

Yet a further object of the invention is to provide a container forming machine of the character described which is relatively compact, reliable in operation, easy to use, capable of high speed operation, and is otherwise ideally suited to its intended purposes.

With these and other objects in view, the invention consists in the construction, arrangement and combination of the various parts of the invention, and in the various combination of method steps involved in the invention, whereby the objects contemplated are attained, as hereinafter set forth, pointed out in the appended claims, and illustrated in the accompanying drawings, wherein:

FIGURE 1 is a perspective view of a bottom sealing, container forming machine according to the invention;

FIGURE 2a diagrammatically illustrates the successive container forming steps performed by the machine during its operation;

FIGURE 2b is an enlargement of two end panel joining flaps on one of the blanks shown in FIGURE 2a and illustrating the manner in which these flaps are coated with glue;

FIGURE 2c diagrammatically illustrates the forming machine itself;

FIGURE 6a is a section taken on line 6a—6a in FIGURE 3a;

FIGURE 9 is an enlarged section taken on line 9—9 in FIGURE 6a;

FIGURE 10 is an enlarged section taken on line 10—10 in FIGURE 6a;

FIGURE 11 is an enlarged section taken on line 11—11 in FIGURE 6a;

FIGURE 12 is an enlarged section taken on line 12—12 in FIGURE 6a;

FIGURE 13 is an enlarged view, partially broken away, looking in the direction of the arrows on line 13—13 in FIGURE 3a;

Figure 1:
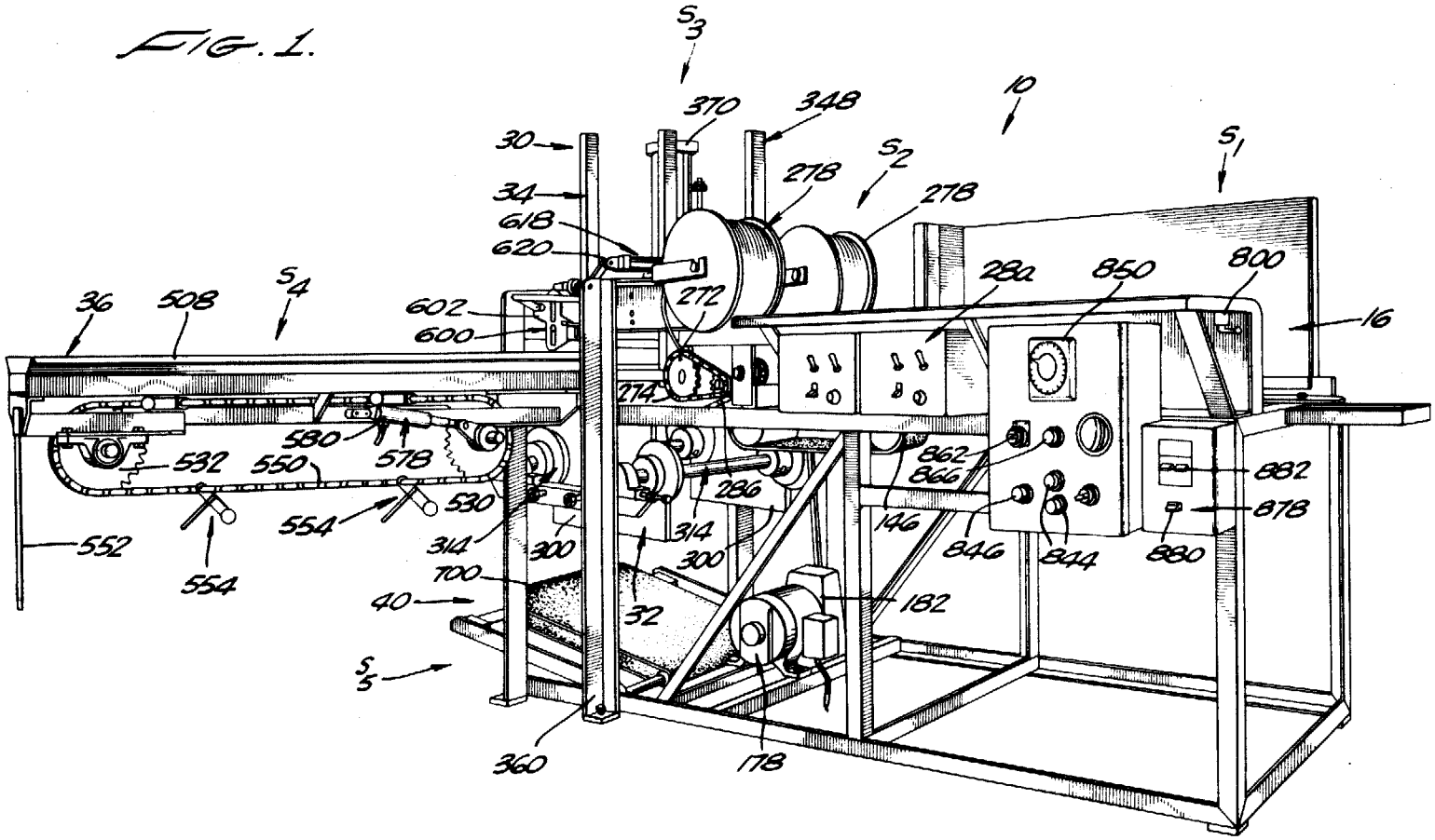

In these drawings, the container forming machine of the invention is designated in its entirety by the reference numeral 10 and the partially completed container which is formed by the machine is designated in its entirety by the reference character C. As noted earlier, this container forms the subject matter of co-pending application Serial No. 336,970. Accordingly, a detailed description of the container may be obtained from said co-pending application. In order to facilitate a full and complete understanding of the present invention, however, it is deemed advisable to briefly describe, at the outset, the container C and the manner in which the container is formed by the machine 10.

Figures 2A, 2B:
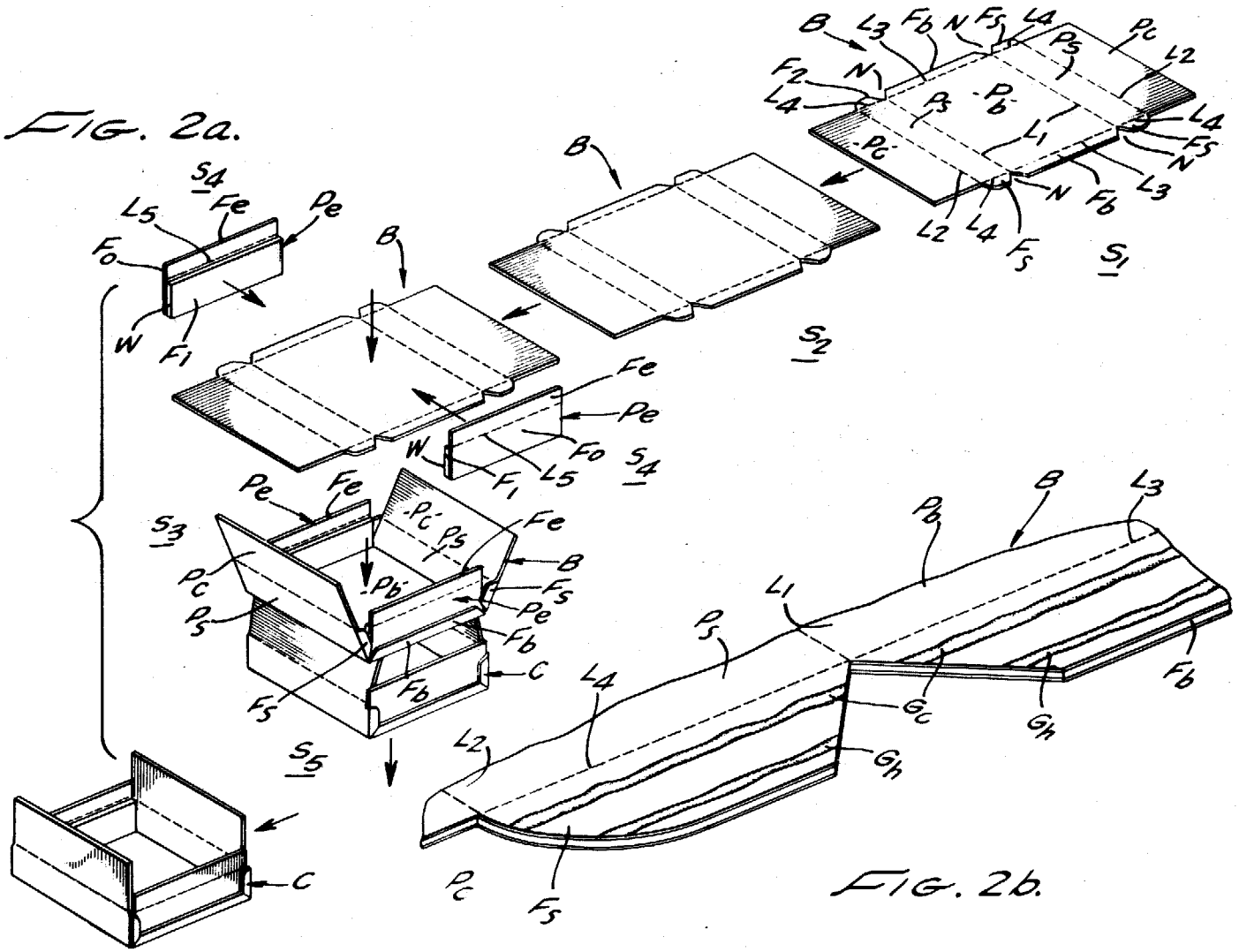
Figure 3A:
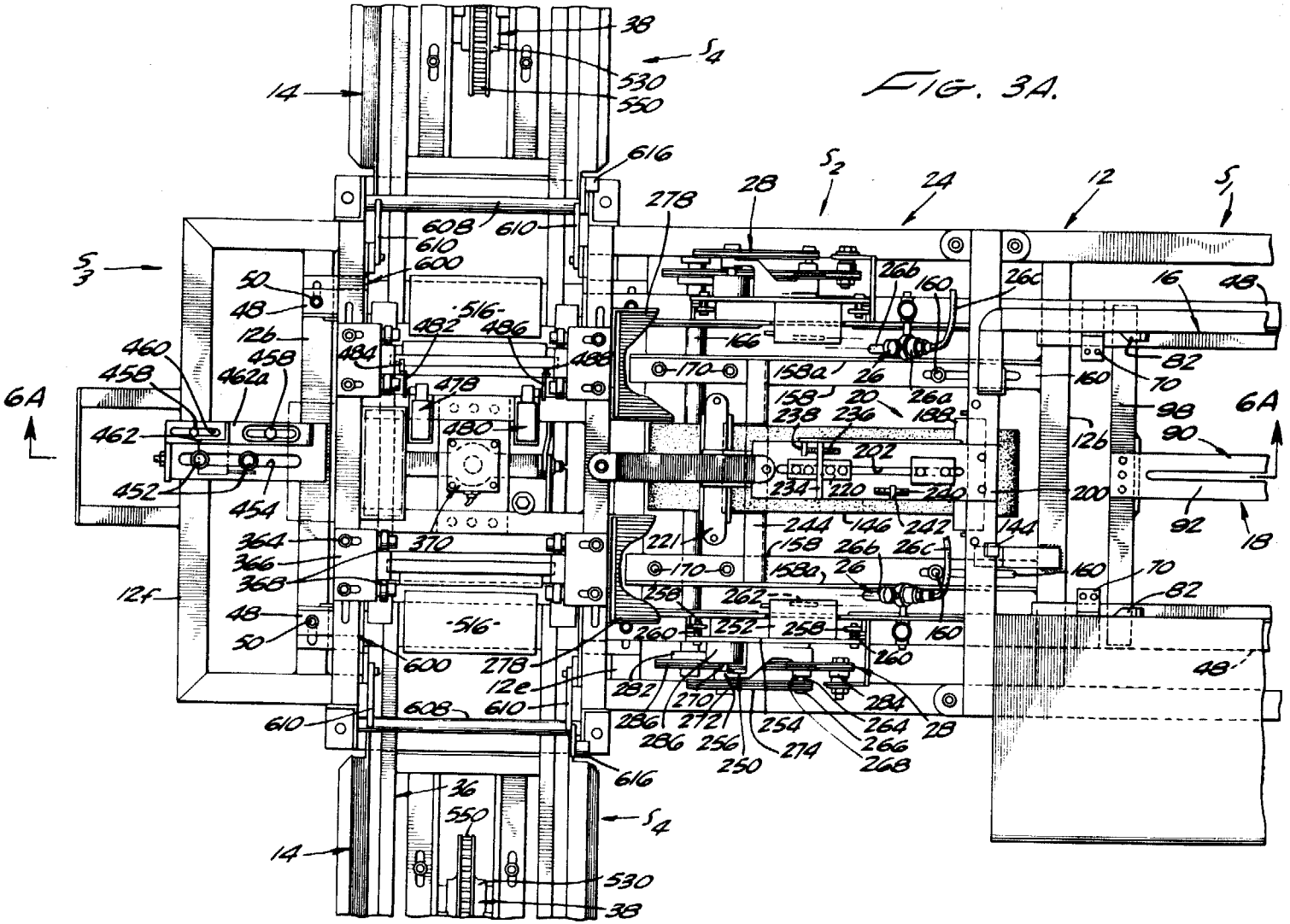
FIGURE 3a is an enlarged plan view of the left-hand end of the forming machine as the latter is viewed in FIGURE 1.

To this end, reference is made first to FIGURE 2a which illustrates the several components of the container and diagrammatically illustrates the successive steps involved in the formation of the container by the machine. The container is constructed of three basic components, to wit, a preformed cardboard blank B and two identical, preformed end panels $P_e$. The blank B has a number of transverse score lines $L_1$ and $L_2$ which define on the blank a central, rectangular bottom wall forming panel $P_b$, two side wall forming panels $P_s$ outboard of the bottom wall forming panel, and two cover forming panels $P_c$ outboard of the side wall forming panels. The blank also has a series of longitudinal score lines $L_3$ and $L_4$ which define end panel joining flaps $F_b$ along opposite edges of the bottom wall forming panels $P_b$ and additional end panel joining flaps $F_s$ along opposite edges of the side wall forming panels $P_s$. Each end panel $P_e$ has a laminated construction and includes a central wooden plate or core W, an inner paper facing $F_i$ adhesively bonded to the normally inner surface of the core, and an outer cardboard facing $F_o$ adhesively bonded to the normally outer surface of the core. The outer facing of each end panel extends a distance above the normally upper edge of its respective core and has a score line $L_5$ parallel to and located a small distance above said edge. For reasons which will be explained later, this spacing is approximately equal to the thickness of the cardboard blank B. The portion of the outer facing $F_o$ of each end panel above its respective score line $L_5$ defines an end panel flap $F_e$.

The successive steps involved in the operation of the machine 10 to form a container C from these three basic container components will now be briefly described. As will appear from the later description of the machine, the latter has several stations, to wit, a blank infeed station at which is maintained a supply of the preformed cardboard blanks B and from which these blanks are successively fed to the machine, a gluing station which receives each blank from the infeed station and applies stripes of glue to certain parts of the blank, a forming station which receives each glue-coated blank from the gluing station, a pair of end panel infeed stations at which are maintained supplies of the end panels $P_e$ and from which these end panels are successfully fed, in pairs, to the forming station for mating with a glue-coated blank at the forming station, and an outfeed station which receives each partially completed container C from the forming station and ejects the container from the machine. In FIGURE 2a, these several stations are represented by reference characters as follows: blank infeed station $S_1$, gluing station $S_2$, forming station $S_3$, end panel infeed station $S_4$, and outfeed station $S_5$. As shown in this latter figure, each preformed blank B is fed endwise from the blank infeed station $S_1$, through the gluing station $S_2$, to the forming station $S_3$. As each blank travels through the gluing station, stripes of cold glue $G_c$ and hot glue $G_h$ are applied to the end panel joining flaps $F_b$ and $F_s$ of the blank. Upon arrival of each glue-coated blank at the forming station $S_3$, the blank receives a pair of end panels $P_e$ from the end panel infeed stations $S_4$. These end panels are initially disposed in positions of mating relation to the blank, wherein the panels are located over the central, bottom wall forming panel $P_b$ of the blank, just inboard of the score lines $L_3$ along opposite edges of the latter panel. Thereafter, the blank and its mating end panels are forced downwardly into a forming cavity (not shown in FIGURE 2a) during which the side wall forming panels $P_s$ of the blank are folded upwardly about opposite ends of the end panels $P_e$ and the adhesively coated end panel joining flaps $F_b$ and $F_s$ of the blank are folded inwardly against the outer surfaces of the end panels, thereby to adhesively secure the blank to the end panels. The cover forming panels $P_c$ on the blank and the flaps $F_e$ on the end panels are not folded about their respective score lines $L_2$ and $L_5$ during this folding operation, whereby at the conclusion of the forming operation, the adhesively joined blank B and end panels $P_e$ form a partially completed container structure of the kind designated by the reference character C. This partially completed container structure remains in the forming cavity at the end of the forming operation, just referred to, and is ejected from the cavity to the outfeed station $S_5$ during the formation of the next container structure C. Upon entering the outfeed station, each container structure C is conveyed from the machine.

We proceed now with a description of the container forming machine 10. To aid the reader in following the ensuing description of the machine, there is set forth below a table wherein the several figures of the drawings are grouped according to the parts of the machine illustrated thereby.

Figure 29:
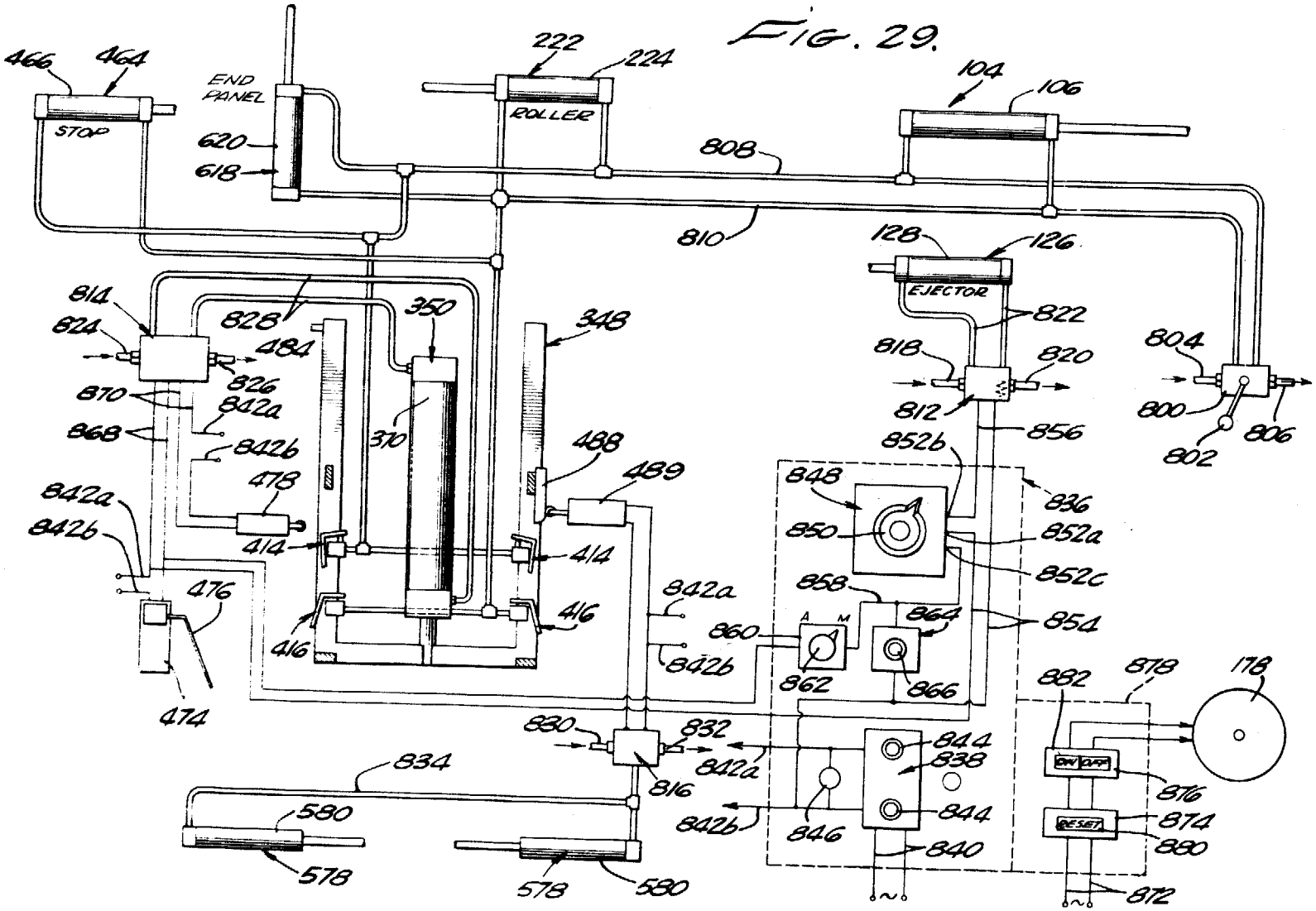
FIGURE 29 diagrammatically illustrates the electrical and pneumatic control system of the machine.

1. General organization of machine: FIGURES 1, 2, 3a, and 3b.
2. Blank infeed station $S_2$: FIGURES 1, 2, 3a, 3b, 4, 5, 6b, 7, and 8.
3. Gluing station $S_2$: FIGURES 1, 2c, 3a, 6a, 9, 10, 11, 13, and 13a.
4. Forming station $S_3$: FIGURES 1, 2c, 3a, 6a, 11, 12, 13, 14, 15, 16, 17, 18, 19, 20, and 21.
5. End panel infeed stations $S_4$: FIGURES 1, 2c, 3a, 11, 19, 22, 23, 24, 25, 26, 27, and 28.
6. Outfeed station $S_5$: FIGURES 1, 6a, 11, and 12.
7. Electrical and pneumatic systems: FIGURE 29.

GENERAL MACHINE ORGANIZATION

Considering the machine generally, the latter will be seen to comprise a main rectangular supporting frame 12 and a pair of cross frames 14 extending laterally out from opposite sides of the main frame, adjacent one end of the latter frame. The blank infeed station $S_1$, gluing station $S_2$, forming station $S_3$ and the outfeed station $S_5$ are located on the main frame 12, at positions spaced therealong. The blank infeed stations $S_4$ are located on the cross frames 14. The infeed station $S_1$ comprises a storage magazine 16 for containing a supply of the preformed cardboard blanks B and an infeed mechanism 18 for successively feeding the blanks from the magazine to the gluing station $S_2$. At the gluing station is a feed mechanism 20 which receives each blank emerging from the infeed station $S_1$ and conveys the blank through the gluing station to the forming station $S_3$. The gluing station $S_2$ also includes a glue applicator mechanism 24 including a pair of cold glue applicators 26 and a pair of hot glue applicators 28 for applying to each blank, as the latter travels through the gluing station, the stripes of cold and hot glue $G_c$ and $G_h$, respectively. The forming station $S_3$ includes a forming mechanism 30 including a forming die 32 having a vertical forming cavity opening through the top and bottom of the die, and a forming mandrel or ram 34 located above the forming die 32 and movable between a lower, extended position wherein the lower, leading end of the ram projects into the forming cavity in the forming die 32, and an upper retracted position, wherein the lower leading end of the ram is retracted out of the cavity. Each end panel infeed station $S_4$ includes an elongate storage magazine 36 for containing a supply of the preformed end panels $P_e$ and an infeed mechanism 38 for successively feeding the end panels from the respective magazine into the forming station $S_3$ to a position of mating relation to a blank B at the forming station. The outfeed station $S_5$ comprises an outfeed conveyor 40 which receives each partially completed container structure C from the forming station $S_3$ and conveys the container structure from the machine.

Briefly, during operation of the container forming machine 10, the infeed mechanism 18 at the blank infeed station $S_1$ successively ejects the preformed cardboard blanks B from the blank storage magazine 16 to the gluing station $S_2$. The feed mechanism 20 at the gluing station conveys each blank through the gluing station to an initial position at the forming station $S_3$ wherein the blank extends across the open top of the forming cavity in the forming die 32, between the latter and the then retracted forming mandrel 34, and the bottom forming panel $P_b$ of the blank overlies the cavity. During its passage through the gluing station $S_2$, just prior to its entrance into the forming station $S_3$, the blank is coated with the cold and hot glue $G_c$ and $G_h$. At this stage in the operation of the machine, therefore, there is situated in the initial forming position at the forming station $S_3$ a glue-coated blank B. The end panel infeed mechanisms 38 are effective to position a pair of end panels $P_e$ in mating relation to this blank, wherein the end panels overlie the bottom wall forming $P_b$ of the blank, just inboard of the score lines $L_3$ along opposite edges of the bottom forming panel. The forming mechanism 30 at the forming station $S_3$ is now activated to drive the forming mandrel 34 downwardly to its extended position within the forming cavity in the forming die 32. During this extension of the mandrel, the latter drives the pair of end panels downwardly into initial mating engagement with the underlying blank and thereafter drives the mating blank and end panels into the forming cavity. During this movement of the blank and end panels into the forming cavity, the side wall forming panels $P_s$ of the blank are folded upwardly about opposite ends of the end panels and the glue-coated flaps $F_b$ and $F_s$ on the blank are folded inwardly against the outer surfaces of the end panels, in the manner explained earlier, thereby to effect adhesive bonding of the flaps to the end panels and form a partially completed container structure C. This container structure remains within the forming die during the subsequent upward return of the forming mandrel 34 to its retracted position to await the next glue-coated blank from the gluing station $S_2$. When this next blank arrives at its initial forming position at the forming station $S_3$, the mandrel 34 again descends to force the latter blank and its mating end panels $P_e$ into the forming cavity to form another container structure C. As this latter container structure is forced downwardly, through the forming die, it engages the upstanding cover forming panels $P_c$ on the first container structure and thereby ejects the latter structure through the lower end of the die. The first container structure then drops onto the outfeed conveyor 40 and is conveyed from the machine.

As noted earlier, the container forming machine 10 is adapted to operate on preformed cardboard blanks B and end panels $P_b$ of different sizes, to form container structures C of different capacities. To this end, the machine is equipped with a changeover mechanism including mechanisms at the blank infeed station $S_1$, the gluing station $S_2$, the forming station $S_3$, and the end panel infeed stations $S_4$ which may be operated in unison to condition the machine to accept blanks and end panels of different sizes. The container forming machine 10 will now be described in greater detail.

BLANK INFEED STATION $S_1$

Figure 7:
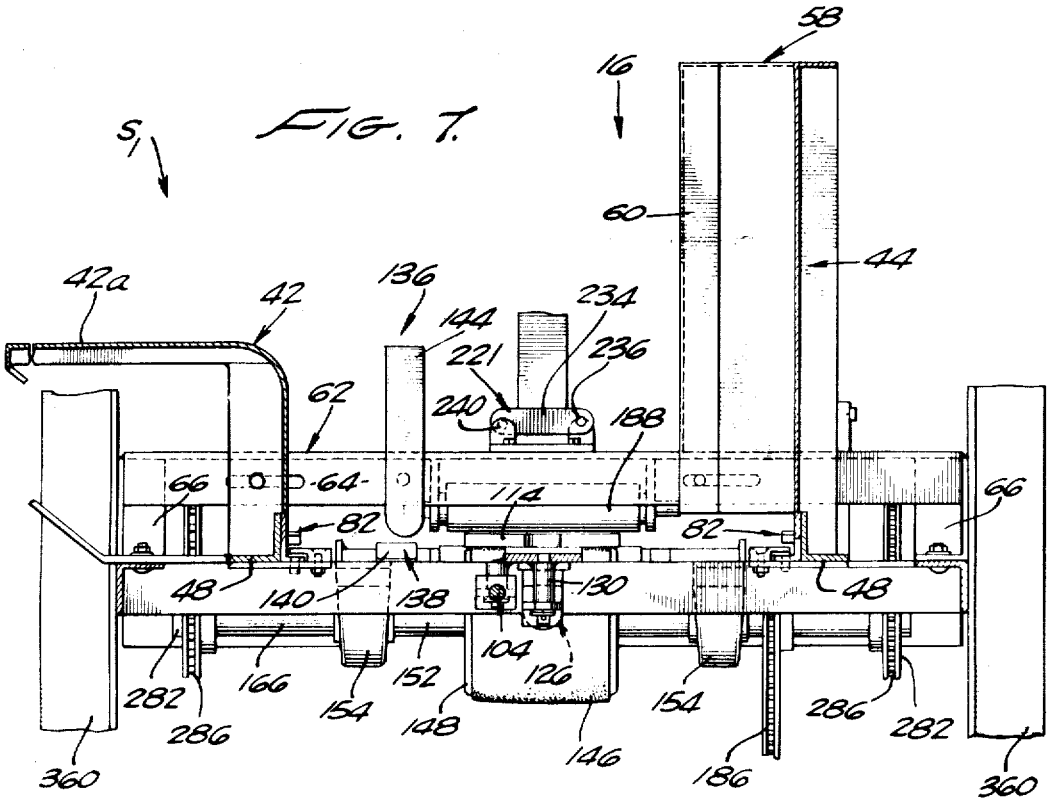
FIGURE 7 is a section taken on line 7—7 in FIGURE 6b.
Figure 8:
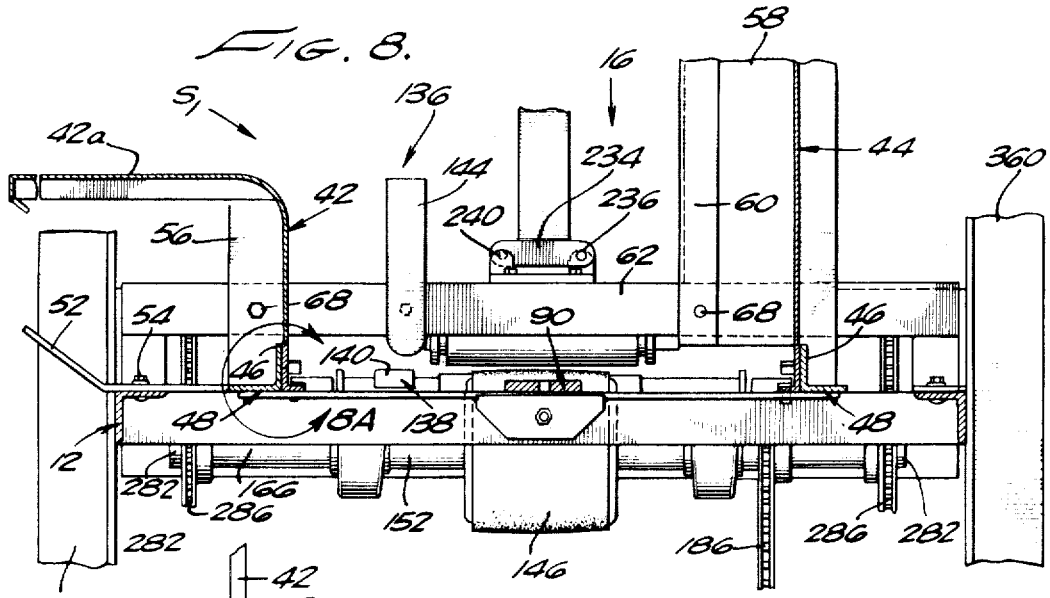
FIGURE 8 is a section taken on line 8—8 in FIGURE 6b.

The blank storage magazine 16 at the blank infeed station comprises a pair of upstanding wall members 42 and 44 which are disposed in spaced parallel planes extending lengthwise of the machine frame 12. The lower edge portions of these wall members are secured, as by welding, to the inner, confronting surfaces on the upstanding flanges 46 of a pair of angles 48 on the machine frame 12. These angles form main supporting members on the frame which extend from a cross member 12a on the infeed end of the frame to a cross member 12b on the frame, just beyond the forming station $S_3$. The ends of the angles 48 are fastened to the cross members 12a and 12b by bolts 50 which extend through slots in the cross members, as shown, whereby the spacing between the angles, and, thereby, also the spacing between the wall members 42 and 44 of the magazine 16, may be adjusted. The upper end of the left-hand magazine wall members 42 in FIGURES 7 and 8 is turned outwardly to form a horizontal supporting shelf 42a. The outer edge of this shelf is preferably supported on the frame 12 by braces 52 which are secured to the frame by bolt and slot connections 54, whereby the braces may be adjusted relative to the frame. Along the forward edge of the wall member 42, that is, the edge of the wall member adjacent the gluing station $S_2$, is an outwardly directed, reinforcing flange 56. Along the forward edge of the opposite wall member 44 is an inwardly directed locating flanges 58 for locating the blanks B in the magazine 16 in the endwise direction of the blanks, as will appear presently. This inwardly directed flange has a wear strap 60 welded thereto.

Extending crosswise of the machine frame 12, between the infeed station $S_1$ and the gluing station $S_2$, is a horizontal bridge 62 comprising an angle having a rear depending vertical flange 64 which seats against the forward surfaces of the reinforcing flange 56 and the locating flange 58 on the magazine wall members 42 and 44, respectively. The ends of the bridge 62 are secured to the machine frame 12 by upstanding supports 66 which support the bridge in a horizontal position, a distance above the frame. The magazine wall flanges 56 and 58 are secured to the bridge flange 64 by bolts 68 which extend through slots in the bridge flange to permit adjustment of the spacing between the wall members 42 and 44, in the manner explained above.

Figure 8A:
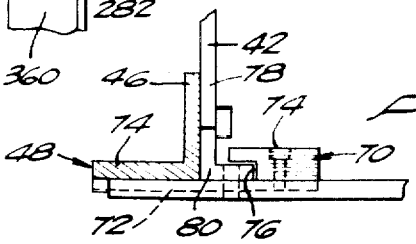
FIGURE 8a is an enlargement of the area enclosed by the circular arrow 8a—8a in FIGURE 8.
Figure 10:
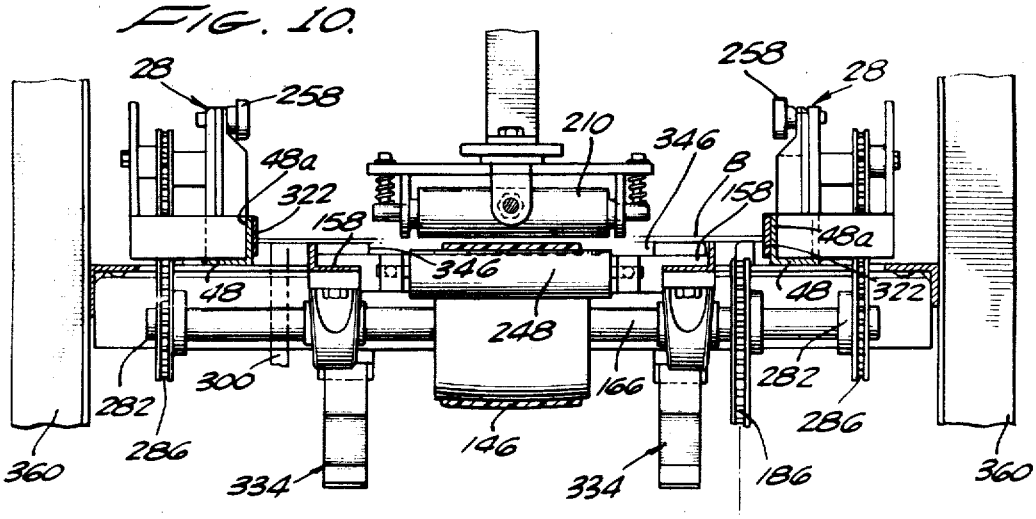
Figure 9:
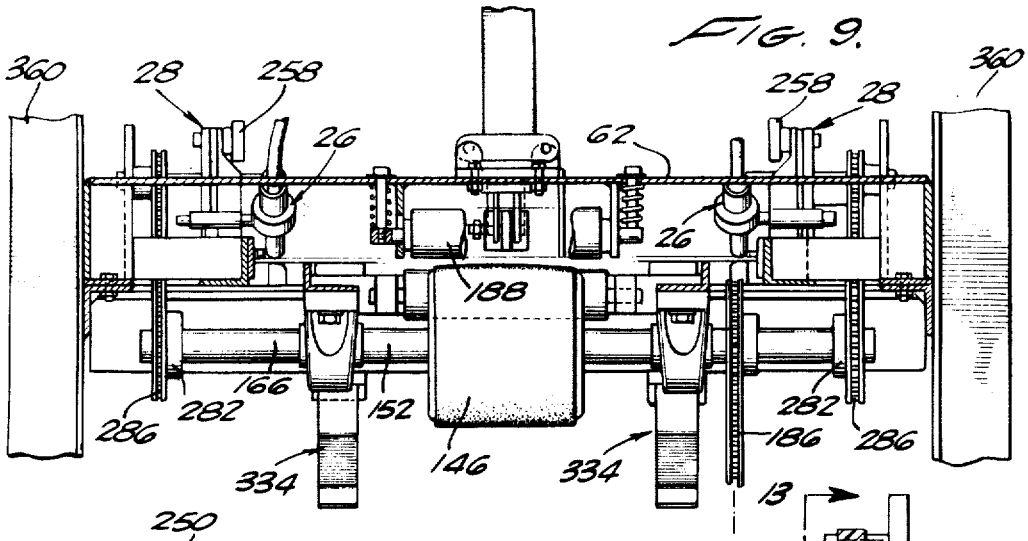

Mounted on each of the main frame angles 48 are a pair of supporting guides 70. As shown best in FIGURE 3b, the guides on the two frame angles are aligned laterally of the frame 12. One of the pair of laterally aligned guides 70 is located adjacent the forward ends of the magazine wall members 42 and 44. The other pair of guides are located a distance forwardly of the rear ends of these wall members. As shown best in FIGURE 8a, each supporting guide 70 comprises a base plate 72 which is welded to the undersurface of the horizontal flange 74 of its respective frame angle 48 and projects inwardly a distance beyond the angle. Bolted to the upper surface of this inwardly projecting end of the base plate is a block 74 which is notched, as shown, to define, with the base plate, a guide slot 76 opening outwardly toward the adjacent frame angle 48. Secured to the inner confronting surfaces of the vertical flanges 46 of the frame angles 48, below the lower edges of the magazine wall members 42 and 44, are wear strips 78, the lower edges of which are located a distance above the base plate 72 of the supporting guides 70. The pair of guides 70 on each frame angle 48 slideably support an angle-shaped slide-bar 80, the horizontal flange of which engages in the guide slots 76 of the respective supporting guides and the vertical flange of which seats against the inner surface of the adjacent vertical frame angle flange 46 and the undersurface of the adjacent wear strip 78. It is apparent, therefore, that each frame angle 48, and its respective supporting guides 70 and wear strips 78, cage the adjacent slide-bar 80 against lateral movement but permit free endwise movement of the slide-bar. Fixed to the inner surface of the vertical flange of each slide-bar 80 are a pair of blank supporting brackets 82. As may be best observed in FIGURE 4, each supporting bracket 82 includes a forward, horizontal end 84 and a rear, upwardly sloping end 86.

The wall members 42 and 44 and the slide-bars 80, together with their supporting brackets 82, define the blank storage magazine 16. When the machine is to be placed in operation, a number of the preformed blanks B are stacked in this magazine with the lowermost blank in the stack resting on the rear, upwardly sloping ends 86 of the supporting brackets 82, in the manner shown in FIGURE 4.

As mentioned earlier, the present machine is designed to accept preformed blanks B and end panels $P_e$ of different sizes for producing container structures C of different capacities, and, to this end, embodies certain changeover adjustments which are effective to condition the machine for accepting the different size blanks and end panels. One of these adjustments involves positioning of the supporting brackets 82 in the endwise direction of the blanks B contained in the storage magazine 16. This positioning of the supporting brackets is accomplished by a bracket position mechanism 88 which forms part of the changeover mechanism of the machine. Mechanism 88 includes the slide-bar actuating frame 90 including a frame member 92 which extends lengthwise of the machine frame 12, approximately along the longitudinal center line of the latter frame. The actuating frame member 92 rests on the upper surfaces of the cross member **12*a* and an adjacent cross member 12*c* of the machine frame 12 and is secured to the latter cross members by bolts 94 which extend through longitudinal slots 96 in the actuating frame member 92. Next to the forward end of the actuating frame member 92 is a cross member 98. The outer ends of this cross member extend under the slide-bars 80. Each slide-bar has a number of tapped holes 100–1, 100–2, 100–3 and 100–4. Threaded in certain of these holes in each slide-bar and depending below the respective slide-bar, are screws 102–1, 102–2 and 102–3. The container forming machine 10, as it is illustrated in the drawings, is set up for producing so-called 12½-pound containers. In this setting of the machine, the screws 102–1, 102–2, and 102–3 on each slide-bar 80 are threaded in the tapped holes 100–1, 100–2 and 100–3 in the respective slide-bar. The outboard ends of the cross member 98 on the slide-bar actuating frame 90 extend between the screws 102–1 and 102–2 on the slide-bars 80. The third slide-bar screws 102–3 are located to the rear of the cross member 12*c* on the main machine frame 12. At this point, it is apparent that during forward movement of the slide-bar actuating frame 90 relative to the machine frame 12, the cross member 98 engages the forward slide-bar screws 102–1 and thereafter drives the slide-bars 80 forwardly in unison to a forward limiting position wherein the rear slide-bar screws 102–3 engage the main frame cross member 12C. During rearward movement of the slide-bar actuating frame 90 relative to the machine frame 12, the cross member 98 engages the center slide-bar screws 102–2 and thereafter drives the slide-bars 80 rearwardly to a rearward limiting position wherein the latter screws engage the main frame cross member 12c. When the slide-bars 80 occupy said forward limiting positions thereof, as illustrated in the drawings, the supporting brackets 82 on the slide-bars are positioned to support preformed blanks B for 12½ pound containers. When the slide-bars occupy said rear limiting positions, the supporting brackets 82 are located to support the blanks for so-called 25-pound containers. The illustrated machine is designed to accept blanks for one further size of container, namely, a so-called No. 2 container. To condition the machine for accepting preformed blanks B for such No. 2 containers, the slide-bars 80 are moved rearwardly to positions wherein the rear tapped slide-bar holes 100–4 are located to the rear of the rear supporting guides 70. The rear slide-bars screws 100–3 are then removed and inserted in the slide-bar holes 100–4. The slide-bar actuating frame 90 is then removed forwardly to drive the slide-bars 80 forwardly to positions wherein the rearwardly located slide-bar screws 102–3 engage the rear supporting guides 70. The supporting brackets 82** on the slide-bars are then positioned to support the blanks B for No. 2 containers.

Fixed to the rear end of the slide-bar actuating frame 90 is an upstanding guide 103, the upper end of which curves rearwardly. The preformed blanks B which are contained in the magazine 16 are confined, in the endwise direction, between this guide and the forward flange 58 on the magazine side wall member 44. It is apparent that whenever the supporting brackets 82 are repositioned, by adjustment of the slide-bar actuating frame 90, to accept preformed blanks B of a new size, the guide 103 is simultaneously repositioned, toward or away from the wall flange 58, thereby to adjust the effective length of the storage magazine 16 for accommodating the latter to the new size blanks.

Also included in the adjusting or positioning mechanism 88 for the blank supporting brackets 82 is a linear actuator 104 for driving the slide-bar actuating frame 90 lengthwise of the main frame 12 and, thereby, moving the slide-bars 80 to the various operative positions of the blank supporting brackets 82. This actuator comprises a double acting cylinder 106 having its forward end attached, at 108, to the longitudinal member 92 of the slide-bar actuating frame. Movable in the cylinder 106 is a piston having a rearwardly extending piston rod 110, the rear end of which is attached to the cross member 12a of the machine frame 12. It is apparent, therefore, that admission of high pressure fluid to the forward end of the actuator cylinder 106 drives the slide-bar actuating frame 90 and the slide-bars 80 forward to their forward limiting positions of FIGURES 3b and 4 wherein the storage magazine 16 is conditioned to contain preformed blanks B of one size, namely, those used in 12½-pound containers. Admission of high pressure fluid to the rear end of the actuator cylinder drives the slide-bar actuating frame and the slide-bars rearwardly to their rear limiting positions, mentioned earlier, wherein the storage magazine is conditioned to contain blanks of another size, namely, those used in 25-pound containers. As already explained, the magazine is conditioned to contain blanks for No. 2 containers by positioning the rear slide-bar stop screws 102–3 in the rear slide-bar holes 100–4.

As noted earlier, the blanks B are successively fed from the storage magazine 16 to the gluing station $S_2$ by the infeed mechanism 18. This infeed mechanism comprises a blank ejector 112 which is slideably supported on the longitudinal member 92 of the slide-bar actuating frame 90 for fore and aft movement relative to the latter member. This blank ejector comprises a pusher plate 114 which is attached to the rear end of a supporting slide plate 116 and slideably seats on the upper surface of the longitudinal member 92 of the slide-bar actuating frame 90. Slideably seating against the undersurface of the actuator frame member 92 is a second slide plate 118. Slide plates 116 and 118 are rigidly joined by screws 120 and an interconnecting key (not shown) which extend through the rear slot 96 in the actuator frame member 92. The blank ejector 112 is thereby guided by the slot 96 for fore and aft movement relative to the frame member 92. The rear pusher plate 114 of the blank ejector 112 has a forward ramp surface 122 which terminates, at its rear end, in an upstanding, forwardly presented blank engaging shoulder 124. This ramp surface slopes upwardly as it approaches the shoulder.

Below the slide-bar actuating frame 90 is a linear actuator 126 for driving the blank ejector 112 back and forth along the actuator frame member 92. This actuator comprises a double acting cylinder 128, the rear end of which is secured to a post 130 depending from the lower slide plate 118 of the ejector. Movable in the cylinder 128 is a piston having a piston rod 132, the forward end of which is secured to a bracket plate 134 depending from the underside of the actuator frame member 92. It is apparent, therefore, that the admission of high pressure fluid to the rear end of the actuator cylinder 128 drives the blank ejector 112 forwardly along the actuator frame member 92 to its forward limiting position indicated in dashed lines in FIGURE 4. Admission of high pressure fluid to the forward end of the actuator cylinder 128 drives the blank ejector rearwardly to its rear limiting position illustrated in phantom lines in FIGURE 4. It will be observed that in the rear limiting position of the blank ejector, the blank engaging shoulder 124 on the pusher plate 112 of the ejector is located a short distance to the rear of the stack of preformed blanks B contained within the storage magazine 16. The vertical height of the pusher plate shoulder 112 is just slightly less than the thickness of each blank B. Accordingly, during forward movement of the blank ejector 112 from its phantom line rear limiting position to its dashed line forward limiting position of FIGURE 4, the pusher plate shoulder 124 engages the rear edge of the lowermost blank in the stack of blanks within the storage magazine 16 and thereby drives this lowermost blank forwardly relative to the remaining upper blanks in the stack. The ramp surface 122 on the pusher plate 114 guides the lowermost blank into engagement with the pusher plate shaoulder 124 during such forward movement of the blank ejector.

Figure 4:
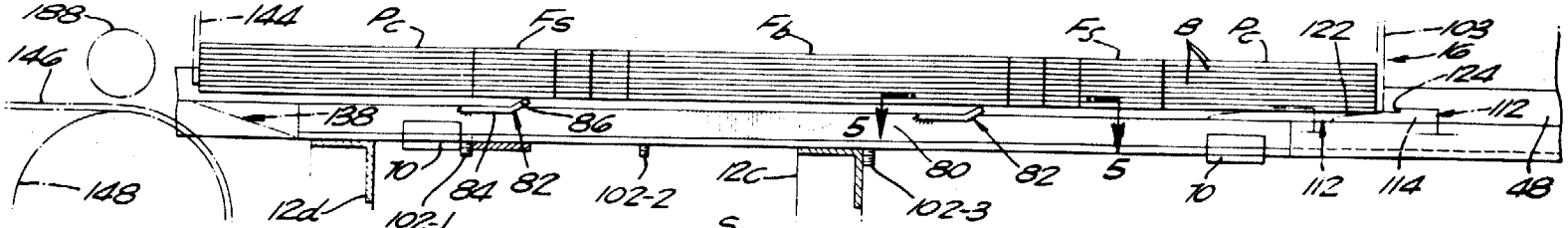
FIGURE 4 is an enlarged section taken on line 4—4 in FIGURE 3b and showing a number of preformed blanks in position on the machine.
Figure 3B:
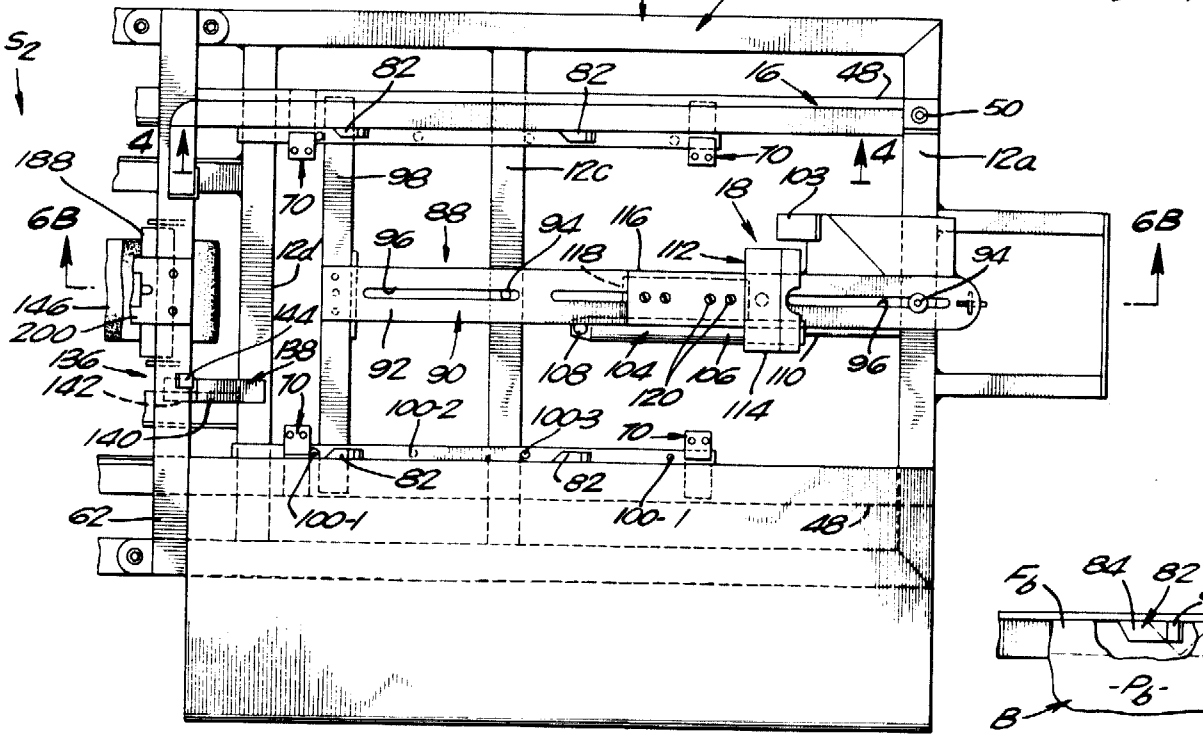
FIGURE 3b is an enlarged plan view of the right-hand end of the machine.
Figure 5:
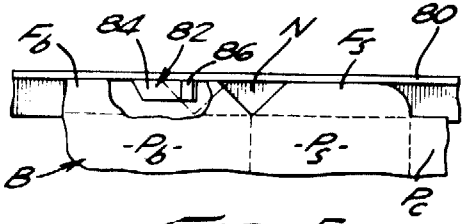
FIGURE 5 is an enlarged view looking in the direction of the arrows on line 5—5 in FIGURE 4.

In each of the three positions of adjustment, described earlier, of the blank supporting brackets 82 in the blank storage magazine 16, the rear, upwardly sloping ends 86 of the forward brackets are located to engage the lowermost blank B of the stack of blanks within the magazine along its forwardly disposed end panel joining flaps $F_8$, as shown in FIGURE 4. The rear, upwardly sloping ends 86 of the rear brackets 82 are located to engage the lowermost blank along its end panel joining flaps $F_b$, as illustrated in FIGURES 4 and 5. Accordingly, when the lowermost blank is driven forwardly by the blank ejector 112 relative to the remaining blanks in the stack, in the manner explained earlier, the rear, upwardly sloping ends 86 eventually enter the triangular gaps N which exist between the adjacent end panel joining panel flaps $F_b$ and $F_s$. When this occurs, the lowermost blank drops onto the forward, horizontal ends 84 of the blank supporting brackets 82 and the next to the lowest blank drops onto the upwardly sloping bracket ends 86. The lowermost blank is thus released from the stack of blanks within the storage magazine 16 and is thereby conditioned for unrestricted forward movement by the blank infeed mechanism 18 from the infeed station $S_1$ to the gluing station $S_2$.

As the lowermost blank is thus fed from the blank infeed station to the gluing station, the blank passes through a gating means 136 which permits movement of only one preformed blank B at a time from the infeed station to the gluing station. This gating means comprises a ramp 138 which is fixed, at its rear end, to a cross- member 12d on the machine frame 12 and extends forwardly therefrom. The rear end 140 of this ramp slopes upwardly in the forward direction of the machine frame 12 and continues at its forward end in a horizontal end 142. Mounted on the cross bridge 62, over the ramp 138, is a stop 144. The lower end of this stop is rounded, as shown, and spaced above the horizontal end 142 of the ramp 138 a distance just slightly greater than the thickness of each blank B. It is apparent, therefore, that the gating means 136 is effective to permit the passage of only one blank at a time from the blank infeed station $S_1$ to the gluing station $S_2$ by the blank infeed mechanism 18.

GLUING STATION $S_2$

As noted earlier, the gluing station $S_2$ includes a feed mechanism 20 which receives each preformed blank B as the latter emerges from the blank infeed station $S_1$ and conveys the blank through the gluing station to the forming station $S_3$ and a glue applicator mechanism 24 for applying stripes of hot and cold glue to each blank as the latter travels through the gluing station. The feed mechanism 20 at the gluing station comprises an endless conveyor belt 146 which extends lengthwise of the machine frame 12 and is trained about a pair of rotary drums 148 and 150. The rear drum 148 is fixed on a shaft 152 the ends of which are rotatably supported in bearings 154. These bearings include upper base portions 156 which slidably seat against the undersurface of a pair of supporting frame members 158 which extend lengthwise of the machine frame 12, within the gluing station $S_2$, and are rigidly fixed at their rear ends to the cross frame member 12d and a cross frame member 12e located at the forward end of the gluing station. The base portions 156 of the bearings 154 are secured to the longitudinal frame members 158 by bolts 160 which extend through longitudinal slots in these frame members, as shown. Rigidly fixed to and depending below each frame member 158, forwardly of the adjacent drum bearing 154, is a bracket plate 162. A bolt 164 is threaded in each bracket plate 162 and seats against the forward end of the base 156 on the adjacent drum bearing. The forward drum 150 is mounted on a shaft 166, the ends of which are rotatably supported in bearings 168. Bearings 168 seat against the undersurface of the longitudinal frame members 158 and are rigidly secured to the latter by bolts 170. It is apparent that the screws 164 which seat against the rear drum bearings 154 are adjustable to tension the conveyor belt 146.

Figure 6A:
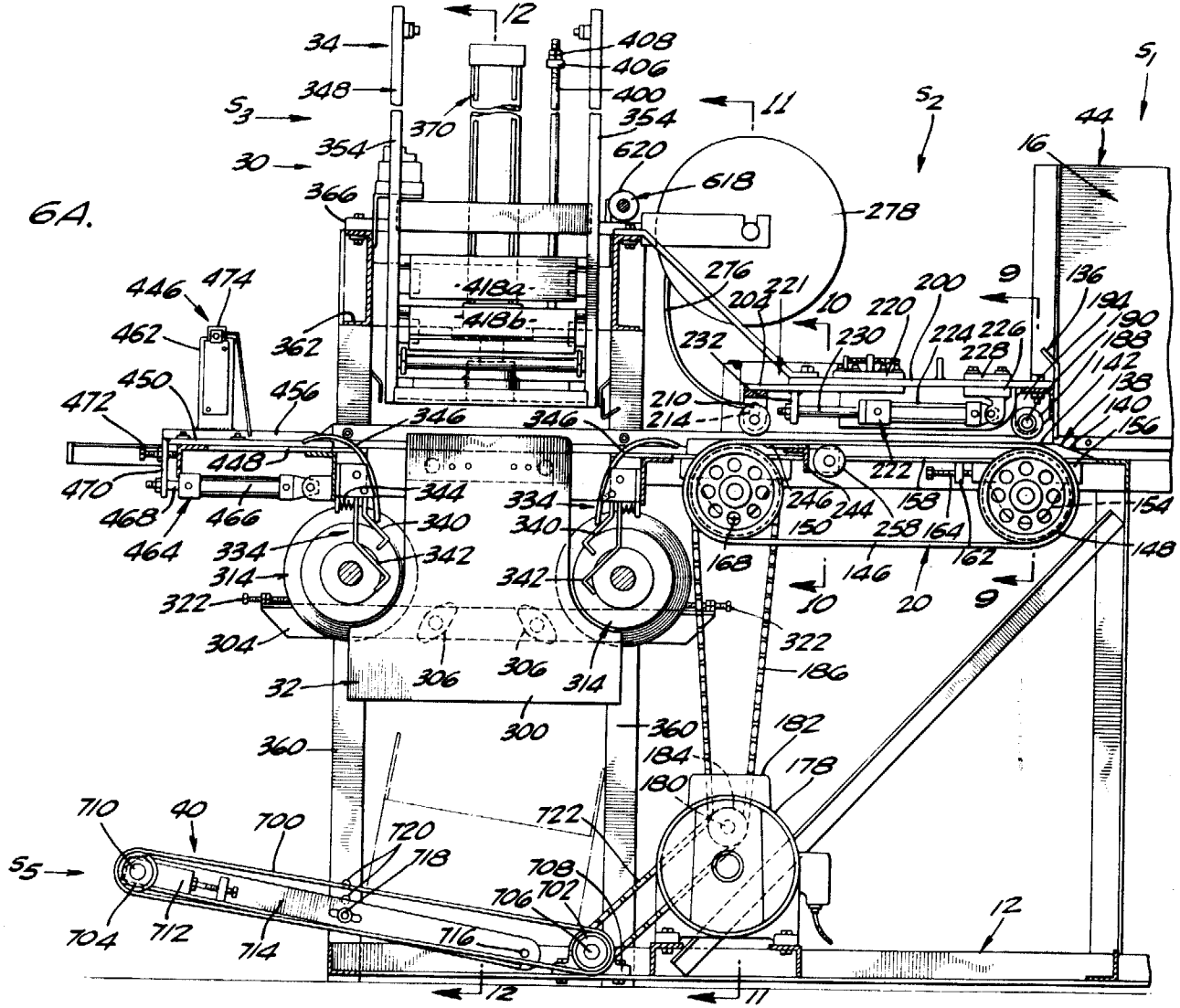

Fixed on the forward conveyor drum supporting shaft 166 is a sprocket 176. On the base of the machine frame 12, below this latter shaft, is mounted a main drive motor 178 which drives an output shaft 180 through a speed reduction unit 182. Fixed on the output shaft 180 is a sprocket 184, around which and the sprocket 176 on the forward drum supporting shaft 166 is trained a sprocket chain 186. It is apparent, therefore, that the conveyor belt 146 is driven by the main drive motor 178. As shown in FIGURE 6a, the forward, horizontal end 142 of the ramp 138 in the blank gating means 136 is substantially flush with the upper run of the conveyor belt 146.

Located over the rear supporting drum 148 is a pressure roller 188 rotatably mounted on a shaft 190. The ends of this shaft extend beyod the ends of the roller 188 and through vertically elongated slots 192 in a pair of bracket plates 194 rigidly fixed to and depending below the cross bridge 62. It is apparent, therefore, that the pressure roller 188 can move vertically toward and away from the rear supporting drum 148 for the conveyor belt 146.

The rotation axes of the drum 148 and the pressure roller 188 are located approximately in a common vertical plane. Threaded in the outboard ends of the pressure roller supporting shaft 190 are bolts 196 which extend upwardly from the shaft through holes in the cross bridge 62. These bolts mount coil springs 198 which resiliently urge the pressure roller 188 downwardly toward the conveyor belt 146. Downward movement of the pressure roller 188 under the action of the springs 198, is limited by engagement of the heads of the bolts 196 with the upper surface of the cross bridge 62. When the pressure roller is in its lower limiting position of FIGURES 6a and 10, the undersurface of the roller is spaced above the upper surface of the conveyor belt 146 a distance which is slightly less than the thickness of each preformed blank B. At this point, therefore, it is apparent that as each blank is ejected from the infeed station $S_1$, by the blank infeed mechanism 18, its leading edge enters between the conveyor belt 146 and the pressure roller 188. The conveyor belt is driven in a direction to feed the emerging blank forwardly through the gluing station.

Bolted to the upper surface of the cross bridge 62, and extending forwardly therefrom over the conveyor belt 146, is a supporting plate 200. Extending through this plate, along its longitudinal center line, is a long slot 202. Slideably seating against the undersurface of the forward end of the supporting frame 200, and extending forwardly of this plate, is a slide plate 204. A cross member 206 is rigidly fixed to the undersurface of the forward end of this slide plate and mounts, at its outboard ends, depending brackets 208. A second pressure roller 210 is located between the slide plate brackets 208 and is rotatably mounted on a shaft 212, the ends of which extend through vertically elongated slots 214 in the brackets 208, respectively. Bolts 216 are threaded in the outboard ends of the pressure roller supporting shaft 212 and extend upwardly therefrom through holes in the slide plate cross member 206. Mounted on these bolts are springs 218. Springs 218 urge the pressure roller 210 downwardly toward the underlying conveyor belt 146 to a lower limiting position wherein the heads of the bolts 216 engage the upper surface of the cross member 206 and the undersurface of the pressure roller 210 is spaced above the upper surface of the conveyor belt 146 a distance slightly less than the thickness of each preformed blank B. The pressure roller slide plate 204 is slideably secured to the supporting plate 200 by means of a plate 220 which slideably seats on the upper surface of the supporting plate 200 and is secured to the slide plate 204 by bolts and a key which extend through the slot 202 in the supporting plate. The forward pressure roller 210 retains each preformed blank B travelling through the gluing station $S_2$ in driving engagement with the conveyor belt 146 until the trailing end of the blank emerges from between the latter pressure roller and the conveyor belt. At this point, therefore, it is apparent that each blank B entering the gluing station $S_2$ from the infeed station $S_1$ is drivably engaged with the conveyor belt 146 upon entrance of the leading end of the blank between the rear pressure roller 188 and the conveyor belt. The blank remains in driving engagement with the conveyor belt until the trailing end of the blank emerges from between the forward pressure roller 210 and the conveyor belt. It is further apparent that the slide plate 204 and its retaining plate 220 together constitute a carriage 221 which slideably supports the forward pressure roller 210 on the supporting plate 200 for adjustment lengthwise of the upper run of the conveyor belt 146. Rearward adjustment of this carriage obviously shortens the distance through which each blank B is fed by the gluing station feed mechanism 20. Forward adjustment of the carriage increases the distance through which each blank is fed by the feed mechanism.

As will be explained later, this adjustment of the forward pressure roller 210 constitutes a changeover adjustment which is necessary to accommodate the machine to the different size preformed blanks B referred to earlier. Suffice it to say at this point that the pressure roller 210 is adjusted lengthwise of the conveyor belt 146 by means of a pressure roller positioning mechanism 222. This positioning mechanism forms part of the changeover mechanism of the machine and comprises a linear actuator including a double acting cylinder 224, the rear end of which is attached to a mounting block 226 seating against the undersurface of the supporting plate 200. Mounting block 226 is secured to a clamp block 228, seating on the upper surface of the supporting plate 200, by means of bolts which extend through the slot 202 in the latter plate. Cylinder 224 may thus be adjusted lengthwise of plate 200. After initial adjustment of the cylinder 224 relative to the supporting plate 200, the bolts which join the cylinder mounting block 226 and clamp block 228 are tightened to firmly clamp these blocks to the supporting plate. Cylinder 224 contains a piston having a piston rod 230 which extends forwardly from the cylinder and is attached, at its forward end, to a bracket 232 depending from the underside of the slide plate 232 of the forward pressure roller carriage 221. It is obvious, therefore, that admission of pressure fluid to the forward end of the actuator cylinder 224 drives the pressure roller carriage 221 rearwardly along the upper run of the conveyor belt 146. Admission of pressure fluid to the rear end of the cylinder drives the carriage forwardly along the conveyor belt. Fixed to the upper retaining block 220 of the carriage 221 is an upstanding, transverse stop plate 234. In one outboard end of this stop plate is threaded an adjustable stop screw 236. The forward pressure roller carriage 221 is movable, under the action of the pressure roller positioning actuator 222, between a forward limiting position, shown in the drawings, wherein the forward end of the carriage stop screw 236 engages a fixed upstanding stop 238 on the carriage supporting frame 200, and a rear limiting position, wherein the opposite end of the carriage stop plate 234 engages an adjustable stop screw 240 threaded in an upstanding bracket 242 on the supporting plate 200. When the pressure roller carriage 221 occupies its illustrated forward limiting position, the gluing station feed mechanism 20 is conditioned to feed the preformed blanks B of the 12½-pound containers, referred to earlier. When the carriage occupies its rear limiting position against the rear stop screw 240, the feed mechanism 20 is conditioned to feed the blanks of the 25-pound containers referred to earlier. The feed mechanism 20 is conditioned to feed the blanks for the No. 2 containers referred to earlier by adjusting the rear stop screw 240 forwardly, thereby to limit rearward travel of the pressure roller carriage 221 to an intermediate limiting position.

Extending between and rigidly secured to the longitudinal frame members 158 at the gluing station $S_2$, just rearwardly of the forward conveyor belt supporting drum 150, is a cross frame member 244. Fixed to the upper surface of this frame member is a conveyor belt supporting plate 246 which supports the upper run of the conveyor belt 146 from below, in the region just to the rear of the drum 150. The cross member 244 also mounts a roller 248 for guiding the upper run of the conveyor belt 146 onto the supporting plate 246. The forward drum 150 and the supporting plate 246 serve to support the upper run of the conveyor belt in the region opposite the forward pressure roller 210 in all of the three positions of adjustment of the roller described above.

At this point, therefore, it is obvious that the feed mechanism 20 at the gluing station $S_2$ is effective to convey each preformed blank B through the gluing station $S_2$ from the infeed station $S_1$ to the forming station $S_3$. The longitudinal frame members 158 at the gluing station comprise angles having upstanding flanges 158a, the upper edges of which flanges are located approximately in the plane of the upper run of the conveyor belt 146 and serve to slideably support each blank B adjacent its score lines $L_3$ and $L_4$ as the blank travels through the gluing station. During the passage of each blank through the gluing station, its panel joining flaps $F_b$ and $F_8$ are disposed in the narrow regions between the flanges 158*a* and the main longitudinal supporting members 48 of the machine frame 12. As noted earlier, the glue applicator mechanism 24 at the gluing station $S_2$ comprises a pair of cold glue applicators 26 and a pair of hot glue applications 28 for applying stripes of cold and hot glue $G_c$ and $G_h$, respectively, to the panel joining flaps of each blank B passing through the gluing station $S_2$. The cold glue applicators 26 are identical to that described in co-pending application Serial No. 407,834, now Patent No. 3,273,757, and entitled "Fluid Dispenser" and, therefore, will not be described in detail here. Suffice it to say that the cold glue applicators 26 include bodies 26a which are mounted on the supporting frame members 48 and are located in the regions between these frame members and the blank supporting flanges 158a of the adjacent inner longitudinal frame members 158. Extending from the lower end of the body 26a of each cold glue applicator is a tubular actuator 26b which is disposed to be engaged and deflected by the end panel joining flaps $F_b$ and $F_s$ of each blank passing through the gluing station. Each cold glue applicator is connected, via a conduit 26c, to a supply (not shown) of glue under pressure. As explained in the latter copending application, deflection of the actuator 26b of each cold glue applicator 26 by the end panel joining flaps on a passing preformed blank B opens valve means (not shown) contained within the applicator and results in the dispensing of cold glue onto the flaps.

The hot glue applicators 28 are similar to one another and each comprises a removable, self-contained dispensing unit 250. This removable dispensing unit includes a hot glue dispenser 252 proper, a supporting plate 254, and a sprocket frame 256 which are rigidly joined to one another. The supporting plate 254 of each dispensing unit 250 is removably secured by lower clamps 257 and upper clamp screws 258 to upstanding brackets 260 on the main longitudinal supporting frame members 48. The hot glue dispensers 252 proper are conventional and each includes a glue dispensing roller 262 located in the region between the adjacent frame member 48 and upstanding blank supporting flange 158a on the adjacent frame member 158. This roller turns on a horizontal axis extending normal to the direction of movement of the blanks through the gluing station $S_2$ and projects a distance below the respective hot glue dispenser 252 for peripheral engagement with the end panel joining flaps $F_e$ and $F_s$ of each preformed blank B passing through the gluing station $S_2$. Thus, each dispenser roller is rotated by and effectively rolls along the upwardly presented flap surfaces. In the peripheral edge of each dispensing roller 262 is a circumferential groove which becomes filled with hot glue as it rotates through the interior of the respective hot glue dispenser 252 and conveys the glue to the end panel joining flaps of each passing blank.

Rotatably supported in the rear end of the sprocket frame 256 of each hot glue dispensing unit 250 is a horizontal shaft 264 extending crosswise of the machine frame 12. A pair of sprockets 266 and 268 are fixed on this shaft. Rotatably supported in the forward end of the sprocket frame of each dispensing unit is a shaft 270 parallel to the shaft 264. A sprocket 272 is fixed on the shaft 270. Trained about the sprockets 266 and 272 is a sprocket chain 274. Contained within the housing of each hot glue dispenser 252 is a feed means (not shown) for longitudinally feeding into the respective dispenser a cord 276 of solid, thermoplastic glue. The glue cord 276 for each hot glue dispenser is wound on a reel 278 which is rotatably supported on the machine frame 12, adjacent the respective dispenser, in a manner to be explained shortly. As each glue cord 276 is fed into the respective hot glue dispenser 252, the glue in the cord is heated, and thereby liquified, by a heating element (not shown) contained within the dispenser. The means for feeding each glue cord 276 into its respective hot glue dispenser 252 is driven from the shaft 270 of the respective hot glue dispensing unit 250, through an intermediate magnetic clutch 280. As will appear presently, the shaft 270, which forms the input shaft of the clutch, is constantly driven in rotation. The magnetic clutch 280 on each dispensing unit 250 is controlled by a switch (not shown) which is contained within the respective hot glue dispenser 252 and controlled in response to the pressure of the hot glue within the respective dispenser, in such manner that the corresponding glue cord 276 is fed into the dispenser at the proper rate to maintain the dispenser full of hot liquid glue. The heating elements in the hot glue dispensers are controlled from control boxes 28a on the machine frame 12 (FIGURE 1).

Figure 13:
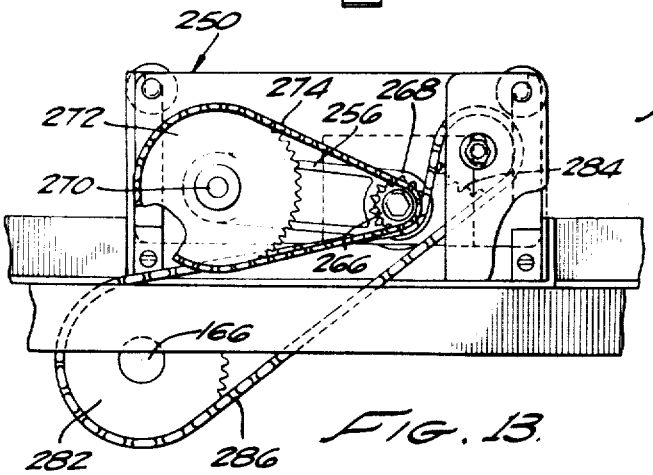
Figure 13A:
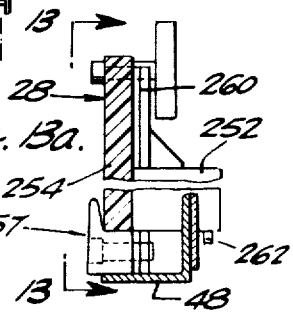
FIGURE 13a is a section taken on line 13a—13a in FIGURE 13.

Mounted on the outboard ends of the forward, drive shaft 156 for the conveyor belt 146 are sprockets 282. As may be best observed in FIGURE 3a, these sprockets are located forwardly of the hot glue dispensing units 250, respectively. Mounted on the machine frame 12, rearwardly of the dispensing units, are idler sprockets 284. Trained about each sprocket 282 and the adjacent idler sprocket 284 is a sprocket chain 286. As shown in FIGURE 13, the sprocket chains 286 are located below the outboard sprocket frames 256 of the hot glue dispensing units 250 and in vertical planes containing the sprockets 268 of these units. It is apparent, therefore, that the sprocket chains 286 are continuously driven from the main drive motor 178 of the forming machine. When each hot glue dispensing unit 250 is operatively positioned on the machine frame 12, its sprocket 268 drivably engages, from above, the upper run of the adjacent sprocket chain 286 and is thereby driven in rotation by the latter chain. It is apparent, therefore, that the glue cord feed means in each hot glue dispenser 252 is driven from the adjacent sprocket chain 286 through the sprocket 266, sprocket chain 274, and magnetic clutch 280 of the respective glue dispensing unit 250. Accordingly, during operation of the machine 10, the input shafts 270 of the magnetic clutches 280 are constantly driven in rotation, thereby to condition the hot glue dispensing units 250 for feeding the glue cords 276 into the hot glue dispensers 252 in response to the pressure of the hot liquid glue within the dispensers, as discussed above. As already noted, the hot glue dispensers 252 are conventional and, therefore, no further description thereof is deemed necessary.

At this point, it is apparent that during operation of the container forming machine 10, the infeed mechanism 18 at the blank infeed station $S_1$ successively feeds the preformed blanks B from the storage magazine 16 to the gluing station $S_2$. The feed mechanism 20 at the gluing station receives each blank from the infeed station and conveys the blank through the gluing station to the forming station $S_3$. During the passage of each blank through the gluing station, its end panel joining flaps $F_b$ and $F_s$ travel past the cold and hot glue applicators 26 and 28, respectively, and receive therefrom the stripes of cold and hot glue $G_c$ and $G_h$, respectively. As may be best observed in FIGURE 3a, the glue dispensing rollers 262 of the hot glue applicators 28 are offset, transverse to the direction of movement of the blanks B through the gluing station, relative to the actuators 26b of the cold glue applicators 26, whereby the hot and cold glue stripes applied to the flaps of each blank are laterally offset, as shown in FIGURE 2b.

The hot glue dispensing units 250 may be quickly removed for cleaning or servicing, when desired, by simply releasing the clamps 257 and 258 for these units and lifting the latter from the machine. In this regard, attention is directed to the fact that the sprockets 268 of the dispensing units merely seat on the upper runs of the sprocket chains 286 from which the sprockets are driven, whereby the sprockets may be disengaged from the sprocket chains by simply lifting the dispensing units from the machine, in the manner just mentioned. The dispensing units may be reinstalled on the machine by simply lowering the units into position on the machine frame 12 in such a way that the sprockets 268 reengage the upper runs of the sprocket chains 286. The cold glue applicators 26 may also be quickly and easily removed from the machine for cleaning or servicing by simply releasing the mounting screws for these applicators, as described in more detail in the aforementioned Patent No. 3,273,757.

FORMING STATION $S_3$

As noted earlier, the forming station $S_3$ comprises a forming mechanism 30 including a forming die 32 and a forming ram 34. Forming die 32 comprises a pair of side wall members or plates 300 disposed in parallel vertical planes extending lengthwise of the machine frame 12. Each side wall plate 300 is adjustably mounted on the machine frame by means of four bolts 302, the outer ends of which extend through holes in the frame angles 304 welded to the machine frame 12. The inner ends of the bolts 302 project through holes in hollow bosses 306 rigidly joined to the outer surfaces of the side wall plates 300, respectively. Snap rings 308 are fixed on the inner ends of the bolts, within these bosses, thereby to rotatably secure the bolts to the side wall plates. Threaded on each bolt 302, at opposite sides of the vertical flange of its respective frame angle 304, are a pair of nuts 310. The outer nuts 310 are welded to their respective adjacent frame angles 304. The inner nuts 310 comprise jam nuts which may be threaded tightly against the vertical flanges of their respective adjacent frame angles 304, thereby to secure the bolts 302 against rotation. It is apparent at this point, therefore, that the side wall plates 300 may be adjusted toward and away from one another, thereby to vary the spacing therebetween, by backing off the inner nuts 310 and rotating the side wall mounting bolts 102 in one direction or the other. The upper edges of the side wall plates 300 are bevelled slightly, as indicated at 312, for reasons to appear presently. These side wall plates form two sides of the generally rectangular forming cavity 32a in the forming die.

The remaining two sides of the forming cavity 32a are defined by a pair of forming rollers 314. Each of these forming rollers comprises a central shaft 316 which is rotatably supported at its outboard ends in bearings 318. Bearings 318 are supported on the horizontal, inwardly directed flanges of the frame angles 304 and are secured to these flanges by bolts 320. The bearing mounting bolts 320 extend through longitudinal slots in the frame angles 304, thereby to permit adjustment of the forming rollers 314 toward and away from one another to vary the spacing therebetween. This adjustment of the forming rollers is accomplished by rotation of adjusting screws 322 which are threaded on the frame angles 304 and operatively connected to the forming roller bearings 318. Mounted on the shaft 316 of each forming roller 314 are a pair of generally cylindrical forming members 324 each including a circular, peripherally bevelled flange 326 and a cylindrical shoulder 328 extending inwardly from the flange. The forming members 324 are secured to their respective forming roller shaft 316 by clamp screws 330 which may be released to permit adjustment of the forming members on each shaft toward and away from one another, thereby to vary the axial spacing therebetween. As shown in FIGURE 6a, the vertical side edges of the forming die side wall plates 300 are relieved to accommodate the forming members 324, thereby to permit adjustment of the forming rollers 314 toward and away from one another, in the manner explained above. The forming rollers are located some distance below the upper edges of the side wall plates, as shown.

Figure 12:
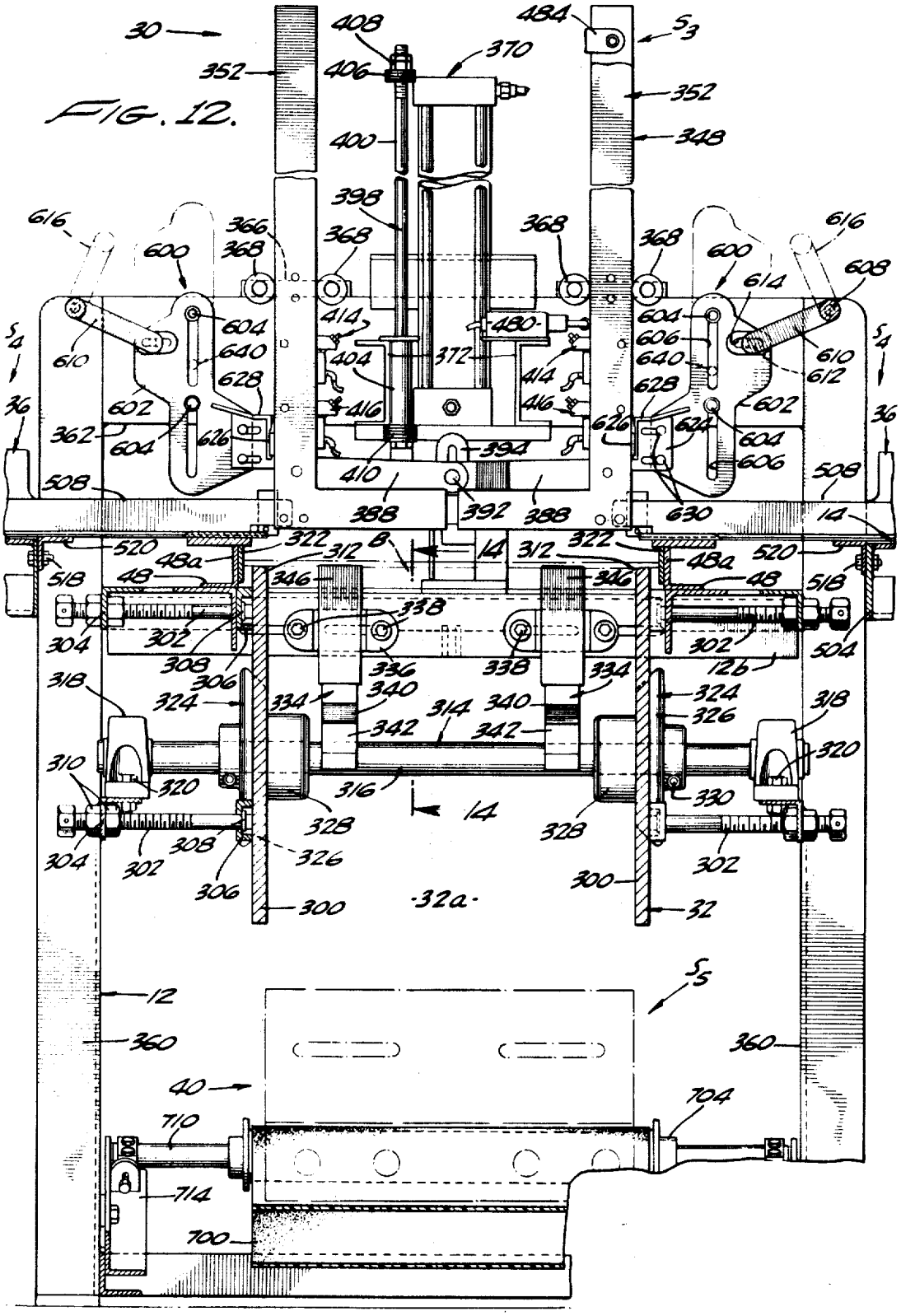

It will be recalled that during movement of each preformed blank B through the gluing station $S_2$, the blank is supported by the upper edges of the flanges 158a on the frame flanges 158. The upper edges of these flanges and the upper edges of the forming die side wall plates 300 are located in a common horizontal plane. Accordingly, during movement of each preformed blank B from the gluing station $S_2$ to the forming station $S_3$, in the manner explained above and hereinafter described in greater detail, the blank can slide, without interference, along the upper edges of the angle flanges 158a at gluing station onto the upper edges of the forming die side wall plates 300 at the forming station. FIGURE 12 illustrates, in phantom lines, a blank B thus supported on the upper edges of the side wall plates. As shown in this latter figure, the main supporting angles 48 on the machine frame 12 have vertical flanges 48a which rise above the common horizontal plane of the upper edges of the forming die side wall plates 300 and the frame angles 158. The angle flanges 48a are spaced a distance just slightly greater than the width of each blank B and serve to guide each blank during its movement through the gluing station $S_2$ to the forming station $S_3$. To this end, wear strips 332 are welded to the inner surfaces of the angle flanges 48a.

Located between the forming shoulders 324 on each forming roller 314 are a pair of panel folding and deflecting assemblies 334 whose function will be explained presently. Suffice it to say at this point that each folding assembly 334 comprises a housing 336 which is adjustably secured to the adjacent transverse frame member 12b or 12e, as the case may be, by bolt and slot connections 338, whereby each holding assembly 334 may be adjusted along its respective frame member. Pivotally mounted at their upper ends within the housing 336 of each holding assembly are a pair of depending upper and lower panel deflectors 340 and 342 which are resiliently urged toward the die cavity 32a by springs 344. The lower ends of the panel deflectors 340, 342, are bent inwardly of the die cavity and then outwardly, at their lower extremity, to provide each deflector with an upwardly presented, inwardly sloping surface. Rigidly secured to the housing 336 of each holding assembly 334, above the panel holding deflectors 340, 342, is an arcuate panel folding strip 346 whose upper end curves outwardly, away from the die cavity 32a and over the adjacent forming roller 314, and is approximately tangent to the common plane of the upper edges of the forming die side wall plates 300.

Figure 19:
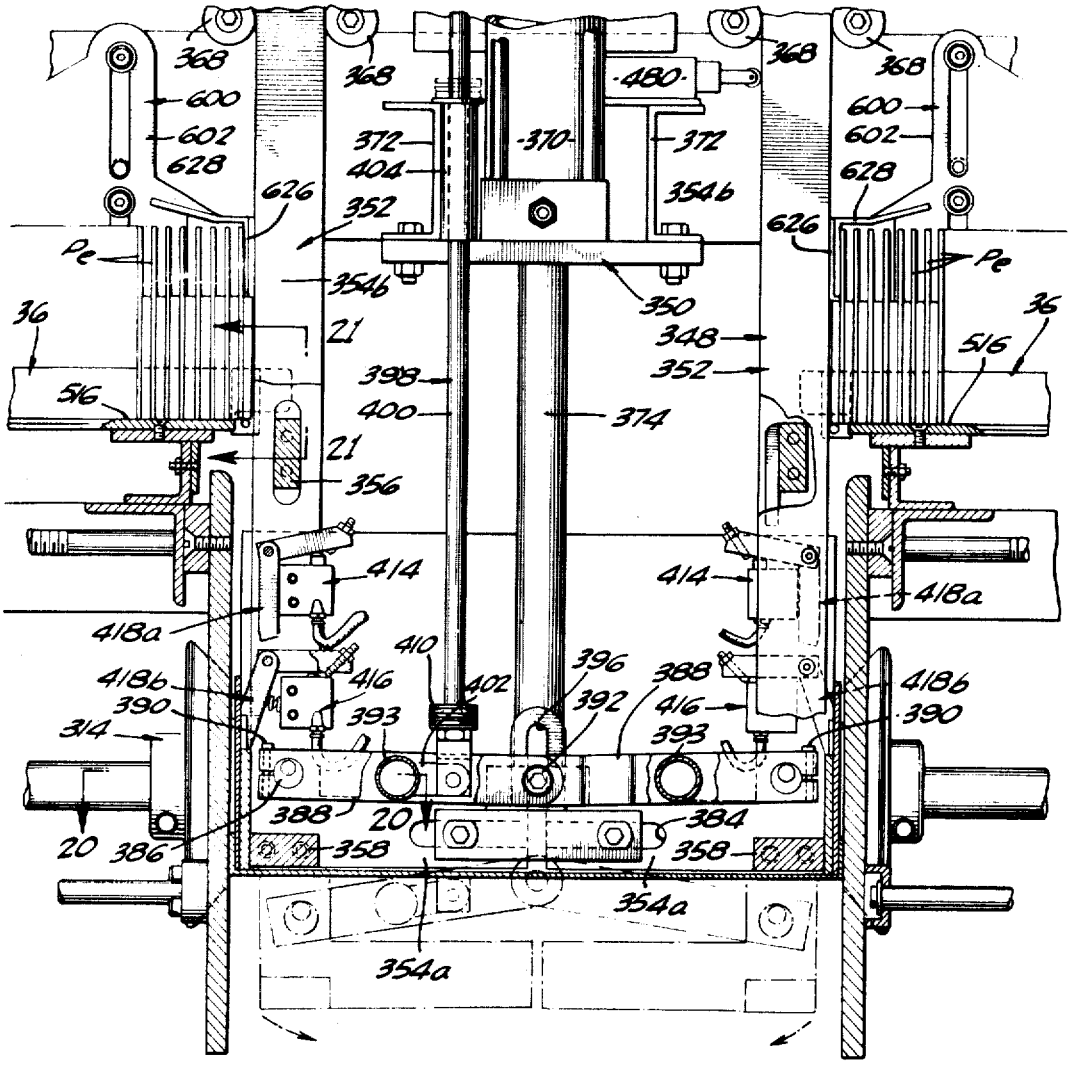
FIGURE 19 is an enlargement of the upper portion of FIGURE 12 with parts broken away, and illustrating the forming mandrel descending in its forming stroke to form a container.

The forming ram 34 comprises a mandrel 348 of generally rectangular outline in horizontal section and a fluid pressure actuator 350 for driving the mandrel vertically between an upper, retracted position, shown in FIGURE 12, wherein the lower or leading end of the mandrel is retracted out of the forming cavity 32a and is located a distance above the upper edges of the forming die side wall plates 300, and a lower, extended position, shown in FIGURE 19, wherein the lower leading end of the mandrel projects into the forming cavity. The forming mandrel 348 comprises a pair of similar, generally L-shaped side frames 352 each including a pair of generally L-shaped frame bars 354 rigidly joined by cross-bars 356 and 358. These mandrel frames are located at opposite sides of the vertical center line of the forming cavity 32a. The L-shaped frame bars 354 include lower, generally horizontal, inwardly directed ends 354a and generally vertical, upwardly extending ends 354b.

Rigid on the machine frame 12, at opposite sides of the forming station $S_3$, are a pair of upstanding supporting frame members 360, the lower ends of which extend to the floor level to form supporting legs for the forward end of the frame. The upper ends of the frame members 360 extend a distance above the frame 12. The upper ends of the frame members 360 at one side of the machine frame 12 are rigidly joined to the upper ends of the frame members at the opposite side of the machine frame by relatively massive channel-shaped cross-beams 362 which extend transversely across the frame, a distance above the upper surface thereof. Secured by bolts 64, to the upper surfaces of these cross-beams are plates 366 each mounting a pair of rollers 368. Rollers 368 straddle the upwardly extending ends 354b, respectively, of the L-shaped mandrel frame bars 354 and serve to guide the mandrel 348 in its vertical movement between the extended and retracted positions thereof, discussed above. The bolt 364 which secure the roller mounting plates 366 to the cross-beams 362 extend through slots in both the mounting plates and cross-beams, whereby each pair of mandrel guide rollers 368 may be adjusted both crosswise and lengthwise of the machine frame 12.

The mandrel actuator 350 comprises a vertical, double-acting cylinder 370 which is located within the mandrel 348, approximately along its vertical center line and that of the forming cavity 32a. The actuator cylinder 370 is rigidly mounted between a pair of channels 372 which are firmly joined, at their ends, to the cross-beams 362. Movable within the cylinder 370 is a piston having a piston rod 374 which extends below the lower end of the cylinder. Rigidly mounted on the lower extremity of the piston rod 374 is a cross-head 376 which extends in the fore and aft direction of the machine frame 12 and terminates, at its outboard ends, in parallel cross-arms 378 extending crosswise of the machine frame. The laterally outer ends of these cross-arms have openings to receive cap screws 380 which are rigidly secured to the arms by the illustrated nuts. The heads 382 of the cap screws 380 project beyond the outer surfaces of the cross-arms 378, and slideably engage in grooves 384 which are milled in the inner surfaces of the inwardly extending ends 354a on the L-shaped mandrel frame bars 354. This engagement of the cap screw heads 382 in the frame bar slots 384 provides a driving connection between the mandrel 348 and the piston rod 374 of the mandrel actuator 350, whereby the mandrel is adapted to be driven vertically by the actuator.

Extending between and eccentrically rotatably mounted at their ends on the vertical frame legs of the mandrel 348, adjacent the lower ends of these legs, are pivot shafts 386. Indicated at 388 are four toggle arms, the outer ends of which are mounted on the pivot shafts 386, respectively. These outboard ends of the toggle arms are longitudinally slotted, as shown, and mount clamp screws 390 which are normally tightened to firmly clamp the arms to the pivot shafts. The inner ends of the adjacent toggle arms 388 are pivotally connected by bolts 392. The two toggle arms 388 which extend inwardly from each side frame 352 of the mandrel 348 are rigidly joined by an interconnecting tubular strut 393. Welded to the outboard ends of the cross-head 376 on the piston rod 374 of the mandrel actuator 350, just inwardly of the pivotally connected ends of the toggle arms 388, are upstanding brackets 394 having slots 396 extending parallel to the direction of movement of the mandrel. The bolts 392 which pivotally connect the adjacent ends of the toggle arms have smooth cylindrical ends 392a which project inwardly from the toggle arms into the bracket slots 396, respectively. The toggle arms 388 are operatively connected to the machine frame by a lost motion connection 398. This lost motion connection comprises a vertical connecting rod 400, the lower end of which is pivotally connected to an arm 402 rigid on one of the toggle arm connecting struts 393. The upper end of the connecting rod 400 extends slideably through, and above, a sleeve bearing 404 secured to one of the supporting channels 372 for the hydraulic cylinder 370. Adjustably mounted on the upper end of the connecting rod, above the bearing 404, is a resilient stop shoulder 406 backed up by lock nuts 408 threaded on the connecting rod. A second adjustable resilient stop shoulder 410 is mounted on the connecting rod below the bearing 404. The stop shoulders 406 and 410 are so adjusted along the connecting rod 400 that the upper stop shoulder 406 engages the upper end of the connecting rod bearing 404 during downward movement of the forming mandrel 348 from its retracted position to its extended position. The lower stop shoulder 410 engages the lower end of the bearing during upward movement of the mandrel from its extended position to its retracted position.

Assume that pressure fluid is supplied to the lower end of the mandrel actuating cylinder 370, thereby to cause upward movement of the forming mandrel 348 to its upper retracted position. During this upward movement of the mandrel, the lower stop shoulder 410 on the connecting rod 400 engages the lower end of the connecting rod bearing 404. Continued upward movement of the mandrel beyond this position of engagement of the stop shoulder with the bearing causes downward pivotal movement of the toggle links 388 to their lower limiting positions, shown in solid lines in FIGURE 19, wherein the inner cylindrical ends 392a of the toggle arm connecting bolts 392 engage the lower ends of the slots 396 in the cross-head brackets 394. In the ensuing description, the positions occupied by the toggle arms 388 at this time are referred to as their extended positions. Assume now that pressure fluid is admitted to the upper end of the actuator cylinder 370, thereby to drive the mandrel downwardly from its retracted position to its extended position. During this downward movement of the mandrel, the upper stop shoulder 406 on the connecting rod 400 eventually engages the upper end of the connecting rod bearing 404. Continued downward movement of the mandrel beyond this position of engagement of the upper stop shoulder with the bearing results in upward pivotal movement of the toggle arms 388 from their extended positions to their positions illustrated in phantom lines in FIGURE 19, wherein the cylindrical ends 392a of the toggle arm connecting bolts 392 engage the upper end of the cross-head bracket slots 396. In the ensuing description, these latter positions of the toggle arms are referred to as their retracted positions. Subsequent upward retraction of the mandrel 348 to its retracted position reengages the lower stop shoulder 410 on the connecting rod 400 with the lower end of the connecting rod bearing 404 and thereby returns the toggle arms 388 to their extended positions. At this point, it is significant to note that during downward pivotal movement of the toggle arms 388 from their retracted positions to their extended positions, the arms move slightly past dead center. It is also significant to note that pivotal movement of the toggle arms from their retracted positions to their extended positions moves the lower ends of the mandrel side frames 352 outwardly toward the side wall plates 300 of the forming die 32, while pivotal movement of the toggle arms from their extended positions to their retracted positions draws the lower ends of the mandrel side wall frames inwardly away from the side wall plates 300. During this inward and outward movement of the mandrel side frames 352, the vertical ends 354b of the L-shaped mandrel frame bars 354 effectively swing or rotate about their points of engagement with their respective guide rollers 368. In the present forming machine, sufficient clearance is provided between the guide rollers and the frame bar ends 354b to accommodate this limited inward and outward pivotal movement of the mandrel side frames.

Figure 15:
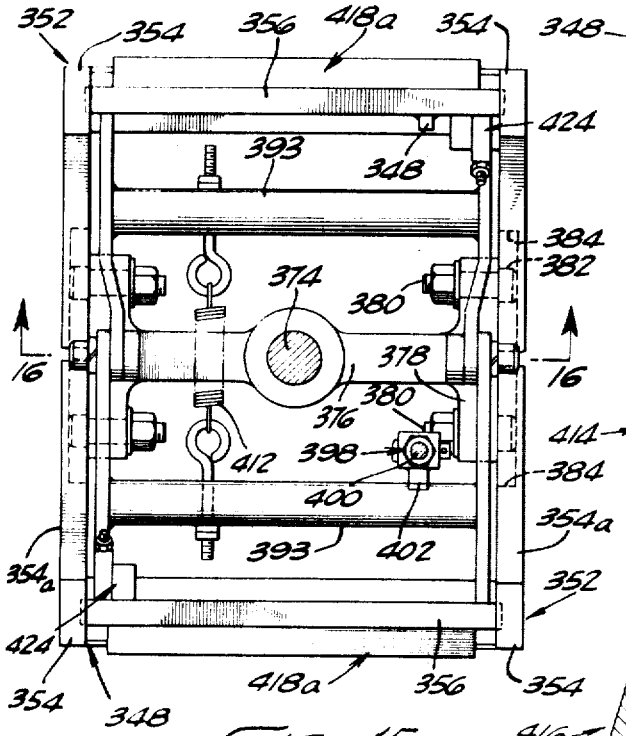
FIGURE 15 is a top plan view of the forming mandrel embodied in the forming machine.

Indicated at 412 in FIGURE 15 is a spring which is connected between the toggle arm connecting struts 393. This spring yieldably retains the toggle arms 388 in their extended positions during downward movement of the mandrel 348 to its extended position until the upper connecting rod stop 406 bottoms against the upper end of the connecting rod bearing 404 to retract the toggle arms. Thereafter, the spring 412 yieldably retains the toggle arms in their retracted positions during the subsequent upward stroke of the mandrel until the lower connecting rod stop 410 bottoms against the lower end of the connecting rod bearing 404 to return the toggle arms to their extended positions.

Figure 17:
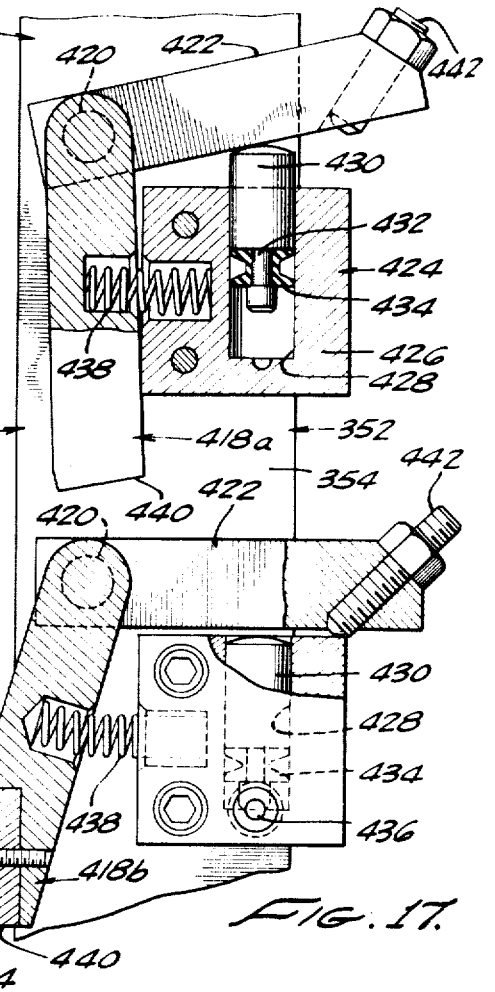
FIGURE 17 is an enlarged section taken on line 17—17 in FIGURE 16.
Figure 16:
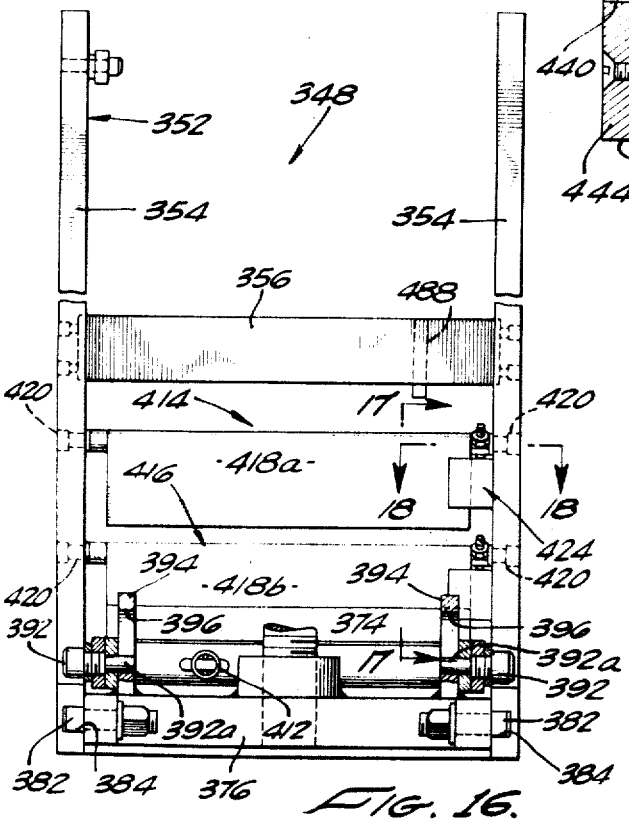
FIGURE 16 is a side elevation of the forming mandrel.
Figure 18:
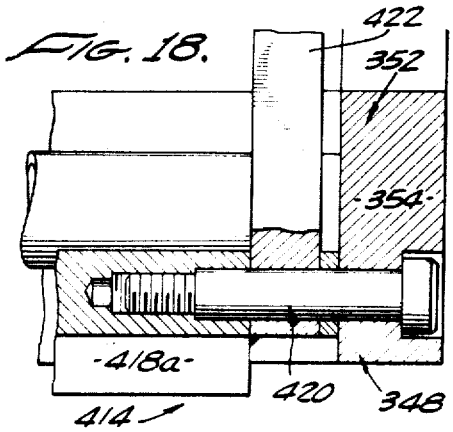
FIGURE 18 is an enlarged section taken on line 18—18 of FIGURE 16.

During operation of the present container forming machine 10, each downward stroke of the forming mandrel 348 is effective to force a preformed blank B and a pair of end panels $P_e$ downwardly into the forming cavity 32a in such manner as to cause the side wall and cover forming panels $P_s$ and $P_c$ to be folded upwardly about the ends of the end panels, as explained earlier and hereinafter discussed in greater detail. The blank B is forced into the forming cavity by the lower, leading end of the mandrel 348. Mounted on the forming mandrel 348 is a pair of upper retractable thrust shoulder assemblies 414 and a pair of lower retractable thrust shoulder assemblies 416 which are selectively extendable to drive a pair of end panels $P_e$ into the forming cavity 32a during each downward stroke of the mandrel. The upper and lower thrust shoulder assemblies include upper thrust shoulders 418a and lower thrust shoulders 418b, respectively, which extend horizontally between the vertical ends 354b, respectively, of the L-shaped mandrel frame bars 354 and are pivotally mounted on these vertical bar ends by pivots 420 located adjacent the upper edges of the respective thrust shoulders. Except for the slightly different shape and construction of the upper and lower thrust shoulders 418a and 418b, the thrust shoulders 414 and 416 are identical. Each thrust shoulder assembly includes, in addition to its pivoted thrust shoulder, an inwardly directed arm 422 which is secured to one end of the respective thrust shoulder and a thrust shoulder positioning means 424. The positioning means 424 of each thrust shoulder assembly comprises a housing 426 which is secured to the vertical frame bar end 354b adjacent the respective thrust shoulder arm 422 and in a position below this arm. Housing 426 has a bore 428 opening through the upper end of the housing and slideably containing a piston 430. Extending coaxially from the lower end of the piston 430 is a reduced diameter, terminally shouldered stem 432 mounting a resilient seal 434 which slidably engages the wall of the bore 428. Housing 426 has a fluid pressure inlet 436 through which pressure fluid may be admitted into the bore 428, below the piston 430, for urging the latter upwardly against the adjacent thrust shoulder arm 422, thereby to rotate the lower end of the respective thrust shoulder 418a or 418b inwardly with respect to the forming mandrel 348 to the position in which the upper thrust shoulder 418a is illustrated in FIGURE 17. This position of each thrust shoulder is hereinafter referred to as its retracted position. Acting between each thrust shoulder 418a and 418b, and the housing 426 of its respective positioning mechanism 424, is a spring 438 which urges the respective thrust shoulder outwardly to the position in which the lower thrust shoulder 418b is illustrated in FIGURE 17. In the ensuing description this position of each thrust shoulder is referred to as its extended position. Each upper thrust shoulder 418a has a forwardly presented shoulder surface 440 facing the leading end of the forming mandrel 348. Each lower thrust shoulder is relieved, as shown, to provide it with an upper thrust shoulder surface 440 and mounts a removable filler plate 444, the lower edge of which forms a lower shoulder surface 440 on the thrust shoulder. At this point, it is significant to note that when the thrust shoulders occupy their extended positions, their respective shoulder surfaces 440 project outwardly beyond the adjacent vertical side of the forming mandrel, that is to say, beyond the common plane of the vertical edges on the L-shaped mandrel frame bars 354. When the thrust shoulders are retracted their shoulder surfaces are located inwardly of the adjacent vertical side of the mandrel. Threaded in the extermity of each thrust shoulder arm 422 in an adjustable stop screw 442 which is engageable with the housing 426 of the adjacent thrust shoulder positioning mechanism 424 for limiting outward extension of the respective thrust shoulder under the action of its biasing spring 438. It is apparent that the stop screws 442 are adjustable to vary the horizontal projection of the thrust shoulders beyond the vertical sides of the forming mandrel 348 when the thrust shoulders are extended. At this point, it is apparent that the upper thrust shoulders 418a and the lower thrust shoulders 418b are retracted, the forming and retracted by supplying pressure fluid to or venting the respective piston bores 428.

The upper and lower thrust shoulders 418a and 418b are selectively extended and retracted to adapt the forming mechanism 30 to different size end panels. Thus, when the upper thrust shoulders 418a are extended and the lower thrust shoulder 418b are retracted, the forming mechanism is conditioned to accommodate the end panels for the 25-pound containers, referred to earlier. When the upper thrust shoulders are retracted and the lower thrust shoulders are extended, as shown in FIGURE 17, the forming mechanism is conditioned to accommodate the end panels for 12½-pound containers. The forming mechanism is conditioned to accommodate the end panels for No. 2 containers by extending the lower thrust shoulders and removing their filler plates 444, thereby to expose the upper shoulder surfaces on their latter thrust shoulders. It is apparent, therefore, that the thrust shoulder assemblies 414 and 416 constitute a part of the changeover mechanism, mentioned earlier, and that selective extension and retraction of these assemblies constitutes a changeover adjustment.

It will be recalled that adjustment of the forward pressure roller 210 at the gluing station $S_2$ is effective to vary the distance through which each preformed blank B entering the gluing station from the blank infeed station $S_1$ is fed by the feed mechanism 20 at the gluing station. It will further be recalled that the forward pressure roller is selectively presettable to any one of three different positions depending upon the size of the particular preformed blanks on which the machine is to operate, i.e., blanks for 12½-pound containers, No. 2 containers, or 25-pound containers. The various stops, described earlier, which are embodied in the feed mechanism 20 and determine these various positions of the forward pressure roller 210 are so adjusted that in each position of the pressure roller, the feed mechanism is conditioned to feed a preformed blank B of the corresponding size from the gluing station to a position at the forming station $S_3$ wherein the blank is supported on the upper edges of the forming die side wall plates 300 and the bottom wall forming panel $P_b$ of the blank is centered over the forming cavity $32_a$. In the ensuing description, this position to which each preformed blank B is fed by the gluing station feed mechanism 20 is referred to as an initial forming position. The forming die side wall plates 300 are adjusted, in the manner explained earlier, to positions wherein the spacing between the inner surfaces of the plates is just slightly greater than the spacing between the score lines $L_3$ on each blank B, whereby the upper edges of the side wall plates engage each blank in said initial forming position along its end panel joining flaps $F_b$, just outward of the score lines $L_3$ on the blank.

In actual practice, the momentum of each blank emerging from the feed mechanism 20 of the gluing station $S_2$ tends to carry each blank forwardly beyond its initial forming position at the forming station $S_3$. For this reason, the machine is equipped with a limit stop means 446 against which the leading edge of each blank delivered to the forming station engages upon arrival of the respective blank and its initial forming position and which is effective to prevent forward travel of the blank beyond its initial forming position. Limit stop means 446 comprises a supporting plate 448 which is located approximately on the longitudinal center line of the machine frame 12 and is secured at opposite ends to the cross member 12b and the adjacent end member 12f of the frame. Slidably supported on the upper surface of this supporting plate is a carriage plate 450 which is secured to the supporting plate by bolts 452 extending through a longitudinal slot 454 in the carriage plate. The carriage plate 450, therefore, is movable toward and away from the forming mechanism 30. Seating on top of the carriage plate 450 is a bar 456 which is secured to the carriage plate by bolts 458 extending through longitudinal slots 460 in the bar, whereby the latter is longitudinally adjustable relative to the carriage plate. After initial adjustment of the bar 456, the latter is firmly clamped to the carriage plate by tightening the bolts 458. Rigidly secured to and rising from the bar 456 is an upstanding angle bracket 462 having a rear, rearwardly presented flange 462a. This flange forms a limit stop which engages the leading edge of each blank arriving at its initial forming position at the forming station $S_3$, thereby to prevent forward travel of the bank beyond said position. Each of the three different bank sizes upon which the forming machine 10 is designed to operate requires a different setting of the limit stop 462a. This adjustment of the limit stop is accomplished by positioning of the limit stop carriage plate 450.

To this end, the limit stop means 446 includes a limit stop positioning means 464 comprising a linear actuator including a double acting cylinder 466 located below the carriage supporting plate 448. The rear end of this cylinder is attached to the cross member 12b of the machine frame 12. Movable in the cylinder is a piston having a piston rod 468 which extends forwardly from the cylinder and is attached, at its forward end, to a depending bracket plate 470 rigidly secured to the forward end of the limit stop carriage plate 450. It is apparent, therefore, that the admission of pressure fluid to the rear end of the actuator cylinder 466 drives the carriage plate 450 forwardly, thereby moving the limit stop 462a away from the forming mechanism 30. Admission of pressure fluid to the forward end of the cylinder drives the carriage plate rearwardly, thereby moving the limit stop 462a toward the forming mechanism.

Threaded in the depending carriage bracket 470 is an adjustable stop screw 472, the rear end of which is engageable with the forward cross member 12f on the machine frame 12 to limit rearward movement of the carriage plate 450 and its limit stop 462a toward the forming mechanism 30 to the position shown in FIGURE 6a. Forward movement of the carriage plate and limit stop is limited by engagement of the rear carriage plate mounting bolt 452 with the rear end of the carriage plate slot 454. When in its rear limiting position, shown in FIGURE 6a, the limit stop 462a is properly positioned to locate the preformed blanks B for 12½-pound containers in their initial forming position at the forming station $S_3$. When in its forward limiting position, the limit stop is properly positioned to locate the preformed blanks for 25 pound containers in their initial forming position at the forming station. When the machine is to form No. 2 containers, the adjustable stop screw 472 on the limit stop carriage 450 is adjusted rearwardly relative to the carriage plate bracket 470, thereby to limit rearward movement of the limit stop 462a to an intermediate position, wherein the stop is properly positioned to locate the preformed blanks for the No. 2 containers in their initial forming position at the forming station. Thus, the adjustable limit stop means 446 forms a part of the changeover mechanism of the machine and the above-described adjustment of its limit stop 462a constitutes a changeover adjustment.

At this point, therefore, it is apparent that preformed blanks B are successively fed from the blank infeed station $S_1$, through the gluing station $S_2$, to an initial forming position at the forming station $S_3$, wherein the leading end of the blank engages against the limit stop 462a, and the end panel joining flaps $F_b$ are supported on the upper edges of the forming die side wall plates 300, just outboard of the score lines $L_3$ on the blank, with the central, bottom wall forming panel $P_b$ centered over the forming cavity 32a.

The forming mandrel 348 remains in its upper, retracted position until each blank arrives at this initial forming position and then descends to force the blank, and the pair of end panels $P_e$, into the die cavity. Each such downward forming stroke of the mandrel is triggered by movement of a preformed blank B into its initial forming position at the forming station $S_3$. To this end, there is mounted on the upstanding angle bracket 462 of the limit stop means 446 an electrical switch 474 including a pivoted, depending operating arm 476. The lower end of this switch operating arm is disposed for engagement by the leading end of each blank arriving at its initial forming position at the forming station, just prior to engagement of the leading end of the blank with the limit stop 462a. Continued forward movement of the blank from its position of initial engagement with the switch arm 476 to its final position of engagement with the limit stop 462a swings the switch arm forwardly, thereby operating the switch 474. As will be explained presently, this operation of the switch effects the admission of pressure fluid to the upper end of the forming mandrel actuating cylinder 370, thereby to cause downward movement of the forming mandrel 348 from its upper retracted position to its lower extended position.

Mounted on the upper flange of one of the supporting channels 372 for the mandrel cylinder 370 are a pair of electrical switches 478 and 480. Switch 478 includes an operating arm 482 which is disposed for engagement by a switch operating roller 484 mounted on the vertical end 354b of one of the L-shaped mandrel frame bars 354. The switch operating roller 484 is located adjacent the upper end of its respective bar end 354b in such manner that the roller engages the switch arm 82, to operate the switch 478, upon movement of the mandrel 348 into its lower extended position. As will be explained presently, this operation of the switch 478 by the roller 484 effects venting of the upper end of the mandrel cylinder 370 and admission of pressure fluid to the lower end of the cylinder, thereby to return the mandrel 348 to its upper retracted position.

The second switch 480 includes an operating arm 486 which is disposed for engagement by a plate 488 on another vertical 354b of one of the L-shaped mandrel frame bars 354. This switch plate is also located adjacent the upper end of its respective frame bar end 354b in a position such that the plate engages the switch arm 486 during the downward travel of the forming mandrel 348 to its lower extended position. As will be explained later in the description of the end panel infeed station $S_4$, this operation of the switch 480 activates the end panel infeed mechanism 38 of each end panel infeed station.

At this point, therefore, it is apparent that the preformed blanks B are successively ejected, by the blank infeed mechanism 18, from the blank infeed station $S_1$ to the gluing station $S_2$ and are thereafter conveyed, by the gluing station feed mechanism 20, through the latter station to the initial forming position at the forming station $S_3$. As each blank travels through the gluing station, its end panel joining flaps $F_b$ and $F_s$ are coated with stripes of hot and cold glue $G_h$ and $G_c$ by the glue applicator mechanism 24. Upon arrival of each glue-coated blank at its initial forming position at the forming station, the blank actuates the mandrel extension switch 474 to initiate downward movement of the forming mandrel 348 to its extended position. The glue-coated blank currently at the forming station, along with two end panels $P_e$, are thereby forced downwardly into the forming die cavity $32_a$. Upon arrival of the forming mandrel at its lower extended position, the mandrel retraction switch 478 is operated by the roller 484 on the mandrel to return the latter to its upper retracted position.

END PANEL INFEED STATION $S_4$

Figures 22, 23, 24:
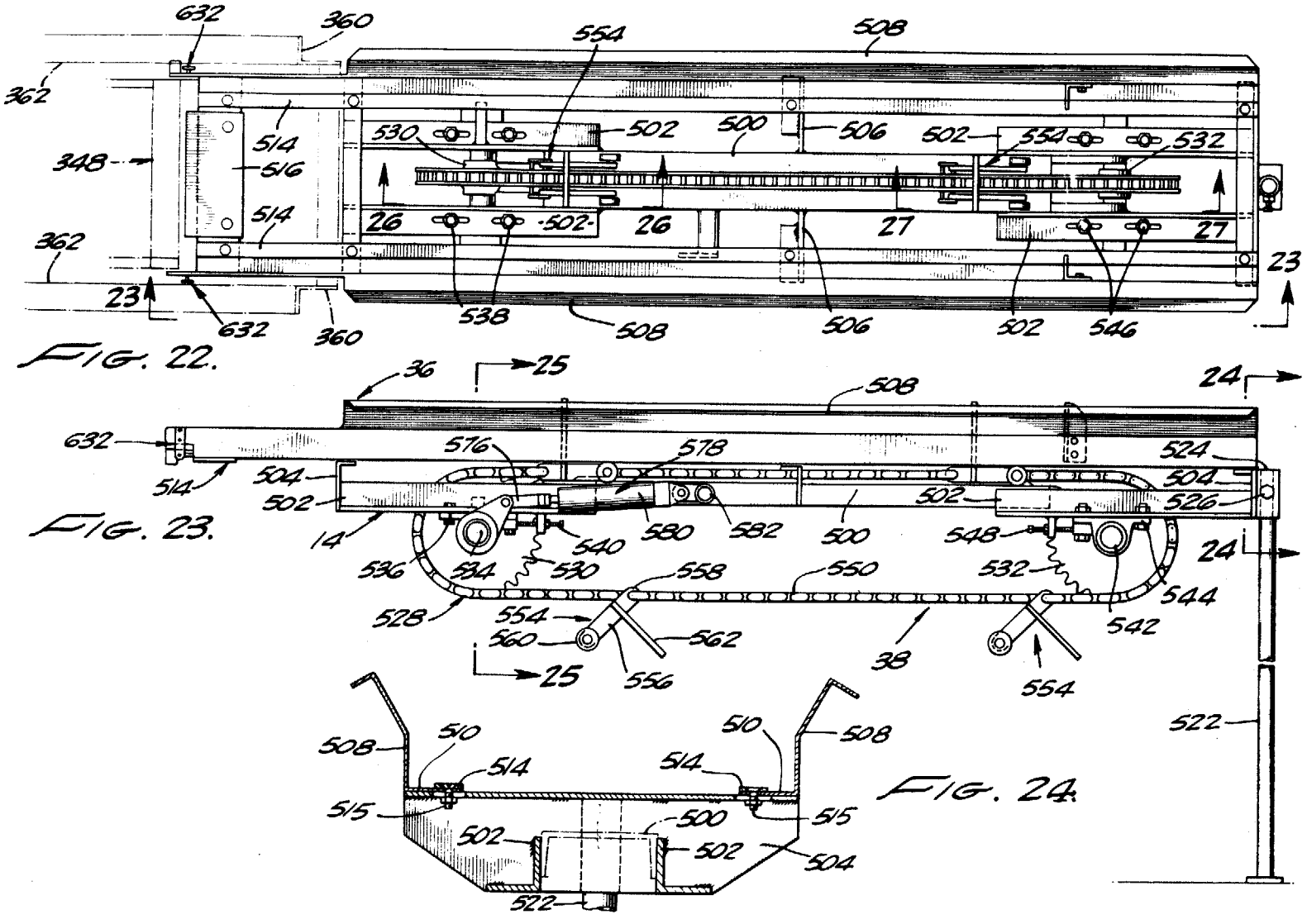
FIGURE 22 is an enlarged plan view of one of the end panel infeed mechanisms embodied in the forming machine.
FIGURE 23 is a view looking in the direction of the arrows on line 23—23 in FIGURE 22.
FIGURE 24 is a section taken on line 24—24 in FIGURE 23.
Figure 25:
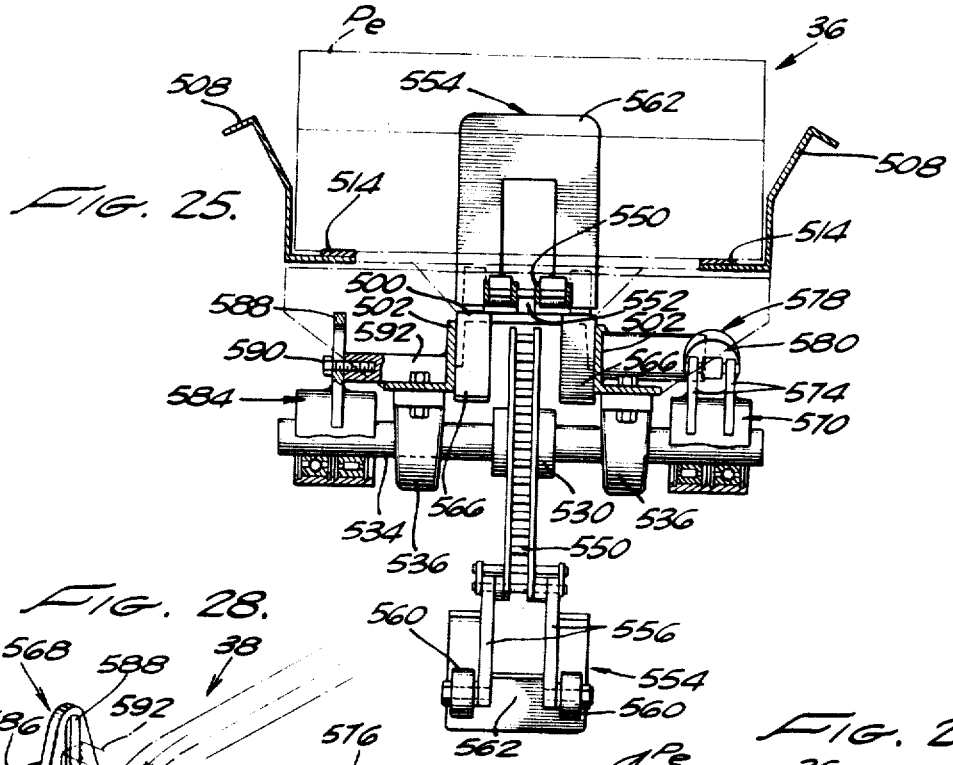
FIGURE 25 is an enlarged section taken on line 25—25 in FIGURE 23.
Figure 28:
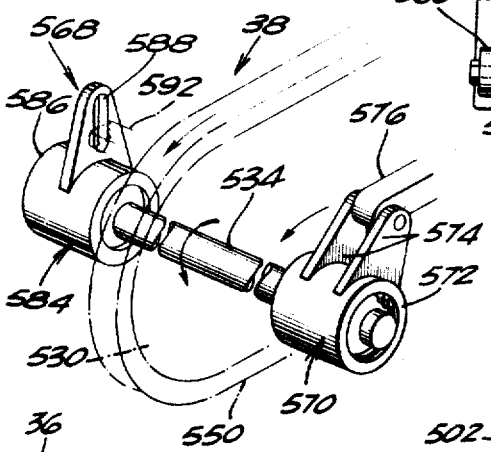
FIGURE 28 is a perspective view of certain elements of the end panel infeed mechanism.

As noted earlier, the end panel infeed stations $S_4$ are substantially identical and each includes a frame 14 which extends laterally out from one side of the main machine frame 12 and mounts an end panel storage magazine 36 and an end panel infeed mechanism 38 for successively feeding the end panels from the magazine 36 to the forming station $S_3$. The frame 14 of each end panel infeed station comprises a main supporting channel 500, the open side of which faces downwardly. Extending from each end of the channel, and welded to the flanges thereof, are a pair of angles 502. The outboard ends of each pair of adjacent angles are rigidly joined by cross-members 504. Additional cross-members 506 are welded to the opposite flanges of the channel 500 and extend outwardly therefrom. The end panel storage magazine 36 of each end panel infeed station comprises a pair of sheet metal side walls 508 which extend lengthwise of the respective infeed frame 14 and are bent to the configuration best illustrated in FIGURE 24. These magazine side walls include lower inturned flanges 510 which rest on the cross-members 504 and 506 of the infeed frame 14. The wall flanges are secured to the cross-members by bolts 515 which extend through slots in the cross-members, thereby to permit the spacing between the magazine walls 508 to be adjusted. In actual practice, these walls are adjusted to a spacing which is just slightly greater than the length of the end panels $P_e$ which are to be stored in the magazine. The magazine walls 508 and the wear strips 514 extend the full length of the infeed frame 14 and project a distance beyond the inner end of this frame. However, the upper, outwardly flaring portions of the magazine walls 508 are cut away beyond the inner end of the infeed frame. Secured to the undersurfaces of the flanges 510 on the extending inner ends of the magazine walls 508 is a cross-plate 514. A wear plate 516 is secured to the upper surface of this cross-plate, in the region between the wall flanges 510. As shown in FIGURES 22 and 23, the vertical portions of the magazine walls 508 extend inwardly a short distance beyond the cross-plate 514. The lower wall flanges 510, however, terminate at the inner edge of this cross-plate.

The inner end of each end panel infeed frame 14 is supported by and secured to the main machine frame 12. In this regard, attention is directed to FIGURE 12 wherein it will be observed that the inner cross-members 504 on the end panel infeed frames 14 seat against and are secured by bolts 518 to angles 520 which extend between and are welded at their ends to the forward frame legs 360. The inner extending ends of the end panel magazine walls 508 extend inwardly of the main machine frame 12, and to straddling relation with the forming mandrel 348, and are supported on the main frame angles 48 and 520. The outer end of each end panel infeed frame 14 is supported on a standard 522, the upper end of which extends through a sleeve 524 welded to the outer cross-member 504 of the frame. This sleeve carries a clamp screw 526 which may be tightened against the standard 522 to rigidly secure the end panel infeed frame to the standard.

The end panel infeed mechanism 38 at each end panel infeed station $S_4$ comprises an infeed conveyor 528 including a pair of sprocket wheels 530 and 532. These sprocket wheels are disposed in a common plane containing the longitudinal axis of the end panel storage magazine 36 and are located in the spaces between the two inner frame angles 502 and the two outer frame angles 502, respectively. The inner sprocket 530 is rigid on a central shaft 534, the ends of which are rotatably supported in bearings 536. Bearings 536 are secured to the adjacent frame angles 502 by bolts 538 which extend through slots in the frame angles, thereby to permit the inner sprocket 530 to be adjusted lengthwise of the storage magazine 36. Set screws 540 are provided for adjusting these bearings. The outer sprocket 532 is rigid on a central shaft 542. The ends of this shaft are rotatably supported in bearings 544. Bearings 544 are secured to the outer frame angles 502 by bolts 546 which extend through slots in the latter frame angles, thereby to permit adjustment of the outer sprocket 532 lengthwise of the storage magazine 36. Set screws 548 are provided for adjusting the outer sprocket.

Trained about the sprockets 530 and 532 is a sprocket chain 550. The upper run of this sprocket chain extends along the upper side of the main supporting channel 500 of the end panel infeed frame 14. Secured to the upper surface of this channel, along its longitudinal center line, is a supporting rail 552 which slideably supports the upper run of the sprocket chain and is straddled by the side links of the chain, whereby the rail serves as a guide for the upper run of the chain. Sprocket chain 550 has secured thereto, at positions spaced along the chain, a number of conveyor carriages 554. Each conveyor carriage 554 comprises a pair of supporting arms 556, one end of which straddle the sprocket chain 550 and are pivotally secured at 558 to the sprocket chain. The opposite ends of the carriage arms 556 mount rollers 560. The two arms of each conveyor carriage 554 are rigidly joined by a conveyor plate 562 extending to one side of and disposed in a plane normal to the arms. During movement of each conveyor carriage 554 along the upper run of the sprocket chain 550, the carriage rollers 560 roll along the upper surface of the main supporting channel 500 of the end panel infeed frame 14. This positions the respective conveyor plate 562 in substantially a vertical plane, as shown. During movement of each conveyor carriage along the lower run of the sprocket chain 550, the carriage hangs below the chain. Fixed to and extending outwardly from the outer end of the main frame channel 500 are a pair of conveyor carriage erecting cams or guides 564 which straddle the outer sprocke 532. The outer extremities of these guides curve downwardly. As each conveyor carriage 554 travels around the outer sprocket 532 from the lower run to the upper run of the sprocket chain 550, the carriage engages the outer curved extremities of the guides 564 which serve to elevate the trailing end of the carriage to a position in which the rear carriage rollers 560 can ride smoothly onto the upper surface of the channel 500 and the conveyor plate 562 on the carriage stands erect. The conveyor plate remains erect during subsequent movement of the carriage along the upper run of the conveyor chain 550. During this movement of each carriage along the upper run of the conveyor chain, the carriage travels through the end panel storage magazine 36, from the outer end of this magazine toward its inner end.

Figure 26:
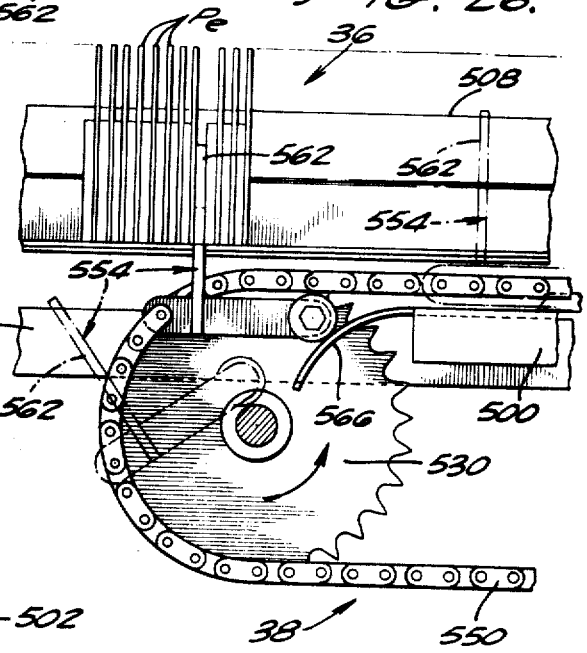
FIGURE 26 is an enlarged section taken on line 26—26 in FIGURE 22 and illustrating a number of preformed end panels placed in the end panel infeed mechanisms.
Figure 27:
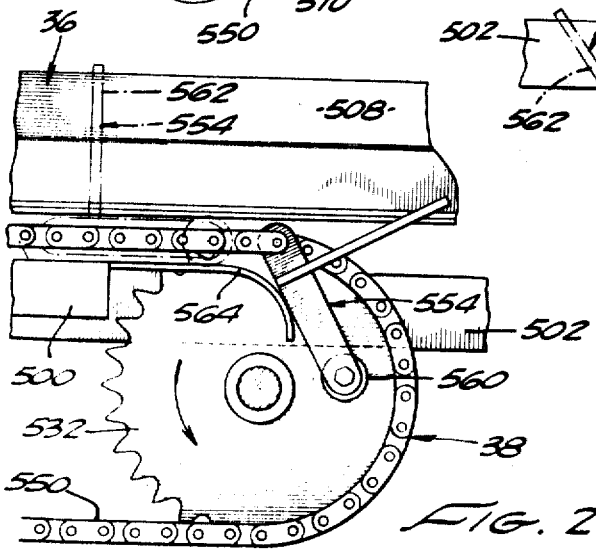
FIGURE 27 is an enlarged section taken on line 27—27 in FIGURE 22.

Secured to and extending inwardly from the inner end of the end panel infeed frame channel 500 are a second pair of guides 566 which straddle the inner sprocket 530 and curve downwardly at their free extremities. As shown in FIGURE 26, the inner guides 566 are curved and spaced from the sprocket chain 550 in such manner that as each conveyor carriage 554 travels around the inner sprocket 530, the rear carriage rollers 560 initially roll along the guides 566 to maintain the conveyor plate 562 on the carriage in its vertical position. Eventually, the carriage rollers 560 roll off of the inner guides 566 and encounter the inner sprocket shaft 534. When this occurs, the carriage plate 562 is rotated forwardly, in the manner illustrated in phantom lines in FIGURE 26. As will be explained presently, this forward rotation of each carriage plate does not occur until after the plate is disengaged from the preformed end panels $P_e$ in the storage magazine 36.

Associated with the inner sprocket 530 of each end panel infeed conveyor 38 are means 568 for driving the sprocket in rotation in a direction to drive the upper run of the corresponding sprocket chain 550 longitudinally through its respective end panel storage magazine 36 and inwardly toward the forming station $S_3$. The sprocket drive means comprises a one-way clutch mechanism 570 including an outer cylindrical housing 572 with radially projecting ears 574. Pivotally connected at its forward end between these ears is the piston rod 576 of a single-acting fluid pressure actuator 578. The outer end of the cylinder 580 of this actuator is pivotally connected to an outboard support 582 on the channel 500 of the respective end panel infeed frame 14. It is apparent, therefore, that the admission of pressure fluid to the outer end of the actuator cylinder 580 rotates the one-way clutch housing 572 through a limited angle in the counterclockwise direction, as viewed in FIGURES 23 and 28, about the axis of the inner sprocket shaft 534. This is the drive direction of the one-way clutch mechanism 570, whereby the inner sprocket shaft 534 rotates with the clutch housing 572 during this counterclockwise rotation thereof. When the outer end of the cylinder 580 is vented, its piston is returned by a spring (not shown), thereby rotating the one-way clutch housing 572 through a limited angle in the clockwise direction, as viewed in FIGURES 23 and 28, about the axis of the inner sprocket shaft 534. The one-way clutch mechanism 570 releases the inner sprocket shaft 534 during this clockwise rotation of the clutch housing 572, whereby the one-way clutch mechanism does not drive the shaft in the latter direction of rotation. For reasons which will appear presently, it is necessary to positively restrain the sprocket shaft 534 against clockwise rotation with the clutch housing 572. To this end, the drive mechanism 568 of the end panel infeed mechanism 38 comprises a second one-way clutch mechanism 584 including a cylindrical housing 586 with a radially projecting ear 588. This ear is connected, by a bolt 590 which extends through a slot in the ear, to a member 592 rigid on the adjacent angle 502 of the infeed frame 14. The one-way clutch mechanism 584 permits rotation of the inner sprocket shaft 534 in the counterclockwise direction, as viewed in FIGURES 23 and 28, but restrains the shaft against rotation in the clockwise direction.

It is apparent at this point, therefore, that the drive mechanism 568 comprises, in effect, a one-way ratchet drive which is operable, in response to each admission of pressure fluid to the outer end of the drive cylinder 580, to rotate the one-way clutch mechanism 570 in its drive direction and thereby rotate the inner sprocket 530 through a limited angle. The upper run of the conveyor chain 550 is thereby driven inwardly a limited distance through the end panel storage magazine 36. In the ensuing description, this stroke of the infeed drive cylinder 580 is referred to as its power stroke. The drive mechanism 568 is operable in response to venting of the outer end of the drive cylinder 580 to rotate the one-way clutch mechanism 570 in a clockwise direction, as viewed in FIGURES 23 and 28, while the inner sprocket 530 remains stationary. This latter stroke of the drive cylinder 580 is hereinafter referred to as its return stroke and conditions the one-way clutch mechanism 570 to again rotate the inner sprocket 580 during the next power stroke of the cylinder.

As will be explained presently, the admission of pressure fluid to the end panel infeed drive cylinders 580 of the two end panel infeed mechanisms 38 is controlled by the mandrel operated switch 480 at the forming station $S_3$. Each time the forming mandrel 348 undergoes a downward forming stroke, the switch 480 is operated by the switch plate 486 on the mandrel, thereby to effect the admission of pressure fluid to the outer ends of the end panel infeed drive cylinders 580. The cylinders then undergo their inward power stroke and thereby drive the upper runs of the end panel infeed conveyor chains 550 inwardly a distance through the respective end panel storage magazines 36. The mandrel operated switch 480 is released during the subsequent upward return stroke of the forming mandrel to its retracted position. When this occurs, the outer ends of the drive cylinders 580 are vented, thereby to reset the infeed ratchet drives 568 for the next inward power stroke of the drive cylinders. Thus, each downward forming stroke of the forming mandrel 348 effects inward advancing of the upper runs of the end panel infeed conveyor chains 550 through their respective end panel storage magazines 36.

When the forming machine 10 is in operation, the spaces between the conveyor plates 562 on the adjacent conveyor carriages 554 of the two end panel infeed mechanisms 38 are maintained filled with the preformed end panels $P_e$. Accordingly, each time the forming mandrel 348 descends in its downward forming stroke, the end panels are fed inwardly through their respective end panel storage magazines 36 and toward the forming station $S_3$. The maximum stroke of the end panel infeed drive cylinders 580 is such that each inward power stroke of the cylinders is capable of driving the conveyor chains 550 a distance equal to the overall thickness of several end panels. As will appear later, however, during normal operation of the machine each power stroke of the cylinders drives the chains only a distance equal to the thickness of one end panel. As the conveyor carriages 554 of the end panel infeed mechanisms 36 travel around their respective inner sprockets 530, the conveyor plates 562 on the carriages, which remain vertical, as described earlier, slide downwardly between the adjacent end panels and finally disengage the panels, just prior to forward rocking of the conveyor plates, in the manner illustrated in phantom lines in FIGURE 26 and described earlier.

Figure 11:
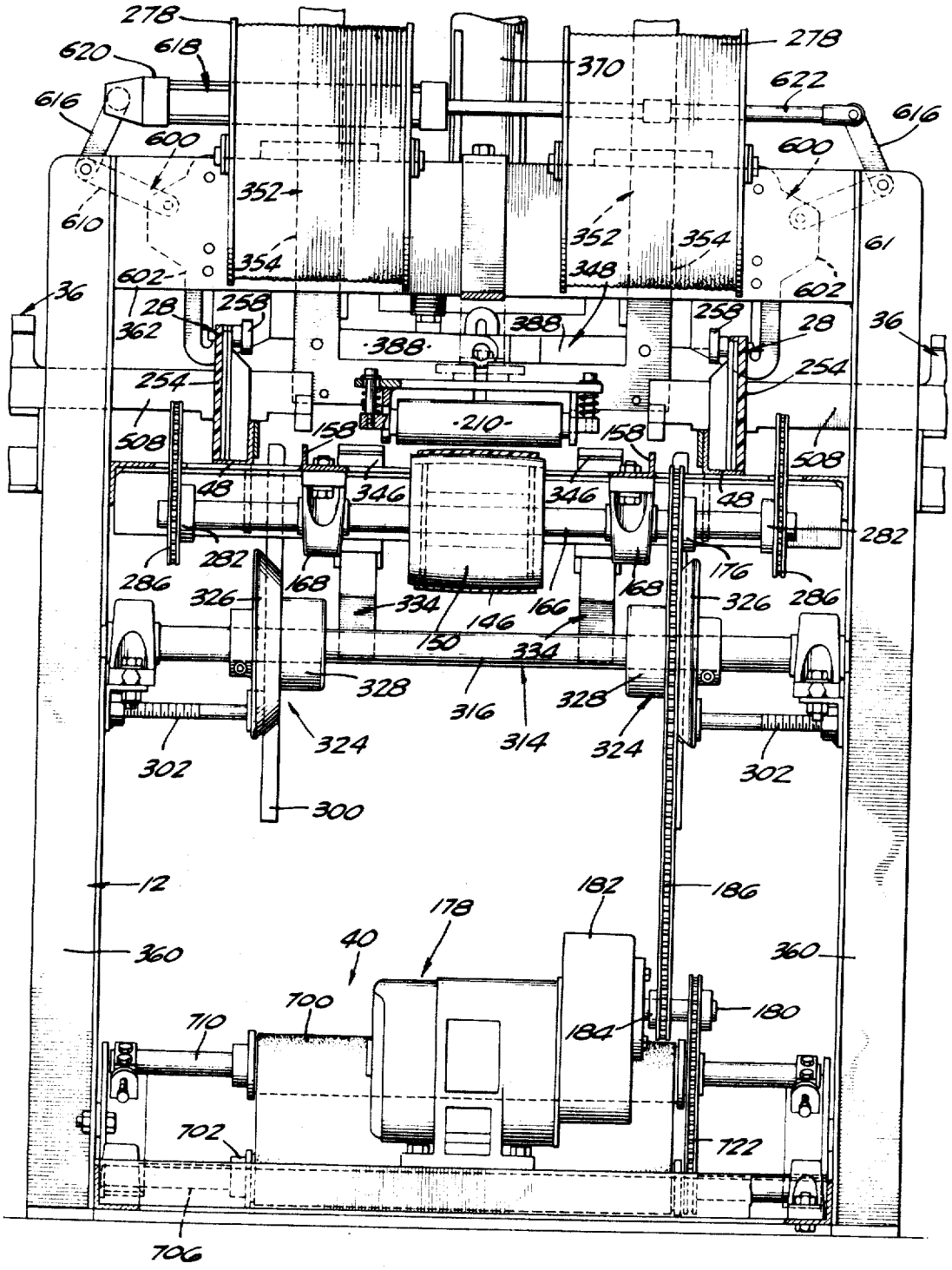

Located at the inner ends of the end panel storage magazines 36, respectively, are adjustable stops 600 against which the innermost end panels $P_e$ in the storage magazines engage. These adjustable stops serve to limit inward movement of the end panels toward the forming mandrel 348 and locate the innermost end panels in positions, hereafter referred to as initial forming positions, wherein the two innermost end panels are disposed for engagement by the extended upper or lower thrust shoulders 418a or 418b, as the case may be, on the forming mandrel, during descension of the latter from its upper retracted position to its lower extended position. The adjustable stop 600 at the inner end of each end panel storage magazine 36 comprises a pair of plates 602 which slidably seat against the inner surfaces of the cross-beams 362 which extend across the main frame 12, at opposite sides of the forming mandrel 348. The plates 602 are secured to the cross-beams 362 by bolts 604 which extend through vertical slots 606 in the plates. Adjacent each pair of stop plates 602 is a horizontal shaft 608 which extends horizontally between and is pivotally supported at its ends on the adjacent frame legs 360. Each shaft 608 mounts a pair of radial arms 610. Fixed in the outer ends of the arms 610 are pins 612 which engage in horizontal slots 614 in the adjacent stop plates 602. Also rigid on each shaft 608 is an upstanding arm 616. In FIGURE 12, it is apparent that outward rotation of the arms 616 away from one another elevates the stop plates 602 relative to the machine frame 12. Inward rotation of the arms 616 toward one another lowers the plates. Referring to FIGURE 11, it will be observed that the upper ends of the stop plate operating arms 616 are interconnected by a fluid pressure actuator 618. This actuator includes a double-acting cylinder 620 which is pivotally connected to the upper end of one of the arms 616 and contains a piston having a piston rod 622 which is pivotally connected to the upper end of the other arm 616. It is apparent, therefore, that admission of pressure fluid to the outer end of the actuator cylinder 620 is effective to elevate, in unison, the stop plates 602. Admission of pressure fluid to the inner end of the cylinder is effective to lower the stop plates in unison. Each stop plate 602 carries a stop bracket 624 including an inwardly directed, vertical stop shoulder 626 and an inwardly directed, generally horizontal retaining shoulder 628. Each stop bracket 624 is secured to its respective stop plate 602 by bolt and slot means 630, whereby each stop bracket may be adjusted horizontally relative to its respective stop plate.

It will be recalled that the present container forming machine is designed to operate on preformed blanks B and end panels $P_e$ of different sizes for producing containers of different sizes, to wit, 12-pound containers, No. 2 containers, and 25 pound containers. The adjustable end panel stops 600 are positioned in accordance with the size of the end panels currently contained in the end panel storage magazines 36 and in such manner as to locate the innermost end panels in their initial forming positions of FIGURE 19. In these initial forming positions, the upper flaps $F_e$ of the innermost end panels engage under the horizontal retaining shoulders 628 and against the vertical stop shoulders 626 of the adjustable end panel stops. The cores W of the innermost end panels project inwardly underneath the lower edges of the vertical stop shoulders 626. The horizontal retaining shoulders 628 project outwardly from the stop shoulders 626 so as to overlie the innermost end panels and a number of the adjacent end panels. The outer extremities of these retaining shoulders slope upwardly, as shown, to guide the end panels emerging from the end panel storage magazines 36 to their terminal positions below the retaining shoulders.

The stop brackets 644 of the end panel stops 600 are so adjusted that when the two innermost end panels are in their initial forming positions, wherein the panel flaps $F_e$ seat against the vertical stop shoulders 626 and the panel cores W project inwardly underneath the lower edges of these stop shoulders, the innermost surfaces of the latter end panels, that is, the inner surfaces of the panel cores, are spaced slightly from the sides of the forming mandrel 348. Referring to FIGURE 19, it will be observed that the inner edges of the inner wear plates 516 on the end panel storage magazines 36 are spaced a distance from the adjacent sides of the forming mandrel 348 such that these wear plates do not vertically support the innermost end panels $P_e$ currently occupying their initial forming positions against the vertical end panel stop shoulders 626. Instead, these innermost end panels are vertically suported by resilient detents 632, one of which is shown in detail in FIGURE 21. Each resilient detent 632 comprises a vertical spring blade 634 welded at its upper end to the outer end of the supporting post 636. The inner end of this supporting post is welded to the outer surface of the adjacent side wall 508 on the adjacent end panel storage magazine 36, at the inner extremity of the side well. Welded to the lower end of the spring blade 634 is a shoulder pin 638. The upper surface of the inner extremity of this shoulder pin is bevelled, as shown. The shoulder pins 638 on the several spring detents 632 project inwardly underneath the innermost end panels $P_e$ currently in their initial forming positions against the vertical stop shoulders 626 on the adjustable end panel stops 600. Accordingly, the end panels $P_e$, when in their initial forming positions at the inner ends of the end panel storage magazines 36, are vertically supported by the spring detents 632.

It will be recalled that the present container forming machine 10 is designed to operate on preformed blanks B and end panels $P_e$ of different sizes for producing containers of different sizes. The end panel stops 600 are vertically adjustable, by operation of the stop positioning means 618, to different vertical positions for accommodating these stops to the different size end panels. Thus, the end panel stops are conditioned to accept the end panels $P_e$ for 12 pound containers by admitting pressure fluid to the inner end of the stop actuating cylinder 620, thereby to move the end panel stop plates 602 to their lower limiting positions of FIGURE 12, wherein the stop plate mounting bolts 604 engage the upper ends of the stop plate slots 606. The end panel stops are conditioned to receive the end panels for 25 pound containers by admitting pressure fluid to the outer end of the stop actuating cylinder 620, thereby to move the stop plates 602 upwardly to their upper limiting positions, wherein the mounting bolts 604 engage the lower ends of the stop plate slots 606. The end panel stops are conditioned to receive the end panels for No. 2 containers by removing the upper stop plate mounting bolts 604 in FIGURE 12 and inserting the mounting bolts into tapped holes 640 in the main frame beams 362. Pressure fluid is then admitted to the outer end of the stop actuating cylinder 620, thereby to move the end panel stop plates 602 upwardly to intermediate limiting positions, wherein the upper mounting bolts 604 currently threaded in the tapped hole 640 engage the lower ends of the upper stop plate slots 606. When the end panel stop plates 602 are in these intermediate limiting positions, the adjustable end panel stops 600 are conditioned to receive the end panels for No. 2 containers. Thus, the end panel stops 600, together with their positioning actuating 618, form part of the changeover mechanisms of the machines, and the end panel stop adjustment just discussed constitutes a changeover adjustment.

At this point, it is apparent that during operation of the container forming machine 10, the end panel infeed mechanisms 38 are intermittently operated in response to the successive downward forming strokes of the forming mandrel 348 from its upper retracted position to its lower extended position. During each such initermittent operation of these infeed mechanisms, the end panel infeed conveyor chains 550 are driven a distance approximately equal to the thickness of the preformed end panels $P_e$ and in directions such that the end panels contained in the end panel storage magazines 36 are fed inwardly through these magazines toward the forming station $S_3$. Eventually, the end panels arrive at their initial forming positions at the forming station, wherein the upper panel flaps $F_e$ seat against the stop shoulders 626 on the adjustable end panel stops 600 and the end panels are vertically supported on the shoulder pins 638 of the spring detents 632. It will be recalled that the maximum stroke of the end panel infeed cylinders 578 is such that these cylinders are capable of driving the conveyor chains 550 a distance equal to the combined thickness of several end panels. The cylinders are provided with this excess stroke length to close any gaps which may exist between adjacent end panels in the end panel storage magazines. Thus, if such gaps exist during a power stroke of the cylinders, the latter will continue to drive the conveyor chains until the reaction force created by squeezing of the end panels between the innermost conveyor plates 562 and the end panel stops 626 exceeds the thrust of the cylinders.

Assume now that a preformed blank B occupies its initial forming position over the forming cavity 32a and that the appropriate thrust shoulders on the forming mandrel 348, that is, either the upper thrust shoulders 418a or the lower thrust shoulders 418b, are extended. Under these conditions, during the subsequent downward forming stroke of the forming mandrel from its upper retracted position to its lower extended position, the extended thrust shoulders engage the upper edges of the cores W on the innermost end panels currently occupying their initial forming position adjacent the forming mandrel and drive these latter end panels downwardly into the forming cavity 32a. As the end panels approach the upper end of the forming cavity, they arrive at positions of initial mating engagement with the underlying preformed blank B, wherein the lower edges of the end panels engage the central bottom wall forming panel $P_b$ of the blank just inboard of its central score lines $L_3$. At this point, it is significant to note that the lower edges of the end panels are flush with the lower leading end of the forming mandrel 348, whereby the lower edges of the end panels and the leading end of the mandrel isimultaneously engage a bottom wall forming panel $P_b$ of the underlying blank B. Continued downward movement of the forming mandrel beyond this position of initial engagement of the mandrel and end panels with the preformed blank, therefore, is effective to simultaneously drive the end panels and the blank downwardly into the forming cavity 32a. As discussed earlier, and hereinafter explained in greater detail, during this downward movement of the blank B and its mating end panels $P_e$ into the forming cavity 32a, the side wall forming panels $P_s$ of the blank are folded upwardly about opposite ends of the end panels and the currently glue-coated end panel joining flaps $F_b$ and $F_s$ of the blank are folded inwardly against the outer surfaces of the end panels, thereby form a partially completed container structure S of the kind illustrated in FIGURE 29, This container structure remains in the forming cavity 32a during the subsequent upwardly return stroke of the forming mandrel to its upper retracted position. During the next downward forming stroke of the mandrel, this container structure is ejected, by the following container structure, through the lower end of the forming cavity and, at this point, enters the outfeed station $S_5$ of the machine.

OUTFEED STATION $S_5$

As noted earlier, the outfeed station $S_5$ includes an outfeed conveyor 40 which receives each partially completed container structure emerging from the lower end of the forming die 32a of the forming station $S_3$ and conveys the container structure from the machine. The outfeed conveyor 40 comprises a conveyor belt 700 which is trained at its rear end about a roller 702 and at its forward end about a roller 704. The rear conveyor roller 702 includes a central shaft 706 which is rotatably supported at its ends in bearings 708 bolted to the machine frame 12. The forward roller 704 includes a central shaft 710 rotatably supported at its ends in bearings 712 which are adjustably secured to frame members 714. The rear ends of these frame members are pivotally attached at 716 to the machine frame 12. Extending through slots centrally located in the frame member 714 are bolts 718 which may be selectively threaded in a number of tapped holes 720 in the forward frame legs 360, thereby to vary the elevation of the forward, discharge end of the outfeed conveyor 40. Adjustment of the forward conveyor belt supporting roller 704 is effective to vary the tension in the conveyor belt 700. The rear conveyor roller 702 is driven, through a sprocket chain 722, from the main drive motor 178 of the machine. When thus driven, the upper run of the conveyor belt 700 moves forwardly relative to the machine frame 12, that is, from right to left in FIGURE 6a.

ELECTRICAL FLUID PRESSURE CONTROL SYSTEM

Reference is now made to FIGURE 29 which schematically illustrates the electrical and fluid pressure systems of the machine. It will be apparent, at this point, to those skilled in the art that the several fluid pressure operated devices, or actuators embodied in the container forming machine 10, may be either hydraulically or pneumatically operated. According to the preferred practice of the invention, however, these actuators are pneumatically operated. For this reason, it will be assumed, in the ensuing description, that the pressure fluid for operating the various actuators is high pressure air. For convenience, the source of this high pressure air, and the space to which the air is exhausted from the various actuators, are omitted from the drawings. Only the high pressure inlet and the low pressure outlet of each valve are illustrated.

With this preliminary discussion in mind, the reference numeral 800 in FIGURE 29 designates a changeover valve having a manual operating handle 802, a high pressure air inlet 804, and a low pressure outlet 806. In FIGURE 1, it will be observed that this valve is mounted on the machine frame 12, adjacent the rear or right-hand end of the blank storage magazine 16. Leading from the valve 800 are two air lines 808 and 810. In one position of the valve handle 802, the high pressure inlet 804 and the low pressure outlet 806 of the valve 800 communicate, respectively, with the air lines 808 and 810. The valve connection to the air lines are reversed when the valve handle is operated to its other position. Air lines 808 and 810 are connected, via the branch lines illustrated in FIGURE 29, to opposite ends of the several changeover cylinders of the machine, to wit, the blank support positioning cylinder 106 at the blank infeed station $S_1$, the pressure roller positioning cylinder 224 at the gluing station $S_2$, the blank limit stop positioning cylinder 466 at the forming station $S_3$, and the end panel stop positioning cylinder 620 at the forming station. The air line 808 is also connected, via the illustrated branch lines to the cylinders 428 in the upper thrust shoulder assemblies 416 on the forming mandrel 348 and the air line 810 is connected to the cylinders 428 in the lower thrust shoulder assemblies 414. It is apparent, therefore, that operation of the valve handle 802 to one of its positions, effects extension of the upper thrust shoulders 418a and retraction of the lower thrust shoulders 418b on the forming mandrel 348, and simultaneous movement of the blank supporting brackets 82 at the blank infeed station $S_1$, the forward pressure roller 210 at the gluing station $S_2$, the blank limit stop 462a at the forming station $S_3$, and the end panel stop plates 602 at the inner ends of the end panel infeed stations $S_4$, to the aforementioned limiting positions of these various components wherein the latter are postioned to accommodate the preformed blanks B for the 25-pound containers referred to earlier. In this position of the valve handle, therefore, the forming machine 10 is conditioned to produce 25-pound containers.

Operation of the valve handle 802 to its other position effects retraction of the upper thrust shoulders 418a and extension of the lower thrust shoulders 418b on the forming mandrel 348, and simultaneous movement of the several adjustable components, just listed, to their opposite limiting positions wherein these components are located to accommodate the preformed blanks B for the 12-pound containers referred to earlier. In this latter position of the valve handle 802, therefore, the machine 10 is conditioned to form 12-pound containers. The machine illustrated in the drawings is adjusted to form such 12-pound containers. The machine is conditioned to form the No. 2 containers, referred to earlier, by removing filler plates 444 from the lower thrust shoulders 418b on the forming mandrel 348, repositioning the limit stops for the adjustable blank supporting brackets 32 at the blank infeed station, the pressure roller supporting carriage 221 at the gluing station $S_2$, the limit stop supporting carriage 450 at the forming station $S_3$, and the end panel stop plates 602, in the manner described earlier, and then shifting the valve handle 802 to its last mentioned position. This positioning of the valve handle now effects retraction of the upper thrust shoulders and extension of the lower thrust shoulders on the forming mandrel, and simultaneous movement of the blank supporting brackets 82, the pressure roller 210, the limit stop 462a, and the end panel stop plates 602 to their respective intermediate positions, discussed earlier, wherein they are positioned to accommodate the preformed blanks B for No. 2 containers. As discussed earlier, removal of the filler plates 444 from the lower thrust shoulders 418b on the forming mandrel adapts these thrust shoulders for engagement with the end panels $P_e$ of the No. 2 containers.

Referring now again to FIGURE 29, the reference numerals 812, 814 and 816 designate three solenoid valves for controlling, respectively, the blank infeed cylinder 126, the mandrel cylinder 370, and the end panel infeed cylinders 580. Solenoid valve 812 has a high pressure air inlet 818 and a low pressure air outlet 820 and is connected, via air lines 822, to opposite ends of the blank infeed cylinder 126, whereby the latter cylinder may be selectively pressurized to drive the blank ejector 112 of the blank infeed mechanism 18 in its forward infeed stroke and its rearward return stroke by operation of the valve 812 from one position to the other. The valve 812 is spring loaded in such manner that the blank ejector 112 is driven in its infeed stroke in response to deenergizing of the valve and in its return stroke in response to energizing of the valve. The solenoid valve 814 for the mandrel cylinder 370 includes a high pressure air inlet 824 and a low pressure air outlet 826 and is connected, via air lines 828, to opposite ends of the mandrel cylinder 370, whereby the latter cylinder may be selectively pressurized to drive the forming mandrel 348 in its downward forming stroke and in its upward return stroke by operation of the valve 814 from one position to the other.

Valve 814 is arranged in such manner that the forming mandrel is driven in its downward forming stroke in response to energizing of the valve 814 in one direction and in its upward return stroke in response to energizing of the latter valve in the opposite direction. The solenoid valve 816 for the end panel infeed cylinders 580 includes a high pressure air inlet 830 and a low pressure air outlet 832 and is connected, via air lines 834, to the outer ends of the infeed cylinders 580, whereby the latter cylinders may be selectively pressurized to drive and reset the end panel infeed mechanisms 38 on operation of the valve 816 from one position to the other. Valve 816 is spring loaded in such manner that the end panel infeed cylinders 580 are pressurized to drive the end panel infeed mechanisms 38 in response to deenergizing of the latter valve and to reset the latter infeed mechanisms in response to energizing of the valve.

Reference numeral 836 in FIGURE 29 indicates a master control panel. As illustrated in FIGURE 1, this control panel is mounted on the machine frame 12, adjacent the changeover valve 800. Control panel 836 includes a main power switch 838 which is connected to an AC power supply (not shown) through input leads 840. Extending from the main switch 383 are output leads 842a and 842b which are connected, in the manner hereinafter described, to the mandrel cylinder control valve 814 and the end panel infeed cylinder control valve 814. The main power switch 383 includes on-off buttons 844 which are exposed at the front side of the control panel for depression by the machine operator to selectively open and close the switch. An indicator light 846 is connected across the output leads 842a, 842b for indicating when the main switch 838 is closed. Located at the top of the control panel is a time delay switch 848 including an adjustable time presetting knob 850, which is exposed at the front side of the control panel for adjustment by the machine operator, and three terminals 852a, 852b and 852c. The time delay switch is conventional and is so constructed that when a voltage is impressed across its terminals 852a, 852c, the switch closes to complete a circuit between its terminals 852a, 852b for a period of time determined by the setting of the switch knob 850. Leads 854 connect the output leads 842a and 842b to the terminal 852a of the time delay switch 848 and one terminal of the blank infeed cylinder control valve 812, respectively, the terminal 852b of the time delay switch 848 is connected to the other terminal of the control valve 812 through a lead 856. The third terminal 852c of the time delay switch is connected to the lead 842b through a lead 858, a mode selector switch 860, and the mandrel extension switch 474. Thus, when the circuit is completed from the switch terminal 852c to the lead 842a through the mode selector switch 860 and the mandrel extension switch 474, the time delay switch closes to complete an energizing circuit to the control valve 812 and remains closed for a period of time corresponding to the setting of the time presetting knob 850 of the time delay switch.

The mode selector switch 860 includes a knob 862 which is exposed at the front side of the control panel 836 for rotation by the machine operator between an automatic position A and a manual position M. Rotation of the switch knob 862 to its automatic position closes the selector switch 860, thereby completing a circuit from the time delay switch terminal 852c to the mandrel extension switch 474. Rotation of the switch knob 862 to its manual position opens the selector switch 860, thereby breaking the circuit between the switch terminal 852c and the mandrel extension switch.

It will be recalled that the mandrel extension switch 474 is located just beyond the forming station $S_3$ and includes a pivoted actuating arm 476 disposed for engagement by each preformed blank B arriving at its initial forming position at the forming station. The mandrel extension switch is a normally open switch which is closed in response to this engagement of its actuating arm by each preformed blank. If we assume that the knob 862 of the selector switch 860 is set in its automatic position, it is apparent that closure of the mandrel extension switch 474 by each preformed blank B arriving at its initial forming position at the forming station effects initial closure of the time delay switch 848 and, thereby, energizing of the solenoid valve 812 for the blank infeed cylinder 128. As just noted, once the time switch 848 is energized, it remains energized for a period of time determined by the setting of the time switch knob 850. Energizing of the blank infeed cylinder control valve 812 by the time delay switch retracts the blank ejector 112 of the blank infeed mechanism 18 rearwardly to its rearward limiting position. When the valve 812 is deenergized in response to subsequent delayed opening of the time delay switch 848, the valve is returned, by spring action, to its normal position wherein it pressurizes the blank infeed cylinder 128 in a direction to drive the blank ejector 112 forwardly to its forward limiting position. Thus, closure of the mandrel extension switch 474 by each preformed blank B arriving at its initial forming position at the forming station activates the blank infeed mechanism 18. The blank ejector 112 of this infeed mechanism, in turn, undergoes a rear return stroke and a forward infeed stroke in response to each such activation of the blank infeed mechanism. During each infeed stroke of the ejector, a preformed blank B is ejected from the blank storage magazine 16 to the gluing station $S_2$. The length of time the blank ejector remains in its rear retracted position, in the interim between each rear return stroke and the subsequent forward infeed stroke of the ejector, and hence the rate at which the preformed blanks B are ejected from the blank storage magazine 16, is determined by the setting of the time delay switch knob 860. This knob has a minimum time delay setting equal to or somewhat greater than the length of time required for the blank ejector to travel in its return stroke from its forward limiting position to its rear retracted position. In this way, complete return of the blank ejector to its rear retracted position during each activation of the blank infeed mechanism, and hence proper conditioning of this mechanism for ejecting a preformed blank during the subsequent forward infeed stroke of the blank ejector, are assured. In the ensuing description, the rear return stroke and the subsequent forward infeed stroke which the blank ejector 112 undergoes in response to each activation of the blank infeed mechanism 18 is referred to as a blank infeed cycle, or simply infeed cycle. As will be discussed shortly, the minimum setting of switch 848 is also dependent on the duration of the forming cycle.

Assume now that the knob 862 of the selector switch 860 is set in its manual position, thereby to open the selector switch. In this case, closure of the mandrel extension switch 474 is ineffective to close the time delay switch 848 and thereby energize the blank infeed cylinder control valve 812 and each infeed cycle of the blank infeed mechanism 18 must be initiated manually. To this end, the master control panel 836 includes a jog switch 864 having a button 866 exposed at the front side of the control panel. The jog switch is a normally open switch which is closed in response to depression of its switch button 866 and is connected in parallel with the mandrel extension switch 474 and the selector switch 860, as shown. Accordingly, closure of the jog switch is effective to initiate an infeed cycle of the blank infeed mechanism 18. As will be explained shortly, the jog switch 864 serves two functions, to wit, effecting manual operation of the forming machine, and initiating automatic operation of the machine.

The mandrel extension switch 474 also controls the mandrel cylinder control valve 814. This valve is not spring loaded and includes two solenoid windings, one of which is connected via leads 868 and switch 474 to the power leads 842a, 842b, so as to be energized in response to closure of the mandrel extension switch. The valve is then operated to pressurize the upper end of the mandrel cylinder 370, thereby to drive the forming mandrel 348 downwardly in its forming stroke. The other winding of the valve 814 is connected, via leads 870 and the mandrel switch 478 to the power leads 842a, 842b. This latter switch is a normally open switch which is closed by the switch actuator 484 on the forming mandrel upon arrival of the latter at its lower extended position. Closure of the mandrel switch 478 operates the valve 814 to pressurize the lower end of the mandrel cylinder, thereby to drive the forming mandrel upwardly in its return stroke. Thus, closure of the mandrel extension switch 474 by each preformed blank B arriving at its initial forming position at the forming station $S_3$ effects a downward forming stroke and a subsequent upward return stroke of the forming mandrel 348. In the ensuing description, each such downward forming stroke and subsequent upward return stroke of the forming mandrel is referred to as a forming cycle of the mandrel.

The end panel infeed cylinder control valve 816 is spring loaded in a direction to normally pressurize the outer ends of the end panel infeed cylinders 578. The winding of this valve is connected to power leads 842a, 842b through the mandrel switch 480, which is a normally closed switch. During retention of the forming mandrel 348 in the upper retracted position, as well as during the initial portion of the downward driving stroke of the mandrel and the fuel portion of the upward return stroke of the mandrel, switch 480 is engaged by the switch actuating plate 488 in the mandrel. The switch is thereby retained open to pressurize the outer ends of the end panel infeed cylinders. During the remaining portions of the mandrel forming and return strokes, the switch 480 is released to close and thereby vent the end panel infeed cylinders 580. The pistons in these cylinders are spring loaded into their cylinders and, therefore, are retracted into the cylinders in response to venting of the cylinders. It is apparent, therefore, that when the forming mandrel 348 occupies its upper retracted position, the end panel infeed cylinders 578 are pressurized in a direction to urge the innermost end panels $P_e$ in the end panel storage magazines 36 inwardly toward the forming mandrel to their initial forming positions wherein these panels seat against the end panel stop shoulders 626 and the lower side frame members 358 of the forming mandrel. This inward urging of the end panels toward the forming mandrel assures proper engagement of the extended thrust shoulders 418a or 418b, as the case may be, with the two innermost end panels during each downward forming stroke of the mandrel. Venting of the end panel infeed cylinders 578 during each downward forming stroke of the mandrel relieves the inward pressure on the end panels remaining in the end panel storage magazines 36, as is desirable to minimize the inward pressure of the current innermost end panels against the descending forming mandrel.

The main drive motor 178 of the forming machine 10 is energized from an electrical power supply (not shown) through a pair of supply leads 872 containing a circuit breaker 874 and a motor switch 876. The circuit breaker 874 and the motor switch 876 are mounted in an extension 878 on the control panel 836, proper, and include buttons 880 and 882, respectively, which are exposed at the front side of the control panel for depression by the machine operator.

This completes the structural description of the container forming machine 10. The operation of the machine will now be described.

SUMMARY OF OPERATION

The forming machine 10 is conditioned for operation by depressing the "on" button 844 of the main power switch 838 and the "on" button 882 of the motor switch 876. Closure of the main power switch 878 supplies electrical operating power to the several solenoid valves and to the control units 28a for the hot glue applicator mechanism 28. Closure of the motor switch 876 energizes the main drive motor 178. This motor now drives the conveyor belt 146 at the gluing station $S_2$ and the outfeed conveyor belt 700 at the outfeed station $S_5$.

The next step in the operation of the machine involves actuation of the changeover selector valve 800 to position the various adjustable components of the changeover mechanism of the machine in accordance with the particular size of container to be produced. As noted earlier, these adjustable components of the changeover mechanism comprise the preformed blank supporting brackets 82 at the blank infeed station $S_1$, the pressure roller supporting carriage 204 at the gluing station $S_2$, the limit stop and mandrel extension switch supporting carriage 450 at the forming station $S_3$, the end panel stop plates 602 at the inner ends of the end panel infeed stations $S_4$, and the upper and lower thrust shoulders 418a and 418b on the forming mandrel 348. It will be recalled that these components of the changeover mechanism are presettable to any of three different positions for conditioning the machine to produce 12½-pound containers, No. 2 containers, or 25-pound containers. It is apparent, of course, that the various additional machine adjustments described earlier permit the machine to be adapted to other container sizes as well. In the ensuing description, it will be assumed that the changeover mechanism of the machine is set for 12½-pound containers.

The final step in conditioning the forming machine 10 for operation involves loading a stack of preformed blanks B into the blank storage magazine 16 and a supply of preformed end panels $P_e$ into each of the end panel storage magazines 36. It will be recalled that when a stack of preformed blanks B are placed in the blank storage magazine 16, the lowermost blank in the stack is supported on the upper extremities of the blank supporting brackets 82. The end panel storage magazines 36 are loaded with end panels by placing a number of the end panels between the conveyor plates 562 of the adjacent conveyor carriages 554 on the upper runs of the end panel infeed conveyor chains 550. These conveyor plates are spaced to receive a predetermined number of end panels therebetween in such manner that the end panels are slightly compressed. For example, the preformed end panels upon which the present machine is designed to operate are commonly supplied in bundles and the conveyor plates of the end panel infeed mechanisms 38 are spaced to receive therebetween a given number of such bundles. It will be understood, of course, that during operation of the machine, operators will be stationed at the blank infeed station $S_1$ and the end panel infeed stations $S_4$ to maintain a constant supply of preformed blanks B in the blank storage magazine 16 and a constant supply of preformed end panels $P_e$ in each of the end panel storage magazines 36.

At this point, therefore, the machine is ready for operation. It will be assumed at first that the mode selector switch 860 is set in its automatic position. Automatic operation of the machine is initiated by depressng the button 866 of the jog switch 864. It will be recalled that this operation of the jog switch initiates an infeed cycle of the blank infeed mechanism 18, during which the lowermost preformed blank B in the blank storage magazine 16 is ejected forwardly from the latter magazine to the gluing station $S_2$. As the ejected blank emerges from the blank infeed station $S_1$, its leading end enters into drivable engagement with the conveyor mechanism 20 at the gluing station and is conveyed, by this mechanism, through the gluing station to the forming station $S_3$. During passage of the blank through the gluing station, the stripes $C_c$ of cold glue and the stripes $C_h$ of hot glue are applied by the cold glue applicators 26 and the hot glue applicators 28, respectively, to the upwardly presented surfaces of the end panel joining flaps $F_b$ and $F_s$ on the blank.

After its emergence from the gluing station $S_2$, the glue-coated blank enters its initial forming position at the forming station $S_3$. It will be recalled that in this initial forming position, the bottom wall forming panel $P_b$ of the blank is centered over the forming cavity 32a on the forming die 32 and the blank is supported on the upper edges of the die side wall plates 300, which plates engage the end panel joining flaps $F_b$ of the blank, just outboard of its score lines $L_3$. It will be further recalled that during the initial adjustment of the changeover mechanism, by actuation of the changeover selector valve 800, the forward pressure roller 210 of the gluing station feed mechanism 20 is so positioned that the trailing end of the blank emerges belt 146, to terminate forward feeding of the blank by the gluing station conveyor, upon arrival of the blank at its initial forming position at the forming station. As the glue-coated blank enters this initial forming position, its leading end depresses the actuating arm 476 of the mandrel extension switch 474 and immediately thereafter bottoms against the limit stop 462a. This limit stop prevents forward movement of the blank beyond its initial forming position at the forming station and, thereby, serves to positively locate the blank in this initial forming position.

Depression of the actuating arm 476 of the mandrel extension switch 474 by the preformed blank closes the switch, thereby initiating the second infeed cycle of the blank infeed mechanism 18 and the first forming cycle of the forming mechanism 30. During this second infeed cycle of the blank infeed mechanism 18, the currently lowermost preformed blank B in the blank storage magazine 16 is ejected from the blank infeed station $S_1$ to the gluing station $S_2$. During the first forming cycle of the forming mechanism 30, the forming mandrel 348 descends to its lower extended position, wherein the lower leading end of the mandrel projects downwardly into the forming cavity 32a, and then returns upwardly to its upper retracted position, wherein the leading end of the ram is retracted from the forming cavity. It will be recalled that when the forming mandrel occupies its upper retracted position, and during the initial portion of the downward forming stroke of the mandrel, the end panel infeed cylinders 578 are pressurized to urge the innermost end panels $P_e$ in the end panel storage magazines 36 inwardly against the end panel stop shoulders 626 and the lower side frame members 358 on the forming mandrel. It will further be recalled that the changeover mechanism of the forming machine is currently set for 12½-pound containers and, accordingly, the lower thrust shoulders 418b on the forming mandrel 348 are extended while the upper thrust shoulders 418a are retracted. Also, the filler plates 444 are secured to the lower thrust shoulders. Accordingly, as the forming mandrel 348 descends in the downward forming stroke of its first forming cycle, the lower edges of the filler plates 444 on the lower, extended thrust shoulders 418b engage the upper edges of the cores W on the innermost end panels $P_e$ which are currently located in their initial forming positions at the inner ends of the end panel storage magazines 36. These innermost end panels, therefore, are driven downwardly by the forming mandrel and toward the underlying preformed blank B currently in its initial forming position at the forming station $S_3$. During this downward movement of the innermost end panels with the forming mandrel, the resilient detents 632 which vertically support the end panels in their initial forming positions retract outwardly under the downward thrust of the descending end panels against the bevelled shoulder pins 638 of the detents, thereby to permit downward movement of the end panels with the mandrel. As the forming mandrel is descending in this initial downward forming stroke thereof, the switch actuating plate 488 on the mandrel engages the mandrel switch 480, thereby operating the end panel infeed cylinder control valve 842 to vent the end panel infeed cylinders 580 and thereby relieve the inward pressure on the end panels $P_e$ remaining in the end panel storage magazines 36.

At this stage in the operation of the machine, therefore, the forming mandrel 348, along with a pair of preformed end panels $P_e$, is descending, in its first forming stroke, toward the underlying preformed blank B currently occupying its initial forming position at the formnig station $S_3$. It will be recalled that the thrust shoulders 418a and 418b are so vertically located on the forming mandrel 348 that the lower edges of the end panels engaged by the shoulders are approximately flush with the lower, leading end of the mandrel. Accordingly, the downward forming stroke of the mandrel drives the currently descending end panels $P_e$ downwardly to positions of initial mating engagement with the underlying preformed blank B, wherein these end panels engage the upper surfaces of the central bottom wall forming panel $P_b$ of the blank, just inboard of its score lines $L_3$. The lower leading end of the mandrel also engages the upper surface of this panel. Continued downward movement of the descending mandrel beyond the position of initial mating engagement of the descending end panels with the underlying preformed blank forces the end panels and blank downwardly into the forming cavity 32a.

At this point, it is significant to recall that the forming die side wall plates 300 are adjustable toward and away from one another, thereby to vary the spacing therebetween. It is also significant to recall that the lower ends of the side frames 352 on the forming mandrel 348 are pivotally movable in directions transverse to the die side wall plates, between extended positions adjacent these plates and retracted positions remote from these plates, and further that these mandrel frames are extended during movements of the forming mandrel 348 from its upper retracted position to a position just prior to its lower extended position. The mandrel side frames are then retracted during the terminal portion of the downward forming stroke of the mandrel and remain retracted during subsequent upward return movement of the mandrel to a position just prior to its upper retracted position. The side frames are reextended during the terminal portion of the upward return stroke of the mandrel. The forming die side wall plates 300 are so adjusted that the clearance between the inner surface of each die side wall plate and the confronting side surface of the adjacent mandrel side frame 352 is approximately equal to the thickness of one preformed end panel $P_e$ and the thickness of one preformed blank B when the mandrel side frames are extended and the leading end of the mandrel is disposed within the forming cavity. It is apparent, therefore, that when the forming mandrel descends below the position of initial mating engagement of the descending end panels with the underlying preformed blank, and thereby forces these end panels and the blank into the forming cavity, the end panel joining flaps $F_b$ of the blank are folded upwardly against the outer surfaces of the end panels by the upper edges of the die side wall plates. These upper plate edges are rounded, as described earlier, and illustrated at 312, to prevent these edges from marring the panel joining flaps or the end panels. It will be remembered that the end panel joining flaps $F_b$ and $F_s$ of the preformed blank B currently being operated by the forming mandrel are glue-coated. Accordingly, upward folding of the panel joining flaps $F_b$ against the outer surfaces of the end panels $P_e$ produces an immediate adhesive bond between the flaps and end panels. At this point, attention is directed to the preliminary discussion of the application, wherein it was noted that the hot glue on the end panel joining flaps provides an inital, immediate adhesive tack or bond between the folded flaps and the end panels. The final secure adhesive bond between the flaps and end panels is furnished by the cold glue, which requires a longer period of time to set than the hot glue. It is apparent at this point that because of the aforementioned clearance between the die side wall plates 300 and the side surfaces of the forming mandrel 348, the lower edge portions of the descending end panels and the upwardly folded end panel joining flaps $F_b$ are confined or gripped between the side wall plates and the forming mandrel in a manner which retains the flaps and end panels in intimate bonding engagement.

Figure 20:
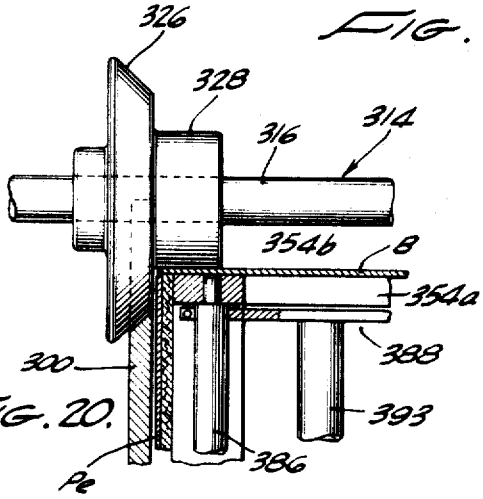
FIGURE 20 is an enlarged section taken on line 20—20 in FIGURE 19.
Figure 21:
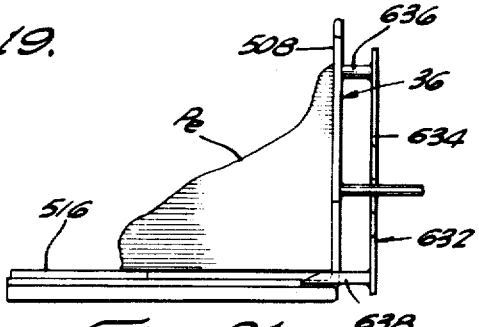
FIGURE 21 is an enlarged section taken on line 21—21 in FIGURE 19.

Downward movement of the forming mandrel 348, in its first downward forming stroke under discussion, below its position of initial mating engagement of the preformed end panels $P_e$ with the underlying preformed blank B also effects upward folding of the side wall forming panels $P_s$ against opposite ends of the end panels $P_e$ and folding of the glue-coated end panel joining flaps $F_s$ inwardly against the outer surfaces of the end panels. In this connection, attention is directed to FIGURE 14 wherein it will be observed that as the forming mandrel 348 descends into the forming cavity 32a, the bottom wall forming panel $P_b$ of the blank is initially forced downwardly between the curved panel folding members 346 of the forming die 32 and thereafter between the forming rollers 314. As the bottom wall forming panel of the blank enters between the panel folding members 346, the outwardly curved upper extremities of these members engage the side wall forming panels $P_s$ of the blank and gradually fold these panels, and the cover forming panels $P_c$, upwardly about the score lines $L_1$ of the blank, to positions wherein the side wall and cover forming panels are disposed in planes approximately normal to the bottom wall forming panels. This folding action is clearly illustrated in FIGURE 14. When the bottom wall forming panel $P_b$ of the blank subsequently enters between the forming rollers 314, the annular forming flanges 326 and forming shoulders 328 on these rollers engage the glue-coated and yet unfolded panel joining flaps $F_s$ of the blank and fold these flaps inwardly against the outer surfaces of the end panels $P_e$, as illustrated in FIGURE 20, and initial, immediate adhesive tack or bond is thereby produced between the end panel joining flaps $F_s$ and the end panels $P_e$.

Figures 6B, 14:
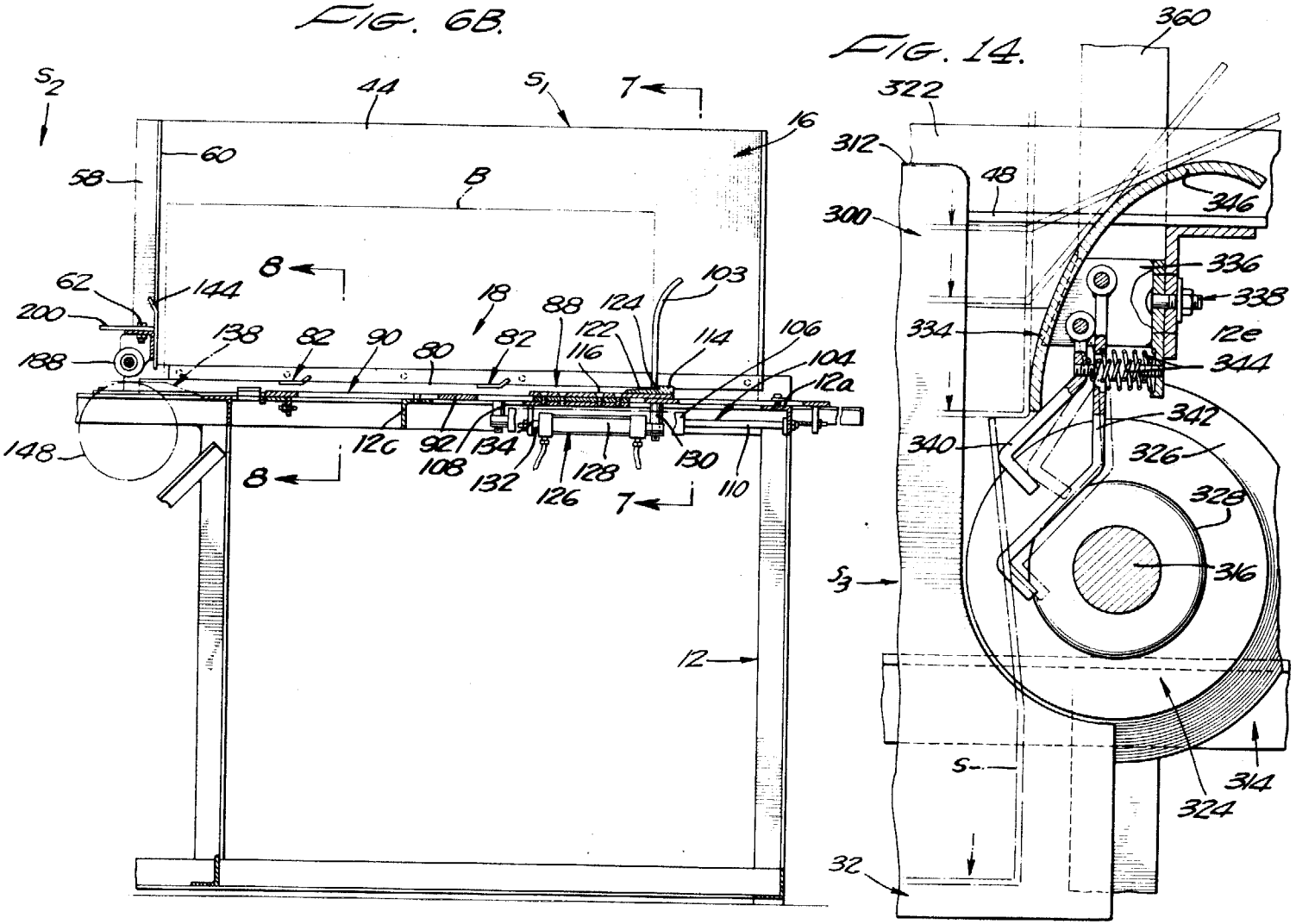
FIGURE 6b is a section taken on line 6b—6b in FIGURE 3b.
FIGURE 14 is an enlarged section taken on line 14—14 of FIGURE 12.

At this point in the operation of the container forming machine 10, therefore, the adhesively joined preformed blank B and end panels $P_e$ form a partially completed container structure of the kind indicated at C in FIGURE 29. As noted earlier, upon arrival of the forming mandrel 348 at its lower extended position, the mandrel cylinder control valve 814 is reversed to immediately effect upward return of the forming mandrel to its upper retracted position. The partially completed container structure C which has just been formed, however, remains within the forming cavity 32a, as indicated in FIGURE 14. At this point, it is significant to recall the earlier discussion relating to the extension and retraction of the mandrel side frames 352. Thus, just prior to arrival of the descending forming mandrel at its lower extended position, the lower ends of the mandrel side frames are retracted inwardly, thereby relieving the outward pressure of these side frames against the end panels of the container structure C. This eliminates any tendency for the container structure to be pulled upwardly in the forming cavity during the subsequent upward return stroke of the mandrel. The mandrel side frames are reextended just prior to arrival of the mandrel at its upper limiting position, thereby to condition the mandrel for its next downward forming stroke.

At this stage in the operation of the machine, therefore, the forming mandrel 348 is ascending toward its upper retracted position while the container structure C, just formed, remains within the forming cavity 32a. As described earlier, the preformed blank B of this latter container structure actuated the mandrel extension switch 474 upon arrival of the blank at its initial forming position at the forming station $S_3$ and this actuation of the switch initiated an infeed cycle of the blank infeed mechanism 18. The forward infeed stroke of the blank ejector 112 of this mechanism, however, which occurs during the latter infeed cycle, is delayed for a length of time determined by the setting of the time delay switch 848. The minimum time delay introduced by this switch is sufficient to permit complete return of the blank ejector to the start of its infeed stroke prior to commencement of the latter stroke to eject the next preformed blank B from the infeed station $S_1$, and to permit complete return of the forming mandrel 348 to its upper retracted position prior to entrance of the latter blank into the forming station $S_3$. This minimum time delay determines the maximum rate of operation of the machine, that is to say, the maximum rate in which the machine is capable of forming the container structures C. In a typical forming machine according to the invention, for example, this container forming rate is on the order of 30 containers per minute. The time delay switch 848, of course, can be adjusted to introduce longer delay times into the infeed cycles of the blank infeed mechanism 18 and, thereby, reduce the container forming rate of the machine. Preferably, the time delay switch 848 is equipped with a dial for indicating the container forming rates of the machine corresponding to different preselected settings of the switch knob 850.

At this stage in the operation of the machine, therefore, the forming mandrel 348 is approaching its upper retracted position and the blank ejector 112 of the blank infeed mechanism 18 is about to undergo or is currently undergoing its forward infeed stroke, thereby to eject the next preformed blank B from the blank storage magazine 16. Shortly before the forming mandrel reaches its upper retracted position, the switch actuating plate 488 on the mandrel releases the mandrel switch 480. When this occurs, air pressure is reapplied to the outer ends of the end panel infeed cylinders 580 and the end panel infeed mechanisms 38 are again activated to feed the end panels $P_e$ inwardly in the end panel storage magazines 36 and maintain inward pressure on the two innermost end panels, currently occupying their initial forming positions adjacent the forming mandrel. When the next glue-coated blank B arrives at its initial forming position at the forming station $S_2$, it actuates the mandrel extension switch 474, as before, thereby initiating the second forming cycle of the forming mechanism 30 and the third infeed cycle of the blank infeed mechanism 18. As the forming mandrel 348 descends in the downward forming stroke of the second forming cycle, the pair of end panels $P_e$ and glue-coated blank B currently in their initial forming positions are forced downwardly into the forming cavity 32A, as before, thereby to form a second container structure C. As the blank B of this latter container structure is forced downwardly through the forming cavity, its bottom wall forming panel $P_b$ engages the upper edges of the cover forming panels $P_e$ on the first formed container structure C and forces the latter structure downwardly through the forming cavity to a position wherein the first container structure is ejected into the lower end of the forming die and enters the outfeed station $S_5$. As the first container structure emerges from the forming die, it drops onto the outfeed conveyor 700, as indicated in phantom lines in FIGURE 6a, and is then conveyed from the machine to a suitable receiver (not shown).

It is now apparent, therefore, that each container structure C formed by the machine remains within the forming cavity 32a until it is ejected from the cavity by the following container structure. As illustrated best in FIGURE 14, the spring loaded panel engaging deflectors 340 and 342 exert light inward pressure on the upstanding cover forming panels $P_c$ of each container structure C remaining in the forming cavity 32a. This inward pressure on the cover forming panels deflects the latter inwardly slightly to assure engagement of the upper edges of these panels with the bottom wall forming panel of the next formed container structure and, thereby, proper ejection of each container structure from the forming cavity by the next formed container structure. The inward deflection of the cover forming panels, however, should not be so great as to bend or fold the panels about their score lines $L_2$ since, as already noted, the cover forming panels are not folded until after the container structure is filled.

Summarizing the operation of the container forming machine 10, the preformed blanks B are successively ejected from the blank storage magazine 16 to the gluing station $S_2$ and are thereafter fed, by the conveyor mechanism 20, through the gluing station to an initial forming position at the forming station $S_3$. The end panel joining flaps $F_b$ and $F_6$ of each blank are striped with cold and hot glue $G_c$ and $G_h$ during passage of the blank through the gluing station. Arrival of each glue-coated blank in its initial forming position at the forming station initiates the next infeed cycle of the blank infeed mechanism 18 and the next forming cycle of the forming mechanism 30.

During each forming cycle of the forming mechanism 30, a pair of end panels $P_e$ are extracted, by the descending forming mandrel 348, from the end panel storage magazines 36 and are driven downwardly into positions of initial mating engagement with the underlying preformed blank B currently in its initial forming position. Thereafter, the end panels and blank are driven downwardly into the forming cavity 32a, during which the blank is folded and adhesively bonded to the end panels to form a partially completed container structure C. Each container structure remains in the forming cavity during the subsequent upward return stroke of the forming mandrel to its upper retracted position and is thereafter ejected downwardly from the forming cavity onto the outfeed conveyor 700 by the next formed container structure.

Container forming machines identical to that illustrated in the drawings have been constructed and operated for extended periods of time. These actual operational tests have demonstrated that the container forming machine of the invention is totally reliable in operation, practical, possesses a high production rate, and is otherwise ideally suited to its intended purposes. By way of example, the container forming machines which have been constructed have been operated at production rates of 30 containers per minute for prolonged periods of time without malfunctioning.

While the invention has herein been shown and described in what is presently conceived to be its most practical and preferred embodiment, it is recognized that departures may be made therefrom within the scope of the invention, which is not to be limited to the details disclosed herein but is to be accorded the full scope of the claims so as to embrace any and all equivalent devices.

What is claimed is:

1. In a machine for mating separate preformed end panels with a preformed blank and erecting said blank about said end panels to form a container structure, said blank having a central rectangular bottom wall forming panel, hinged side wall forming panels along opposite sides of said bottom wall forming panel, and hinged projecting end panel joining flaps along opposite edges of the blank, the combination comprising: a frame, means on said frame defining a folding die having a generally rectangular forming cavity bounded along two opposite sides by first folding members and along its two remaining opposite sides by second folding members, a forming mandrel having a leading end, means mounting said mandrel on said frame for movement between an extended position wherein said leading end of the mandrel projects into said forming cavity and a retracted position wherein said mandrel is withdrawn from the cavity, said mandrel having a rectangular cross-section generally complementing said forming cavity and including two opposite side members having outer surfaces disposed in planes generally parallel to one another and to the direction line of movement of the mandrel and generally normal to said first two mentioned opposite sides of said forming cavity, thrust shoulders on said mandrel rearwardly of said leading end of the mandrel and projecting beyond said outer surfaces of said mandrel side members, said thrust shoulders including shoulder surfaces presented toward said leading end of the mandrel, said blank being adapted to be positioned across said forming cavity between the latter and the leading end of said mandrel and said panels being adapted to be positioned against said outer surfaces of said mandrel side members forwardly of said thrust shoulders when the mandrel is in retracted position, whereby forward movement of the mandrel to its extended position is effective to initially move said end panels into mating engagement with said blank and thereafter to force said blank and end panels into said forming cavity between said folding members, thereby to cause said folding members to fold the ends of said blank upwardly about the ends of said panel and to fold said end panel joining flaps against the outer surfaces of said end panels, means for moving said mandrel between said extended and retracted positions thereof, and means for extending said mandrel side members outwardly to urge said end panels into firm contact with said flaps to said blank during forward movement of said mandrel to its extended position and retracting said mandrel side members inwardly to release said end panels during rearward movement of said mandrel to its retracted position.

2. In a machine for mating separate preformed end panels with a preformed blank and erecting said blank about said end panels to form a container structure, said blank having a central rectangular bottom wall forming panel, hinged side wall forming panels along opposite sides of said bottom wall forming panels, first hinged projecting end panel joining flaps along opposite ends of said bottom wall forming panel, and second hinged projecting end panel joining flaps along opposite ends of said side wall forming panels, the combination comprising: a frame, means on said frame defining a blank folding die having a generally rectangular forming cavity bounded along two opposite sides by first folding members and along its remaining opposite sides by second folding members, a forming mandrel having a leading end, means mounting said mandrel on said frame for movement between an extended position wherein said leading end of the mandrel projects into said forming cavity and a retracted position wherein said mandrel is withdrawn from the cavity, said mandrel having a rectangular cross-section generally complementing said forming cavity and including two opposite side members having outer surfaces disposed in planes generally parallel to one another and to the direction line of movement of the mandrel and generally normal to said first two mentioned sides of said forming cavity, thrust shoulders on said mandrel rearwardly of said leading end of the mandrel and projecting beyond said outer surfaces of said mandrel side members, said thrust shoulders including shoulder surfaces presented toward said leading end of the mandrel, said blank being adapted to be positioned across said forming cavity between the latter and the leading end of said mandrel with said bottom wall forming panel overlying said cavity, said side wall forming panels overlying said first folding die members, and said first panel joining flaps overlying said second folding die members, and said end panels being adapted to be positioned against said outer surfaces of said mandrel side members forwardly of said thrust shoulders when said mandrel is in retracted position, whereby forward movement of the mandrel to its extended position is effective to initially move said end panels to positions of mating engagement with said blank wherein the lower edges of said end panels engage said bottom wall forming panel of said blank just inboard of said first panel joining flaps, and said mandrel is thereafter effective to force said blank and end panels into said forming cavity between said folding members, thereby to cause said folding members to fold said side wall forming panels upwardly about the ends of said end panels and said first panel joining flaps upwardly against the outer surfaces of said end panels, and said first folding members further including means for folding said second panel joining flaps inwardly against the outer surfaces of said end panels during upward folding of said side wall forming panels about the ends of said end panels.

3. A container forming machine according to claim 2 wherein: said first folding die members comprise rollers and said second flap folding means comprise annular forming shoulders on said rollers, respectively.

4. In a machine for mating separate preformed end panels with a preformed blank and erecting said blank about said end panels to form a container structure, the combination comprising: a frame, means on said frame defining a blank folding die having a generally rectangular forming cavity bounded along two opposite sides by folding members and along its two remaining opposite sides by parallel side wall forming plates, a forming mandrel having a leading end, means mounting said mandrel on said frame for movement along a direction line parallel to said side wall forming plates and between an extended position wherein said leading end of the mandrel projects into said forming cavity and a retracted position wherein said mandrel is withdrawn from said cavity, said mandrel having a rectangular cross-section generally complementing said forming cavity and including two rearwardly pivoted opposite side members having outer surfaces presented toward said side wall forming plates, respectively, whereby the leading end of said side members are pivotally movable toward and away from said side wall plates, means on said mandrel operatively connected to said mandrel side members for extending the latter members outwardly toward said side wall forming plates, respectively, during forward movement of said mandrel to its extended position and retracting said mandrel side members inwardly away from said side wall forming plates during rearward movement of said mandrel to its retracted position, thrust shoulders on said mandrel rearwardly of said leading end of the mandrel and projecting beyond said outer surfaces of said mandrel side members, said thrust shoulders including shoulder surfaces generally parallel to and presented toward said leading end of the mandrel, said blank being adapted to be positioned across said forming cavity between the latter and said leading end of the mandrel and said end panels being adapted to be positioned against said outer surfaces of said mandrel side members forwardly of said thrust shoulders when said mandrel is in retracted position, whereby forward movement of the mandrel to its extended position is effective to initially move said end panels into mating engagement with said blank and thereafter to force said blank and end panels into said forming cavity between said folding members, thereby to cause said folding members to fold the ends of said blank upwardly about the ends of said end panels, said mandrel side members being extended outwardly to urge said end panels against said side wall forming plates during forward movement of said mandrel to its extended position and being retracted inwardly to release said end panels during rearward movement of said mandrel to its retracted position.

5. In a machine for mating separate preformed end panels with a preformed blank and erecting said blank about said end panels to form a container structure, said blank having a central rectangular bottom wall forming panel, hinged side wall forming panels along opposite sides of said bottom wall forming panel, first hinged projecting end panel joining flaps at opposite ends of said bottom wall forming panels, and second hinged projecting end panel joining flaps at opposite ends of said side wall forming panels, the combination comprising: a frame, means on said frame defining a blank folding die having a rectangular forming cavity bounded along two opposite sides by folding members and along its two remaining opposite sides by parallel side wall forming plates, a forming mandrel having a leading end, means mounting said mandrel on said frame for movement along a direction line parallel to said side wall forming plates and between an extended position wherein said leading end of the mandrel projects into said forming cavity and a retracted position wherein said mandrel is withdrawn from said forming cavity, said mandrel having a rectangular cross-section generally complementing said forming cavity and including two rearwardly pivoted opposite side members having outer surfaces presented toward and generally parallel to said side wall forming plates, respectively, means on said mandrel operatively connected to said mandrel side members for extending the leading ends of said latter members outwardly toward said side wall forming plates, respectively, during forward movement of said forming mandrel to its extended position and retracting said leading ends of said mandrel side members inwardly away from said side wall forming plates during rearward movement of said mandrel to its retracted position, thrust shoulders on said mandrel rearwardly of said leading end of the mandrel and projecting beyond said outer surfaces of said mandrel side members, said thrust shoulders including shoulder surfaces generally parallel to and presented toward said leading end of the mandrel, said blank being adapted to be positioned across said forming cavity between the latter and said leading end of the mandrel with said side wall forming panels overlying said folding members and said first end panel joining flaps overlying said side wall forming plates, and said end panels being adapted to be positioned against said outer surfaces of said mandrel side members forwardly of said thrust shoulders when said mandrel is in retracted position, whereby forward movement of said mandrel to its extended position is effective to initially move said end panels to positions of mating engagement with said blank wherein the lower edges of said end panels engage said bottom wall forming panel just inboard of said first end panel joining flaps, and said mandrel is thereafter effective to force said blank and end panels into said forming cavity between said folding members and side wall forming plates, thereby to cause said folding members to fold said side wall forming panels upwardly about the ends of said end panels and to cause said side wall forming plates to fold said first end panel joining flaps upwardly against the outer surfaces of said end panels, said folding members including means for folding said second end panel joining flaps inwardly against the outer surfaces of said end panels during upward folding of said side wall forming panels about the ends of said end panels, said mandrel side members being extended outwardly to urge said end panels toward said side wall forming members during forward movement of said mandrel to its extended position, and said mandrel side members being retracted inwardly to release said end panels during rearward movement of said mandrel to its retracted position.

6. A container forming machine according to claim 4 wherein: said means for moving said forming mandrel between said extended and retracted positions thereof comprises a driving member through which driving thrust is transmitted to said mandrel for moving the latter, and said means for extending and retracting said mandrel side members comprising a toggle connection between said driving member and said mandrel side members.

7. A container forming machine according to claim 4 wherein: said means for moving said mandrel between said extended and retracted positions thereof comprises a driving member through which driving thrust is transmitted to said mandrel for moving the latter, and said means for extending and retracting said mandrel side members comprises a lost motion, over-center, spring-loaded toggle connection between said driving member and said mandrel side members, and a lost motion connection between said toggle connection and said frame for shifting said toggle connection in a direction to retract said mandrel side members inwardly in response to forward movement of said mandrel to a position just short of its extended position and for shifting said toggle connection in the opposite direction to extend said mandrel side members outwardly in response to rearward movement of said mandrel to a position just short of its retracted position.

8. In a machine for mating separate preformed end panels with a preformed blank and erecting said blank about said end panels to form a container structure, the combination comprising: a frame, means on said frame defining a blank folding die having a generally rectangular forming cavity bounded along two opposite sides by folding members, a forming mandrel having a leading end, means mounting said mandrel on said frame for movement between an extended position wherein said leading end of the mandrel projects into said forming cavity and a retracted position wherein said mandrel is withdrawn from the cavity, said mandrel having a rectangular cross-section generally complementing said forming cavity and including two opposite side members having outer surfaces disposed in planes generally parallel to one another and to the direction line of movement of the ram and generally normal to said two opposite sides of said forming cavity, first and second pairs of thrust shoulders on said mandrel rearwardly of said leading end of the mandrel, said thrust shoulders having shoulder surfaces generally parallel to and presented toward said leading end of the mandrel, said shoulder surfaces on said first shoulder pair being equally spaced a given distance from said leading end of said mandrel and said shoulder surfaces on said second shoulder pair being equally spaced from said leading end a distance greater than said given distance, means for moving each pair of said thrust shoulders between extended positions wherein their respective shoulder surfaces project beyond said outer surfaces of said mandrel side members and retracted positions wherein said shoulder surfaces are retracted inwardly of said outer mandrel surfaces, said blank being adapted to be positioned across said forming cavity between the latter and said leading end of the mandrel and said end panels being adapted to be positioned against said outer surfaces of said mandrel side members forwardly of an extended pair of said thrust shoulders, whereby forward movement of said mandrel to its extended position is effective to initially move said end panels into mating engagement with said blank and thereafter to force said blank and end panels into said forming cavity between said forming members, thereby to cause said forming members to fold the ends of said blank upwardly about the ends of said end panels.

9. A container forming machine according to claim 8 wherein: said means for extending and retracting said thrust shoulders include springs for normally extending said thrust shoulders and fluid pressure means for selectively retracting said thrust shoulders.

10. In a machine for mating separate preformed end panels with a preformed blank and erecting said blank about said end panels to form a container structure, the combination comprising: a frame, means on said frame defining a blank folding die having a generally rectangular forming cavity bounded along two opposite sides by folding members and along its two remaining opposite sides by parallel side wall forming members a forming mandrel having a leading end, means mounting said mandrel on said frame for movement along a direction line parallel to said side wall forming members and between an extended position wherein said leading end of the mandrel projects into said forming cavity and a retracted position wherein said mandrel is withdrawn from the cavity, said mandrel having a rectangular cross-section generally complementing said forming cavity and including two opposite side members having outer surfaces presented toward and generally parallel to said side wall forming members, respectively, thrust shoulders on said mandrel rearwardly of said leading end of the mandrel and projecting beyond said outer surfaces of said mandrel side members, said thrust shoulders including shoulder surfaces generally parallel to and presented toward said leading end of the mandrel, end panel infeed devices mounted on said frame in line with said remaining opposite side edges of said forming cavity including storage magazines for containing a number of said end panels and infeed means for successively feeding the end panels inwardly through said magazines toward said forming cavity to initial forming positions at the inner ends of said magazines, respectively, wherein the end panels are disposed in close proximity to said outer surfaces of said mandrel side members forwardly of said thrust shoulders, means for releasably supporting said end panels in said initial forming positions, and said blank being adapted to be positioned across said forming cavity between the latter and said leading end of said mandrel when the latter is in its retracted position, whereby forward movement of said mandrel from its retracted position to its extended position is effective to initially move the end panels currently in said initial forming positions from said storage magazines into mating engagement with said blank and thereafter to force said blank and end panels into said forming cavity between said folding members, thereby to cause said folding members to fold the ends of said blank upwardly about the ends of said end panels, said end panel infeed means includes means for releasably exerting inward pressure on the end panels in said storage magazines, thereby to urge said end panels inwardly in said magazines toward said forming mandrel, and means responsive to movement of said forming mandrel for activating said pressure exerting means to exert inward pressure on the end panels in said storage magazines during initial forward travel of said mandrel from its retracted position to an intermediate position and inactivating said pressure exerting means to relieve the inward pressure on the end panels in said magazines during final forward travel of said mandrel from said intermediate position to its extended position.

11. In a machine for mating separate preformed end panels with a preformed blank and erecting said blank about said end panels to form a container structure, the combination comprising: a frame, means on said frame defining a blank folding die having a generally rectangular forming cavity bounded along two opposite sides by folding members and along its two remaining opposite sides by parallel side wall forming members, a forming mandrel having a leading end, means mounting said mandrel on said frame for movement along a direction line parallel to said side wall forming members and between an extended position wherein said leading end of the mandrel projects into said forming cavity and a retracted position wherein said mandrel is withdrawn from the cavity, said mandrel having a rectangular cross-section generally complementing said forming cavity and including two opposite side members having outer surfaces presented toward and generally parallel to said side wall forming members, respectively, thrust shoulders on said mandrel rearwardly of said leading end of the mandrel and projecting beyond said outer surfaces of said mandrel side members, said thrust shoulders including shoulder surfaces generally parallel to and presented toward said leading end of the mandrel, end panel infeed devices mounted on said frame in line with said remaining opposite side edges of said forming cavity including storage magazines for containing a number of said end panels and infeed means for successively feeding the end panels inwardly through said magazines toward said forming cavity to initial forming positions at the inner ends of said magazines, respectively, wherein the end panels are disposed in close proximity to said outer surfaces of said mandrel side members forwardly of said thrust shoulders, means for releasably supporting said end panels in said initial forming positions, and said blank being adapted to be positioned across said forming cavity between the latter and said leading end of said mandrel when the latter is in its retracted position, whereby forward movement of said mandrel from its retracted position to its extended position is effective to initially move the end panels currently in said initial forming positions from said storage magazines into mating engagement with said blank and thereafter to force said blank and end panels into said forming cavity between said folding members, thereby to cause said folding members to fold the ends of said blank upwardly about the ends of said end panels, said infeed means including fluid pressure actuated means adapted to be pressurized for exerting inward pressure on the end panels in said storage magazines to urge the end panels inwardly toward said forming mandrel and to be vented to relieve the inward pressure on the end panels, and means responsive to movement of said mandrel for pressurizing said fluid pressure actuated means during initial forward travel of said mandrel from its retracted position to an intermediate position and venting said fluid pressure actuated means during final forward travel of said mandrel from said intermediate position to its extended position.

12. In a machine for mating separate preformed end panels with a preformed blank and erecting said blank about said end panels to form a container structure, the combination comprising: a frame, means on said frame defining a blank folding die having a generally rectangular forming cavity bounded along two opposite sides by folding members and along its two remaining opposite sides by parallel side wall forming members, a forming mandrel having a leading end, means mounting said mandrel on said frame for movement along a direction line parallel to said side wall forming members and between an extended position wherein said leading end of the mandrel projects into said forming cavity and a retracted position wherein said mandrel is withdrawn from the cavity, said mandrel having a rectangular cross-section generally complementing said forming cavity and including two opposite side members having outer surfaces presented toward and generally parallel to said side wall forming members, respectively, thrust shoulders on said mandrel rearwardly of said leading end of the mandrel and projecting beyond said outer surfaces of said mandrel side members, said thrust shoulders including shoulder surfaces generally parallel to and presented toward said leading end of the mandrel, end panel infeed devices mounted on said frame in line with said remaining opposite side edges of said forming cavity including storage magazines for containing a number of said end panels and infeed means for successively feeding the end panels inwardly through said magazine toward said forming cavity to initial forming positions at the inner ends of said magazines, respectively, wherein the end panels are disposed in close proximity to said outer surfaces of said mandrel side members forwardly of said thrust shoulders, means for releasably supporting said end panels in said initial forming positions, and said blank being adapated to be positioned across said forming cavity between the latter and said leading end of said mandrel when the latter is in its retracted position, whereby forward movement of said mandrel from its retracted position to its extended position is effective to initially move the end panels currently in said initial forming positions from said storage magazines into mating engagement with said blank and thereafter to force said blank and end panels into said forming cavity between said folding members, thereby to cause said folding members to fold the ends of said blank upwardly about the ends of said end panels, said end panel infeed means of each infeed device comprising an endless conveyor chain having one run thereof extending longitudinally through the respective storage magazine, conveyor carriages attached to said conveyor chain at positions spaced therealong and including conveyor plates which are disposed in transverse planes of and move inwardly through the respective storage magazine during travel of said carriages along said run of said conveyor chain, said conveyor plates being spaced to receive a number of said end panels therebetween, and means for driving said conveyor chain in timed relation to movement of said forming mandrel between its extended and retracted positions in such manner that the end panels in their respective storage magazine are urged inwardly toward said mandrel during initial forward travel of the mandrel from its retracted position to an intermediate position and the inward pressure on the end panels is relieved during final forward travel of said mandrel from said intermediate position to its extended position.

13. In a machine for mating separate preformed end panels with a preformed blank and erecting said blank about said end panels to form a container structure, the combination comprising: a frame, a pair of end panel infeed devices mounted on said frame including elongate, longitudinally aligned end panel storage magazines having spaced inner ends and adapted to contain a number of said end panels and infeed means for urging the end panels inwardly to said magazines toward said inner open ends thereof, means on said frame defining a blank folding die between said inner ends of said storage magazines, said die having a generally rectangular forming cavity with two sides generally parallel to the common longitudinal axis of said storage magazines and bounded along said two sides by folding members, a forming mandrel having a leading end, means mounting said mandrel on said frame for movement between an extended position wherein said leading end of the mandrel projects into said forming cavity and a retracted position wherein said mandrel is withdrawn from said cavity, said mandrel having a rectangular cross-section generally complementing said forming cavity and including two opposite side members having outer surfaces presented toward and disposed in planes substantially normal to said common longitudinal axis of said storage magazines, respectively, first and second pairs of thrust shoulders mounted on said mandrel rearwardly of said leading end of the mandrel, said thrust shoulders including shoulder surfaces generally parallel to and presented toward said leading end of the mandrel, each said shoulder pair being movable between outer extended positions wherein their respective shoulder surfaces project beyond said outer mandrel surfaces and inner retracted positions wherein their respective shoulder surfaces are retracted inwardly of said outer mandrel surfaces, said end panel infeed means being effective to successively feed said end panels inwardly through said storage magazines to initial forming positions at the inner ends of said magazines wherein the end panels are disposed in close proximity to said outer mandrel surfaces and forwardly of the currently extended thrust shoulders, means to releasably support the end panels in said initial forming positions for forward movement of the end panels from said latter positions during forward movement of said mandrel from said retracted position, adjustable limit stops at the inner ends of said storage magazines for limiting inward movement of the end panels through said storage magazines to said initial forming positions and restraining the adjacent end panels against rearward movement with said mandrel, said limit stops being adjustable relative to said storage magazines in the direction of movement of said mandrel, and means for selectively extending and retracting said thrust shoulders and adjusting said limit stops, thereby to adapt said forming machine to end panels of different sizes.

14. A container forming machine according to claim 13 wherein: said last mentioned means includes an operating member which is manually operable to simultaneously extend and retract said thrust shoulders and adjust said end panel limit stops.

15. A container forming machine according to claim 13 wherein: said end panel limit stops have three different positions of adjustment for accommodating end panels of three different sizes, and said thrust shoulders of one shoulder pair include shoulder plates which are removable to accommodate said latter thrust shoulders to end panels of two different sizes.

16. In a machine for mating separate preformed end panels with a preformed blank and erecting said blank about said panels to form a container structure, the combination comprising: a frame having a blank infeed station and a forming station spaced therealong, means on said frame for feeding said blank along a given direction line from said infeed station to said forming station, means on said frame and said forming station defining a blank folding die having a generally rectangular forming cavity with two opposite sides extending transverse to said direction line and bounded along said two opposite sides by folding members, a forming mandrel having a leading end, means mounting said mandrel on said frame for movement between an extended position wherein said leading end of the mandrel projects into said forming cavity and a retracted position wherein said mandrel is withdrawn from the cavity, said mandrel having a rectangular cross-section generally complementing said forming cavity and including two opposite side members having outer surfaces disposed in planes generally parallel to said direction line and the direction line of movement of said mandrel and generally normal to said two opposite sides of said forming cavity, thrust shoulders on said mandrel rearwardly of said leading end of the mandrel and projecting beyond said outer surfaces of said mandrel side members, said thrust shoulders including shoulder surfaces generally parallel to and presented toward said leading end of the mandrel, said blank feeding means including a conveyor for moving said blank to an initial forming position at said forming station wherein the ends of said blank overlie said folding members, and said end panels being adapted to be positioned against said outer mandrel surfaces forwardly of said thrust shoulders when said mandrel is in its retracted position, whereby forward movement of the mandrel from its retracted position to its extended position with said blank located in said initial forming position is effective to initially move said end panels into mating engagement with said blank and thereafter to force said blank and end panels into said forming cavity between said folding members, thereby to cause said folding members to fold the ends of said blank upwardly about the ends of said panels, means for operating said mandrel between said extended and retracted positions, mandrel control means disposed for engagement by said blank upon arrival of the latter at said initial forming position and operatively connected to said mandrel operating means for effecting movement of said mandrel from said retracted position to said extended position in response to engagement of said mandrel control means by said blank, said conveyor including adjustable blank engaging means for regulating the travel imparted to said blank by said conveyor, said mandrel control means and blank engaging means being adjustable along said direction line to accommodate said machine to blanks of different length, and changeover means operatively connected to said mandrel control means and blank engaging means for simultaneously adjusting said mandrel control means and blank engaging means along said direction line.

17. In a machine for mating separate preformed end panels with a preformed blank and erecting said blank about said panels to form a container structure, the combination comprising: a frame having a blank infeed station and a forming station spaced therealong, means on said frame for feeding said blank along a given direction line from said infeed station to said forming station, means on said frame and said forming station defining a blank folding die having a generally rectangular forming cavity with two opposite sides extending transverse to said direction line and bounded along said two opposite sides by folding members, a forming mandrel having a leading end, means mounting said mandrel on said frame for movement between an extended position wherein said leading end of the mandrel projects into said forming cavity and a retracted position wherein said mandrel is withdrawn from the cavity, said mandrel having a rectangular cross-section generally complementing said forming cavity and including two opposite side members having outer surfaces disposed in planes generally parallel to said direction line and the direction line of movement of said mandrel and generally normal to said two opposite sides of said forming cavity, thrust shoulders on said mandrel rearwardly of said leading end of the mandrel and projecting beyond said outer surfaces of said mandrel side members, said thrust shoulders including shoulder surfaces generally parallel to and presented toward said leading end of the mandrel, said blank feeding means including a conveyor for moving said blank to an initial forming position at said forming station wherein the ends of said blank overlie said folding members, and said end panels being adapted to be positioned against said outer mandrel surfaces forwardly of said thrust shoulders when said mandrel is in its retracted position, whereby forward movement of the mandrel from its retracted position to its extended position with said blank located in said initial forming position is effective to initially move said end panels into mating engagement with said blank and thereafter to force said blank and end panels into said forming cavity between said folding members, thereby to cause said folding members to fold the ends of said blank upwardly about the ends of said panels, means for operating said mandrel between said extended and retracted positions, mandrel control means disposed for engagement by said blank upon arrival of the latter at said initial forming position and operatively connected to said mandrel operating means for effecting movement of said mandrel from said retracted position to said extended position, adjustable blank supporting means at said infeed station for supporting said blank at the latter station, said conveyor including adjustable blank engaging means for regulating the travel imparted to said blank by said conveyor, said mandrel control means, blank supporting means, and blank engaging means being adjustable along said direction line to accommodate said machine to blanks of different length, and changeover means operatively connected to said mandrel control means, blank supporting means, and blank engaging means for simultaneously adjusting said mandrel control means, blank supporting means, and blank engaging means along said direction line.

18. In a machine for mating separate preformed end panels with a preformed blank and erecting said blank about said panels to form a container structure, the combination comprising: a frame having a blank infeed station and a forming station spaced therealong, means on said frame for feeding said blank along a given direction line from said infeed station to said forming station, means on said frame and said forming station defining a blank folding die having a generally rectangular forming cavity with two opposite sides extending transverse to said direction line and bounded along said two opposite sides by folding members, a forming mandrel having a leading end, means mounting said mandrel on said frame for movement between an extended position wherein said leading end of the mandrel projects into said forming cavity and a retracted position wherein said mandrel is withdrawn from the cavity, said mandrel having a rectangular cross-section generally complementing said forming cavity and including two opposite side members having outer surfaces disposed in planes generally parallel to said direction line and the direction line of movement of said mandrel and generally normal to said two opposite sides of said forming cavity, thrust shoulders on said mandrel rearwardly of said leading end of the mandrel and projecting beyond said outer surfaces of said mandrel side members, said thrust shoulders including shoulder surfaces generally parallel to and presented toward said leading end of the mandrel, said blank feeding means including a conveyor for moving said blank to an initial forming position at said forming station wherein the ends of said blank overlie said folding members, and said end panels being adapted to be positioned against said outer mandrel surfaces forwardly of said thrust shoulders when said mandrel is in its retracted position, whereby forward movement of the mandrel from its retracted position to its extended position with said blank located in said initial forming position is effective to initially move said end panels into mating engagement with said blank and thereafter to force said blank and end panels into said forming cavity between said folding members, thereby to cause said folding members to fold the ends of said blank upwardly about the ends of said panels, means for operating said mandrel between said extended and retracted positions, mandrel control means disposed for engagement by said blank upon arrival of the latter at said initial forming position and operatively connected to said mandrel operating means for effecting movement of said mandrel from said retracted position to said extended position in response to engagement of said mandrel control means by said blank, adjustable blank supporting means at said infeed station for supporting said blank at the latter station, said blank feeding means including adjustable blank infeed means at said infeed station for feeding said blank from said infeed station to said conveyor, said conveyor including adjustable blank engaging means for regulating the travel imparted to said blank by said conveyor, said mandrel control means, blank supporting means, blank infeed means, and blank engaging means being adjustable along said direction line to condition said machine to blanks of different length, and changeover means operatively connected to said mandrel control means, blank supporting means, blank infeed means, and blank engaging means for simultaneously adjusting said mandrel control means, blank supporting means, blank infeed means, and blank engaging means along said direction line.

19. In a machine for making separate preformed end panels with a preformed blank and erecting said blank about said end panels to form a container structure, the combination comprising: a frame having a blank infeed station and a forming station spaced therealong, adjustable blank supporting means at said blank infeed station for supporting said blank at the latter station, adjustable blank infeed means at said infeed station for feeding said blank from said infeed station toward said forming station, a conveyor between said stations for receiving said blank from said infeed station and conveying said blank along a given direction line from said infeed station to an initial forming position at said forming station, said conveyor including adjustable blank engaging means for regulating the travel imparted to said blank by said conveyor, means on said frame at said forming station defining a blank folding die having a generally rectangular forming cavity with two opposite sides extending transverse to said direction line and bounded along said two opposite sides by folding members, said blank overlying said forming cavity when the blank occupies said initial forming position, a forming mandrel having a leading end, means mounting said mandrel on said frame for movement between an extended position wherein said leading end of the mandrel projects into said forming cavity and a retracted position when said mandrel is withdrawn from the cavity, said mandrel having a generally rectangular cross-section generally complementing said forming cavity and including two opposite side members having outer surfaces disposed in planes generally parallel to said direction line and the direction line of movement of said mandrel and generally normal to said two opposite sides of said forming cavity, means for operating said mandrel between said extended and retracted positions, adjustable mandrel control means disposed for engagement by said blank upon arrival of the latter at said initial forming position and operatively connected to said mandrel operating means for effecting movement of said mandrel from said retracted position to said extended position in response to engagement of said mandrel control means by said blank, first and second pairs of thrust shoulders mounted on said mandrel rearwardly of said leading end of said mandrel, each said shoulder pair being movable between outer extended positions wherein their respective shoulder surfaces project beyond said outer mandrel surfaces and inner retracted positions where their respective shoulder surfaces are retracted inwardly of said outer mandrel surfaces, the spacing between said leading end of the mandrel and said shoulder surfaces of said first shoulder pair being different than the spacing between the said leading end of the mandrel and said shoulder surface of said second shoulder pair, thrust shoulder operating means operatively connected to said thrust shoulders for selectively extending one shoulder pair and retracting the other shoulder pair, end panel infeed means located at opposite sides of said frame in line with said forming station for feeding said end panels inwardly toward said mandrel to initial forming positions wherein said end panels are disposed adjacent said outer mandrel surfaces for engagement by the currently extended mandrel thrust shoulders during movement of said mandrel from said retracted position to the said extended position, adjustable limit stops on said frame for limiting inward movement of said end panels to said initial forming positions, thereof, said blank supporting means, blank infeed means, blank engaging means, and mandrel control means being adjustable along said direction line to accommodate said machine to blanks of different length, said thrust shoulders being selectively extendable and retractable and said limit stops being adjustable in the direction of travel of said mandrel to accommodate said machine to end panels of different size, and changeover means for simultaneously adjusting said blank supporting means, blank infeed means, blank engaging means, mandrel control means, thrust shoulder operating means, and limit stops.

20. A machine for mating separate preformed end panels with a preformed blank and erecting said blank about said end panels and joining said blank to said end panels to form a container structure, said blank having a central rectangular bottom wall forming panel, hinged side wall forming panels along opposite sides of said bottom wall forming panel, first hinged projecting end panel joing flaps along opposite edges of said bottom wall forming panel having first hinge lines, and second hinged projecting end panel joining flaps along opposite edges of said side wall forming panels having second hinge lines, said machine comprising: a frame, a blank infeed station, a gluing station, and a forming station spaced along said frame, a pair of end panel infeed stations at opposite sides of said frame in line with said forming station, means at said blank infeed station for initially receiving said blank, means on said frame for feeding said blank edgewise from said blank infeed station through said gluing station to an initial forming position at said forming station, glue applicator means at said gluing station for applying glue to one side of said blank along said end panel joining flaps thereof during movement of said blank through said gluing station, means at said end panel infeed stations for supporting said end panels in initial forming positions adjacent said one side of said blank wherein said end panels are disposed in planes approximately normal to said blank and said end panels are located opposite said bottom wall forming panel of the blank just inboard of and substantially parallel to said first hinge lines of the blank when the latter occupies said initial forming position thereof, and forming means at said forming station responsive to movement of said blank into said initial forming position thereof for effecting initial relative movement of said end panels and blank into contact along and just inboard of said first hinge lines and thereafter folding said side wall forming panels of the blank about the ends of said end panels and folding said end panel joining flaps inwardly against the outer surfaces of said end panels to adhesively bond said flaps to said end panels.

21. A machine for mating separate preformed end panels with preformed blanks and erecting said blanks about said end panels and adhesively securing said blanks to said end panels to form container structures, each said blank having a central rectangular bottom wall forming panel, hinged side wall forming panels along opposite sides of said bottom wall forming panel, first hinged projecting end panel joining flaps along opposite edges of said bottom wall forming panel having first hinge lines, and second hinged projecting end panel joining flaps along opposite edges of said side wall forming panels having second hinge lines, said machine comprising: a frame, a blank infeed station, a gluing station, and a forming station spaced along said frame, a pair of end panel infeed stations at opposite sides of said frame in line with said forming station, a blank storage magazine at said blank infeed station for containing a stack of said preformed blanks, means on said frame for successively feeding said blanks edgewise from said magazine through said gluing station to said forming station, glue applicator means at said gluing station for applying glue to one side of each blank along said end panel joining flaps thereof during movement of the blanks through said gluing station, end panel storage magazines at said end panel infeed stations for containing stacks of said end panels, means at said end panel infeed stations for successively feeding said end panels inwardly through said end panel storage magazines toward said forming station to initial forming positions at the inner ends of the latter magazines wherein the pair of currently innermost end panels are disposed adjacent said one side of and in planes approximately normal to the blank currently occupying its initial forming position at said forming station and said innermost end panels are located opposite said bottom wall forming panel of the latter blank just inboard of and substantially parallel to said first hinge lines of the latter blank, and forming means at said forming station responsive to movement of each blank into said initial forming position thereof for effecting initial relative movement of the innermost end panels and blank into contact along and just inboard of said first hinge lines and thereafter folding said side wall forming panels of the respective blank about the end of the end panels and folding said end panel joining flaps of the respective flap inwardly against the outer surfaces of the end panels to adhesively bond the flaps to the end panels to form a container structure.

22. A container forming machine according to claim 21 wherein: said forming means comprises a forming die having a rectangular forming cavity which said bottom wall forming panel of each blank overlies when in said initial forming position thereof, a forming mandrel on said frame for driving the blank and the end panels currently occupying said initial positions into said forming cavity, and said forming die including first folding means for folding said side wall forming panels of each blank entering said cavity about the ends of its respective end panels and the second folding means for folding the end panel joining flaps of the entering blank inwardly against the outer surfaces of its respective end panels.

23. A container forming machine according to claim 21 wherein: said forming means comprises a forming die having a rectangular forming cavity one end of which said bottom wall forming panel of each blank overlies when the respective blank occupies an initial forming position thereof, a forming mandrel for driving the blank and respective end panels currently in said initial forming positions into said forming cavity, said forming die including first folding means for folding said side wall forming panels of each blank entering said cavity about the ends of its respective end panels and second folding means for folding said end panel joining flaps of each entering blank inwardly against the outer surfaces of its respective end panels, thereby to form a container structure, the other end of said die cavity having an opening through which each said container structure is ejected from said cavity, and an outfeed conveyor on said frame opposite said other end of said die cavity for receiving each container structure from said die cavity and conveying a container structure from the machine.

24. A machine for mating separate performed end panels with preformed blanks and erecting said blanks about said end panels and adhesively securing said blanks to said end panels to form container structures, each said blank having a central rectangular bottom wall forming panel, hinged side wall forming panels along opposite sides of said bottom wall forming panel, first hinged projecting end panel joining flaps along opposite edges of said bottom wall forming panel having first joining flaps along opposite edges of said side wall forming panels having second hinge lines, said machine comprising: a frame, blank infeed station, a gluing station, and a forming station spaced along said frame, a pair of end panel infeed stations at opposite sides of said frame in line with said forming station, a blank storage magazine at said blank infeed station for containing a stack of said preformed blanks, means on said frame for successively feeding said blanks edgewise from said magazine through said gluing station to said forming station, glue applicator means at said gluing station for applying glue to one side of each blank along said end panel joining flaps thereof during movement of the blanks through said gluing station, end panel storage magazines at said end panel infeed stations for containing stacks of said end panels, means at said end panel infeed stations for successively feeding said end panels inwardly through said end panel storage magazines toward said forming station to initial forming positions at the inner ends of the latter magazines wherein the pair of currently innermost end panels are disposed adjacent said one side of and in planes approximately normal to the blank currently occupying its initial forming position at said forming station and said innermost end panels are located opposite said bottom wall forming panel of the latter blank just inboard of and substantially parallel to said first hinge lines of the latter blank, and forming means at said forming station responsive to movement of each blank into said initial forming position thereof for effecting initial relative movement of the innermost end panels and blank into contact along and just inboard of said first hinge lines and thereafter folding said side wall forming panels of the respective blank about the ends of the end panels and folding said end panel joining flaps of the respective flap inwardly against the outer surfaces of the end panels to adhesively bond the flaps to the end panels to form a container structure, said glue applicator means including cold glue applicators for applying stripes of cold glue to said end panel joining flaps of each blank and hot glue applicators for applying stripes of hot glue to said end panel joining gaps of each blank, said cold and hot glue applicators being off-set in a direction transverse to the direction line of movement of each blank through said gluing station whereby the stripes of hot and cold glue applied to each blank are laterally displaced.

25. The method of forming a container structure from a pair of preformed end panels and a preformed blank having a central rectangular bottom wall forming panel, hinged side wall forming panels along opposite sides of said bottom wall forming panel, first hinged projecting end panel joining flaps along opposite edges of said bottom wall forming panel, and second hinged projecting end panel joining flaps along opposite edges of said side wall forming panels, comprising the steps of: adhesively coating one side of said blank along said end panel joining flaps thereof, positioning said end panels over and normal to said bottom wall forming panel just inboard of and parallel to the hinge lines of said first end panel joint flaps, folding said side wall forming panels about the end of said end panels and folding said end panel joining flaps inwardly against the outer surfaces of said end panels.

*26. The combination of claim 2, further comprising* means for changing certain of the corresponding dimensions of said form and said die to vary the size of certain of the spaces between said form and said die.

27. The combination of claim 26, wherein said changing means comprises means for altering certain of the cross-section dimensions of said mandrel.

28. The combination of claim 27, wherein said altering means comprises means for reducing said dimensions when said forming mandrel is in its extended position.

29. The method of claim 25, wherein said folding steps include the step of folding said preformed blank about a folding form having dimensions approximately equal to the interior dimensions of the container structure to be formed, and further comprising the step of reducing the dimensions of said form following said folding steps to allow for removal of said container structure from said form.

30. The method of claim 25, wherein said folding steps include the step of folding the entire inner surface of each of said end panel joining flaps against the outer surface of one of said end panels.

31. The method of claim 25, wherein said step of adhesively coating comprises the steps of transporting said preformed blank past a stationary adhesive applying device, and applying both a cold adhesive and a hot adhesive to each of said end panel joining flaps.

32. The method of claim 25, wherein said step of positioning said end panels includes the step of emplacing said end panels on opposite sides of a folding form having dimensions approximately equal to the interior dimensions of the container structure to be formed.

33. The method of claim 25, wherein said step of adhesively coating comprises the steps of transporting said preformed blank past a stationary adhesive applying device, and applying both a cold adhesive and a hot adhesive to each of said end panel joining flaps, and said step of positioning said end panels includes the step of emplacing said end panels on oppositee sides of a folding form having dimensions approximately equal to the interior dimensions of the container structure to be formed, and said folding steps comprises the steps of folding said side wall forming panels about said folding form and the ends of said end panels, and folding the entire inner surface of each of said end panel joining flaps against the outer surface of one of said end panels.

34. The method of claim 33, further comprising the step of reducing the dimensions of said form following said folding steps to allow for removal of said container structure from said form.

35. The method of forming a container by a machine having a folding form and a die from a pair of preformed end panels, each of said end panels having a width dimension substantially equal to the height of the container to be formed, and a preformed blank, said blank consisting of a single sheet of corrugated material having sections delineated by scored lines, said sections consisting of a central rectangular bottom wall forming panel, a side wall forming panel along each of two opposite sides of said bottom wall forming panel, said side wall forming panels having a dimension along their edges perpendicular to the scored line separating them from the central rectangular bottom wall forming panel substantially equal to the height of the container to be formed, an end panel joining flap along each of the two remaining opposite sides of said bottom wall forming panel and along each of the two opposite sides of each of the side wall forming panels, said end panel joining flaps sized so that their ends will not be superimposed when said container is formed, comprising the steps of applying adhesive to one side of said blank on each of said end panel joining flaps, emplacing said end panels on opposite sides of said folding form, said form having dimensions approximately equal to the interior dimensions of the container to be formed, positioning said folding form so that said end panels are over and normal to said bottom wall forming panel just inboard of and parallel to the scored lines separating the bottom wall forming panel and the adjacent end panel joining flaps, and, folding said side wall forming panels about said form and the ends of said end panels and folding said end panel joining flaps inwardly so that the entire inner surface of each flap is adhered to the outer surface of one of said end panels.

36. The method of claim 35, further comprising the step of reducing the dimensions of said form following said folding steps to allow for removal of said container from said form.

37. The method of claim 35, wherein said step of applying adhesive comprises the steps of transporting said preformed blank past a stationary adhesive applying device, and, applying both a cold adhesive and a hot adhesive to each of said end panel joining flaps.

38 The method of claim 35, wherein said step of emplacing the end panels comprises the steps of moving said folding form from a first position without said die to a second position immediately adjacent said die, and, placing said end panels on opposite sides of said form as it moves from said first position to said second position.

39. The method of claim 35, wherein said folding steps comprise the step of inserting said form, end panels and preformed blank into said die causing said blank to bend at each of said scored lines to form the container.

40. The method of claim 39, further comprising the step of relatively changing certain of the corresponding dimensions of said form and said die following said folding steps to reduce the total force exerted upon said container by said machine.

41. The method of claim 35, wherein said step of applying adhesive comprises the steps of transporting said preformed blank past a stationary adhesive applying device, and applying both a cold adhesive and a hot adhesive to each of said end panel joining flaps, and said step of emplacing the end panels comprises the steps of moving said folding form from a first position without said die to a second position immediately adjacent said die, and placing said end panels on opposite sides of said form as it moves from said first position to said second position, and said folding steps comprise the step of inserting said form, end panels and preformed blank into said die causing said blank to bend at each of said scored lines to form the container.

42. The method of claim 41, further comprising the step of reducing the dimensions of said form following said folding step to allow for removal of said container from said form.

43. The method of forming a container by a machine having a folding form and a die, comprising the steps of forming a pair of end panels from corrugated material, each of the end panels having a width dimension substantially equal to the height of the container to be formed, forming a blank from corrugated material and delineating sections thereon by scored lines consisting of a central rectangular bottom wall forming panel, a side wall forming panel along each of two opposite sides

*of said bottom wall forming panel, said side wall forming panels having a dimension along their edges perpendicular to the scored line separating them from the central rectangular bottom wall forming panel substantially equal to the height of the container to be formed, an end panel joining flap along each of the two remaining opposite sides of said bottom wall forming panel and along each of the two opposite sides of each of the side wall forming panels, said end panels joining flaps sized so that their ends will be superimposed when said container is formed,*

*applying adhesive to one side of said blank on each of said end panel joining flaps,*

*emplacing said end panels on opposite sides of said folding form, said form having dimensions approximately equal to the interior dimensions of the container to be formed,*

*positioning said folding form so that said end panels are over and normal to said bottom wall forming panel just inboard of and parallel to the scored lines separating the bottom wall forming panel and the adjacent end panel joining flaps, and*

*folding said side wall forming panels about said form and the ends of said end panels and folding said end panel joining flaps inwardly so that the entire inner surface of each flap is adhered to the outer surface of one of said end panels.*

*44. The method of claim 43, further comprising the step of relatively changing certain of the corresponding dimensions of said form and said die following said folding steps to reduce the total force exerted upon said container by said machine.*

*45. The method of claim 44, wherein said step of relatively changing dimensions consists of the step of reducing certain of the dimensions of said form to allow for removal of said container from said form.*

*46. The method of claim 43, wherein said step of applying adhesive comprises the steps of*

*transporting said blank past a stationary adhesive applying device, and*

*applying both a cold adhesive and a hot adhesive to each of said end panel joining flaps.*

*47. The method of claim 43, wherein said step of emplacing the end panels comprises the steps of*

*moving said folding form from a first position without said die to a second position immediately adjacent said die, and*

*placing said end panels on opposite sides of said form as it moves from said first position to said second position.*

*48. The method of claim 43, wherein said folding steps comprise the step of inserting said form, end panels and blank into said die causing said blank to bend at each of said scored lines to form the container.*

*49. The method of claim 43, wherein*

*said step of applying adhesive comprises the steps of*

*transporting said blank past a stationary adhesive applying device, and*

*applying both a cold adhesive and a hot adhesive to each of said end panel joining flaps, and*

*said step of emplacing the end panels comprises the steps of*

*reciprocating said folding form from a first position without said die to a second position without said die, and*

*placing said end panels on opposite sides of said form as it moves from said first position to said second position, and*

*said folding steps comprise the step of inserting said form, end panels and preformed blank into said die causing said blank to bend at each of said scored lines to form the container, and*

*further comprising the step of relatively changing certain of the corresponding dimensions of said form and said die following said folding steps to reduce the total force exerted upon said container by said machine.*

*50. The method of claim 49, wherein said step of relatively changing dimensions consists of the step of reducing certain of the dimensions of said form following said folding steps to allow for removal of said container from said form.*

References Cited

The following references, cited by the Examiner, are of record in the patented file of this patent or the original patent.

UNITED STATES PATENTS

| | | | |
|---|---|---|---|
| 1,136,958 | 4/1915 | Hobbs | 93—55 |
| 1,614,960 | 1/1927 | Johnson et al. | 93—51 |
| 2,270,212 | 1/1942 | Chaffin | 93—51 |
| 2,604,827 | 7/1952 | Hichin et al. | 93—51 |
| 2,820,403 | 1/1958 | Plough et al. | 93—51 |
| 2,830,507 | 4/1958 | Hichin et al. | 93—51 |
| 2,962,944 | 12/1958 | Neely | 93—41 |
| 3,004,479 | 10/1961 | Ullman | 93—55 |
| 3,125,007 | 3/1964 | Jaroff et al. | 93—51 |

JAMES M. MEISTER, Primary Examiner

U.S. Cl. X.R.

93—59 CE

PO-1050
(5/69)

UNITED STATES PATENT OFFICE
CERTIFICATE OF CORRECTION

Patent No. Re. 27,825 Dated December 4, 1973

Inventor(s) L. C. ROESNER et al.

It is certified that error appears in the above-identified patent and that said Letters Patent are hereby corrected as shown below:

Column 1, in the heading, the names of the inventors should read as follows: "Lawrence C. Roesner, Anaheim, Leonard E. Moen, Whittier, and Ugo Racheli, Anaheim, Calif.,".

Column 1, line 71 - delete the period "." after the word "other".

Column 2, line 4 - "wide-sprread" should read --wide-spread--.

Column 6, line 54 - "$S_2$" should read --$S_1$--.

Column 11, line 51 - "shaoulder" should read --shoulder--.

Column 15, line 4 - "$F_8$" should read --$F_s$--; and line 33 - the word "to" should read --of--.

Column 21, line 65 - delete the word "in" and insert -- is --.

line 76 - after "418b" insert the words --may be selectively extended-- and delete the words "are retracted, the forming".

Column 23, line 8 - the word "bank" should read --blank--; and line 9 - the word "bank" should read --blank--.

Column 26, line 24 - the word "sprocke" should read --sprocket--.

PO-1050
(5/69)

UNITED STATES PATENT OFFICE
CERTIFICATE OF CORRECTION

Patent No. Re. 27,825 Dated December 4, 1973

Inventor(s) L. C. ROESNER et al. Page - 2

It is certified that error appears in the above-identified patent and that said Letters Patent are hereby corrected as shown below:

Column 30, line 48 - the word "position" should read --positions--; and line 59 - at the end of the line, "isimul-" should read --simul- --.

Column 38, line 3 - delete the word "formnig" and insert therefor the word --forming--.

Column 40, line 36 - "$S_2$" should read --$S_3$--; and line 70 - the word "The" should read --This--.

Column 42, line 18 - the word "to" should read -of--.

Column 54, line 12 - after the words "having first" insert the words --hinge link, and second hinged projecting end panel--; and line 52 - delete the word "gaps" and insert therefor the word --flaps--.

Signed and sealed this 28th day of January 1975.

(SEAL)
Attest:

COY M. GIBSON JR.
Attesting Officer

C. MARSHALL DANN
Commissioner of Patents